United States Patent
Schmidt et al.

(10) Patent No.: US 6,944,331 B2
(45) Date of Patent: Sep. 13, 2005

(54) LOCATING REGIONS IN A TARGET IMAGE USING COLOR MATCHING, LUMINANCE PATTERN MATCHING AND HUE PLANE PATTERN MATCHING

(75) Inventors: Darren R. Schmidt, Cedar Park, TX (US); Kevin L. Schultz, Georgetown, TX (US); Siming Lin, Austin, TX (US); Dinesh Nair, Austin, TX (US)

(73) Assignee: National Instruments Corporation, Austin, TX (US)

( * ) Notice: Subject to any disclaimer, the term of this patent is extended or adjusted under 35 U.S.C. 154(b) by 581 days.

(21) Appl. No.: 10/014,945

(22) Filed: Oct. 26, 2001

(65) Prior Publication Data

US 2003/0083850 A1 May 1, 2003

(51) Int. Cl.[7] .............................. G06K 9/00; G06K 9/62
(52) U.S. Cl. ........................................ 382/165; 382/209
(58) Field of Search ................................ 382/118, 162, 382/165, 167, 181, 199, 209, 259, 278, 305; 358/453, 515, 518, 520, 523

(56) References Cited

U.S. PATENT DOCUMENTS

| | | | | |
|---|---|---|---|---|
| 5,085,325 A | | 2/1992 | Jones et al. ................. 209/580 |
| 5,410,637 A | | 4/1995 | Kern et al. .................... 706/52 |
| 5,652,881 A | | 7/1997 | Takahashi et al. ........ 707/104.1 |
| 5,751,450 A | * | 5/1998 | Robinson .................... 358/504 |
| 5,799,105 A | | 8/1998 | Tao ............................. 382/167 |
| 5,828,777 A | | 10/1998 | Suzuki ........................ 382/135 |
| 6,226,399 B1 | * | 5/2001 | Robinson .................... 382/162 |
| 6,229,921 B1 | | 5/2001 | Wenzel et al. .............. 382/209 |
| 6,272,239 B1 | | 8/2001 | Colla et al. ................. 382/167 |
| 6,282,317 B1 | | 8/2001 | Luo et al. ................... 382/203 |
| 6,295,370 B1 | * | 9/2001 | D'Hooge .................... 382/162 |
| 6,370,270 B1 | | 4/2002 | Nair et al. .................. 382/209 |
| 6,480,624 B1 | * | 11/2002 | Horie et al. ................ 382/165 |
| 6,556,708 B1 | * | 4/2003 | Christian et al. ........... 382/165 |
| 6,625,308 B1 | | 9/2003 | Acharya et al. ............ 382/168 |
| 6,681,032 B2 | * | 1/2004 | Bortolussi et al. ......... 382/118 |
| 6,757,428 B1 | * | 6/2004 | Lin et al. .................... 382/165 |
| 2002/0009229 A1 | * | 1/2002 | Fu et al. ..................... 382/199 |
| 2002/0041705 A1 | * | 4/2002 | Lin et al. .................... 382/165 |
| 2002/0102018 A1 | * | 8/2002 | Lin et al. .................... 382/165 |
| 2003/0083850 A1 | * | 5/2003 | Schmidt et al. ............ 702/189 |
| 2004/0228526 A9 | * | 11/2004 | Lin et al. .................... 382/165 |

FOREIGN PATENT DOCUMENTS

| | | | |
|---|---|---|---|
| EP | 0 751 475 | 1/1997 | ............ G06K/9/46 |
| EP | 0 657 839 B1 | 2/2002 | ............ G06K/9/48 |
| WO | 99/23600 | 5/1999 | ............ G06K/9/00 |

OTHER PUBLICATIONS

Datacube, Inc. "Intelligent and Optimal Normalized Correlation for High–Speed Pattern Matching", Feb. 2000, 13 pages.

(Continued)

*Primary Examiner*—Andrew W. Johns
*Assistant Examiner*—Amir Alavi
(74) *Attorney, Agent, or Firm*—Meyertons Hood Kivlin Kowert & Goetzel, P.C.; Jeffery C. Hood; Mark S. Williams

(57) ABSTRACT

A system and method for locating regions in a target image that match a template image with respect to color and pattern information. The template image is characterized with regard to pattern and color. The method comprises performing a first-pass search using color information from the color characterization of the template image to find one or more color match candidate locations. For each color match candidate location, a luminance, i.e., gray scale, pattern matching search is performed on a region proximal to the location, producing one or more final match regions. For each final match region a hue plane pattern match score may be calculated using pixel samples from the interior of each pattern. A final color match score may be calculated for each final match region. A weighted sum of luminance pattern match, hue pattern match, and color match scores may be calculated, and the scores and sum output.

58 Claims, 24 Drawing Sheets

OTHER PUBLICATIONS

IMAQ™ "IMAQ Vision Concepts Manual" Oct. 2000, pp. 14–18 through 14–25.

Terry Caelli and David Reye "On the Classification of Image Regions by Colour Texture and Shape," Pattern Recognition, vol. 26, No. 4, pp 461–470, 1993.

Michael J. Swain and Dana H. Ballard "Color Indexing," International Journal of Computer Vision, 7:1, pp. 11–32, 1991.

Marie–Pierre Dubuisson and Anil K. Jain "Fusing Color and Edge Information for Object Matching," IEEE, pp. 982–986, 1994.

K. Chen et al., "Similarity–Based Retrieved of Images Using Color Histograms", Proceedings of the SPIE, Jan. 26, 1999, XP000983710 chapters 2, 3.

J.R. Smith et al., "Tools and Techniques for Color Image Retrieval", San Jose, Feb. 1–2, 1996, Bellingham, SPIE, US, vol. 2670, Feb. 1, 1996, pp. 426–437, XPOOO642585, ISBN: 0–8194–2044–1.

Vertan et al. "Embedding fuzzy logic in content based image retrieval" 19th International Conference of the North American Fuzzy Information Processing Society 2000, pp. 85–89, Jul., 2000.

Han et al., "Fuzzy color histogram: an efficient color feature for image indexing and retrieval," Proc. 2000 ICASSP IEEE, vol. 4, pp. 2011–2014, Jun., 2000.

\* cited by examiner

PRIOR ART PATTERN MATCHING

PRIOR ART PATTERN MATCHING WITH
CHARACTERIZATION OF THE TEMPLATE IMAGE 9 x 9 Pixel Step Size

LOCATING REGIONS IN A TARGET IMAGE USING COLOR MATCHING, LUMINANCE PATTERN MATCHING AND HUE PLANE PATTERN MATCHING

FIELD OF THE INVENTION

The present invention relates to a system and method for locating regions of a target image that match a template image with respect to color and pattern information, wherein the invention includes efficient methods for characterizing the template image, improved methods for performing the color and pattern matching, and improved methods for locating rotated and/or scaled matches.

DESCRIPTION OF THE RELATED ART

In many applications it is necessary or desired to find one or more matches of a template image in a larger target image. Such applications include machine vision applications including process monitoring, feedback control, and laboratory automation; image and video compression; and jitter compensation in video cameras, among others. Various characteristics may be used in classifying a location in the target image as a match, including color and pattern information. Additionally, various levels of error or tolerance may be accepted in determining a match. In other words, a match may be determined with various degrees of difference between the template and the matching image, depending upon the particular application.

Prior art pattern recognition systems have typically used a template matching technique wherein the stored image or pattern to be located is iteratively compared with various portions of a target image in which it is desired to locate the template. FIG. 1 illustrates the pattern matching problem as known in the prior art. As shown, the pattern matching problem involves a template image, wherein one or more instances of the template image are desired to be located in the target image. The template image and the target image are provided to a pattern matching algorithm which performs the pattern matching. The pattern matching algorithm generally operates to compare the pixels, e.g., the grayscale value associated with the pixels, in the template image, or a selected subset of sample pixels, against each of the possible various locations in the target image.

Typically, the pattern matching algorithm involves comparing the template image, or a subset of sample pixels representing the template image, against locations in the target image on a horizontal pixel column basis and horizontal scan line basis. In other words, the sample pixels representing the template image are compared against a portion of the pixels in the target image, such as by using a 2D correlation, the sample pixels representing the template are then moved down or across a one pixel scan line or one pixel column in the target image, and the pattern matching algorithm is repeated, etc. Thus, the pattern matching algorithm generally involves comparing the template image pixels against all possible locations in the target image in an iterative fashion. The pattern matching may produce the location of the match in the image, the quality of match and possibly the orientation, size and/or scaling of the match.

The template is typically compared with portions of the target image by utilizing a correlation based pattern matching, i.e., using normalized two dimensional correlation (normalized 2D correlation). This 2D correlation is performed by placing the template over the respective portion of the image and performing a complete normalized 2D correlation between the pixels in the template and the pixels in the corresponding portion of the image, using values associated with the pixels, such as grayscale values. This correlation generally produces a correlation value which indicates the degree of correlation or match. For example, the correlation value may range between $-1$ and $+1$, wherein $+1$ indicates a complete match, 0 indicates no match, i.e., that the two images are uncorrelated, and $-1$ indicates that the two images are anti-correlated, i.e., a complete reversal of a match.

The normalized 2D correlation operation is based on a point-wise multiplication wherein the template is first conceptually placed over a portion of the image, the value associated with each point or pixel of the template is multiplied with the corresponding pixel value in the respective portion of the target image, and the result is summed over the entire template. Also, as noted above, the template image is generally compared with each possible portion of the target image in an iterative fashion. This approach is thus very computationally intensive.

Various optimizations or algorithms have been developed to provide a more efficient pattern matching technique. One prior art technique is to use selected samples or pixels from the template image, referred to as sample pixels, to represent the template image and hence to reduce the number of computations in the correlation.

FIG. 2 illustrates the pattern matching process of the prior art which involves characterization of the template with a reduced number of sample pixels. In this process, a characterization of the template is performed to extract features from the template image. In other words, the template is characterized to represent the template image with a lesser number of points or pixels, referred to as sample pixels, which presumably accurately characterize the template image. The template image is characterized in this fashion because the time required for the pattern matching is generally directly proportional to the number of points or pixels representing the template image which are used in the pattern matching. Thus the template is characterized to reduce the number of samples or pixels which are used in the correlation operation, thereby reducing the amount of computation. Once a lesser number of sample pixels have been generated, these sample pixels are then used in the pattern matching algorithm to locate instances of the template image in the target image.

Prior art techniques for characterizing the template image have utilized a homogeneous sampling of the template, such as a grid-based sampling of the template. Another prior art technique is to utilize random points or pixels within the template image and to use these random sample pixels in the correlation based pattern matching. However, each of the above prior art techniques operates to select a subset of the pixels in the template image which do not necessarily represent or characterize the template image well. In other words, homogeneous sampling or random sampling of the template image often does not produce an optimum subset of samples or pixels which best represent the pattern information of the template image.

Therefore, an improved system and method is desired for correlation based pattern matching. More particularly, an improved system and method is desired for characterizing or selecting samples or pixels from a template image which best represent the template image with the fewest samples possible. In addition, an improved system and method is also desired which reduces the number of correlation operations which are required in a pattern matching operation. Further, improved techniques are desired for performing pattern matching for rotated images, translated images, and images which are scaled in size.

Utilizing color information can often be used to simplify a grayscale pattern matching problem, e.g., due to improved contrast or separation of an object from the background. Also, some applications may utilize color information alone, i.e., not in conjunction with pattern information, to locate target image matches, e.g., for cases when an application depends on the cumulative color information in a region and not how the colors are arranged within the region or the spatial orientation of the region.

In machine vision applications, color is a powerful descriptor that often simplifies object identification and extraction from a scene. Color characterization, location, and comparison is an important part of machine vision and is used in a large class of assembly and packaging inspection applications. Inspection involves verifying that the correct components are present in the correct locations. For example, color information may be used in inspecting printed circuit boards containing a variety of components; including diodes, resistors, integrated circuits, and capacitors. These components are usually placed on a circuit board using automatic equipment and a machine vision system is useful to verify that all components have been placed in the appropriate positions.

As another example, color information is widely used in the automotive industry to verify the presence of correct components in automotive assemblies. Components in these assemblies are very often multicolored. For example, color characterization may be used to characterize and inspect fuses in junction boxes, i.e., to determine whether all fuses are present and in the correct locations. As another example, it is often necessary to match a fabric in one part of a multi-color automobile interior. A color characterization method may be used to determine which of several fabrics is being used.

A color space (or color model) is a way of representing colors and their relationship to each other. A color space is essentially a multi-dimensional (e.g., 3-D) coordinate system and a subspace within that system where each color is represented by a single point or vector. Image processing and machine vision systems use several different color spaces including RGB, HSI (or HSL), and CMY. In the RGB space, each color appeals in its primary spectral components of red, green, and blue. This RGB color space is based on a Cartesian coordinate system. The RGB model is represented by a 3-dimensional cube with red, green, and blue at the edges of each axis. Each point in the cube represents a color, and the coordinates of that point represents the amount of red, green and blue components present in that color. Because the red, green, and blue color components in RGB color space are highly correlated, it is difficult to characterize colors with intensity/luminance independent features.

The Hue, Saturation, Intensity (HSI) or Hue, Saturation, Luminance (HSL) color space was developed to put color in terms that are easier for humans to quantify. The hue component is color as we normally think; such as orange, green, violet, and so on (a rainbow is a way of visualizing the range of hues). Thus, hue represents the dominant color as perceived by an observer. Saturation refers to the amount or richness of color present. Saturation is measured by the amount of white light mixed with a hue. In a pure spectrum, colors are fully saturated. Colors such as pink (red and white) and lavender (purple and white) are less saturated. The intensity or light component refers to the amount of grayness present in the image.

Colors represented in HSI model space may be ideal for machine vision applications for two reasons. First, HSI includes an intensity (luminance) component separated from the color information. Second, the intimate relation between hue and saturation more closely represents how humans perceive color. It is therefore desirable to characterize colors in HSI space for color measurement and color matching.

HSI is modeled with cylindrical coordinates. One possible model comprises the double cone model, i.e., two cones placed end to end or an inverted cone below another cone (see FIG. 7). For information on the double cone model, please see "A Simplified Approach to Image Processing", Randy Crane, Prentice Hall, 1997. The hue is represented as the angle theta, varying from 0 degree to 360 degree. Saturation corresponds to the radius or radial distance, varying from 0 to 1. Intensity varies along the z-axis with 0 being black and 1 being white. When S=0, the color is gray scale with intensity I and H is undefined. When S=1, the color is on the boundary of the top cone base and is fully saturated When I=0, the color is black and therefore H is undefined.

On the assumption that the R, G and B values have been normalized to range fom 0 to 1, the following equations may be used to convert from RGB color space to HSI(or HSL) color space:

$$I = (R + G + B)/3$$

$$H = \cos^{-1}\left\{ \frac{\frac{1}{2}[(R-G)+(R-B)]}{[(R-G)^2+(R-B)(G-B)]^{\frac{1}{2}}} \right\}$$

$$S = 1 - \frac{3}{(R+G+B)}[\min(R, G, B)]$$

The Intensity I (or Luminance L) may also be represented by the equation:

$$L=0.299R+0.587G+0.114B$$

which is a weighted sum of the RGB values.

The equation for H yields values in the interval [0°,180°]. If B/I>G/I then H is greater than 180° and is obtained as H=360°−H.

Prior art in color machine vision systems use various techniques to measure and match colors. Those skilled in the art will be familiar with 'thresholding' an image. To threshold a color image, a threshold is applied to each of the three planes that make up the image. In RGB mode, to select a particular color, one will need to know the red, green and blue values that make up the color. In RGB mode it is not possible to separate color from intensity. Therefore, a characterization algorithm such as histogram intersection based on RGB space will be intensity sensitive. For more information on this, please see "Color Indexing", Michael J. Swain, Internal Journal of Computer Vision, vol. 7:1, page 11–32, 1991.

In the HSI color space, since the color and intensity information can be separated, one usually thresholds the color image in the hue plane to identify the dominant color (hue). However, it is difficult to distinguish multiple color objects by the thresholding technique, especially when the saturation has to be taken into account. Moreover, the black and white colors are the background colors in many machine vision applications and chromaticity(i.e. hue and saturation) can not be used to represent them. Therefore, The intensity value will also have to be used to represent black and white colors in the machine vision applications.

Prior art color matching techniques commonly calculate the color difference between corresponding pixels of a target object and a template object. These prior art techniques generally perform pixel by pixel comparisons or subtractions between pixels of the target object and pixels of the template object. The results of these pixel by pixel comparisons may then be compiled to determine the level of color similarity between the entire target object and template object. The computation cost of pixel by pixel comparison is very expensive and is difficult to accomplish in real time. A more efficient color match method is desirable. More specifically, it is desirable to enable machine vision applications to more effectively characterize and compare the colors in images.

U.S. Pat. No. 5,410,637 (Kern) uses fuzzy logic to establish acceptable pass/fail tolerances for production or inventory samples. The process first stores a series of training image samples which are labeled pass or fail according to visual inspections The initial value of the tolerance is a super ellipsoid determined by the high/low value of the pass samples in the training set. A classifier template uses the super ellipsoid tolerances and ranks every sample in the training set. The process then employs fuzzy logic to obtain an optimized tolerance which minimizes the sum of ranking error between the classifier template and the visual ranks. The process essentially builds a pass/fail color classifier.This process cannot be used to measure the colors quantitatively in an image or to measure the quantitative color similarities between two objects in an image or in two separated images.

U.S. Pat. No. 5,085,325 (Jones) implements a color sorting system and method. The method creates a lookup table containing a series of 0's (accept) and 1's (reject) based on good and bad sample images. During the sorting process, the pixel value of the input image is used to address the lookup table, the output of the lookup table is either 1 or 0. If the number of rejects (1's) accumulated is larger than a specified number K, the input image is rejected. This color sorting method is based on a pixel by pixel comparison. A large memory is required to store the lookup table. Although a special hardware addressing approach can improve the processing speed, the cost of computation is still very high for sorting objects with complex colors.

U.S. Pat. No. 5,751,450 (Robinson) provides a method for measuring the color difference of two digital images as a single 'distance.' This 'distance' is an average of the color differences of all corresponding pixels of the two images. Similar to the Jones' patent as described above, the cost of computation of the distance is very high. This template image has to be stored in the computer memory for on-line color matching. If the size of the template and target image are not the same, special operations for alignment or resizing the image must be done before the matching process can begin. A further drawback of this approach is that it is impossible to have scale and rotation-invariant color matching based on the 'distance' measure.

SUMMARY OF THE INVENTION

One embodiment of the present invention comprises a system and method for locating regions in a target image that match, at least to a degree, a template image with respect to color and pattern information. A template image comprising a plurality of pixels may be received by a computer system. A color characterization analysis may be performed in order to determine color information of the template image, e.g., using a color characterization method described herein. A method to characterize pattern information of the template image may also be performed.

When a target image is received, e.g., when the target image is acquired by a camera for a machine vision application, the target image may then be searched in order to find one or more regions in the target image matching the color and pattern information of the template image. The pattern information may comprise luminance pattern information and/or hue plane pattern information, and may also comprise saturation plane pattern information. In various embodiments, user input may be received which specifies options to use in performing the search, such as options relating to a desired matching granularity or options affecting the search efficiency and time requirements.

The search may comprise performing a first-pass search using color information obtained in the color characterization analysis of the template image in order to find a plurality of color match candidate regions, i.e., regions in the target image that match the template image with respect to color. For example, a color characterization analysis of various regions within the target image may be performed, and the color information for each region may be compared to the color information of the template image in order to determine whether the region matches the template image with respect to color. The color matching criteria used in this first-pass search may be relatively loose, i.e., a region that is analyzed may not need to match the color information of the template image very closely in order to be considered a color match candidate region. The first-pass color matching search may use a coarse to fine method and may also use a hill-climbing method to locate specific color match candidate regions.

For each color match candidate region found in the first-pass search, a luminance pattern matching search may be performed for a region proximal to (i.e., surrounding and encompassing) each color match candidate region (the "proximal region" or "surrounding and encompassing region"). The luminance pattern matching may be based on luminance pattern information obtained in the pattern information characterization of the template image. The luminance pattern matching may be performed using luminance or intensity information of the pixels (or a subset of the pixels) in the template image and the target image. Thus the luminance pattern matching may essentially correspond to a gray-scale image pattern matching. Pattern-based searches are summarized below. This pattern matching search of the "proximal regions" may produce one or more luminance pattern match regions in the target image. The one or more luminance pattern match regions found in the pattern matching search of each surrounding region match the template image with respect to color and pattern information according to some desired metric or degree of closeness. A luminance pattern match score may be calculated for the one or more matching luminance pattern match regions.

After luminance pattern matching has been performed, the method may then optionally perform hue plane or color-based pattern matching. This step is performed to assure that colored components of a selected image are in the correct locations per the template image. For example, in a case involving the identification of electrical resistors, two resistors selected by the color characteristic search and the luminance search may have stripes of the same colors, but in different order or different location. A hue plane pattern match score may be calculated to determine which of these two candidates matches the template image.

A final color match score may be calculated for one or more of the candidate regions. In other words, after the refinement of candidate regions based on the pattern matching, a final color match score may be computed for the refined regions. A total score may then be calculated based at least in part on the luminance pattern match score, the hue plane pattern match score, and the final color match score. The total score may be used to determine a list of final matching regions. Output may be generated indicating these final matching regions, and may also include one or more of the calculated scores for each region.

The color characterization method operates to characterize the colors of an image or region of an image. The image may be obtained in HSI format, or alternatively may be converted from another format to HSI. For example, an image may be acquired in HSI format by National Instruments color image acquisition board PCI-1411. The color characterization method divides the HSI space into n color categories (also referred to as subspaces or bins), where n is the number of color categories of interest. The number of different color categories in the color space may be dependent on a desired complexity of the color characterization.

In one embodiment, the color characterization analysis method performed for the template image and for target image regions is as follows. For each image object pixel in the image or region, the method determines a color category for the respective pixel based on values of the respective pixel, i.e., hue, saturation and intensity values, wherein the color category is one of a plurality of possible color categories or bins (or subspaces) in the HSI space. The number of pixels assigned to each category is then counted and normalized by the total number of pixels in the selected region of interest (or entire image), i.e., the percentage of pixels in each color category characterizes the colors of the image or ROI. In other words, the percentage of pixels in each color category characterizes the colors of the image. The percentage of pixels in each color category may also be used as a quantitative measurement of the color distribution of the image.

In various embodiments, fuzzy membership functions may be applied to determine a desired distribution of pixels among color space bins. For example, pixels may be assigned to multiple bins during the color characterization method, e.g., on a fractional weighted basis. This increased complexity may result in more accurate color match location results. For each pixel, a fuzzy membership function may be applied, based on where the pixel falls within the bin. This fuzzy membership function may determine a contribution which the pixel should make to one or more neighboring bins. For example, if the pixel falls near the edge of a bin (with respect to the portion of the color space that the bin corresponds to), then the fuzzy membership function may determine that a portion of the weight of the pixel should be contributed to the neighboring bin which the pixel is near. The function may determine a contribution which the pixel should make to any number of bins, wherein the sum of these contributions is 100%. Any of various types of fuzzy membership functions may be applied, including, triangle fuzzy membership functions, trapezoid fuzzy membership functions, and step fuzzy membership functions.

The first pass color match location method may use the color characterization method described above. Once the color information of a template image has been characterized, a target image may be searched in order to locate regions within the target image having matching color information.

In one embodiment, a coarse-to-fine heuristic may be utilized, in which multiple passes of decreasing granularity are performed. A first-pass search may operate to identify a list of candidate match regions. For example, the target image may be stepped across at a step interval, wherein color information of a target image region is characterized at each step, using the color characterization method described above. For each target image region, a measure of difference between the color characterization information of the target image region and the color characterization information of the template image may be calculated. If this difference is smaller than a threshold value, then the target image region may be added to a list of candidate regions.

For each candidate region, a larger area (region) proximal to (and including) the candidate region may then be searched, e.g., by stepping through the proximal area using a smaller step size than was used in the first-pass search. At each step, color information of a target image region within the proximal area may be characterized and compared to the template image color information. The target image region within the area proximal to the initial candidate region that best matches the color information of the template image may be considered a second-pass candidate region. The matching criteria used to determine whether a target image region is a second-pass candidate region are preferably stronger than the criteria used in the first-pass search, e.g., the value calculated as the difference between the color information of the target image region and the color information of the template image may be smaller than a threshold value used in the first-pass search. In one embodiment, a hill-climbing algorithm may be used to search the proximal region to locate a best match location or sub region. The coarse-to-fine heuristic mentioned above may include using a coarse hill-climbing approach to generate the first pass candidate match regions, then using a fine hill-climbing approach to determine second-pass candidate match regions, i.e., refined candidate regions.

The process described above may be repeated for as many repetitions as desired. With each repetition, the step size used is preferably smaller and the measure of color difference preferably is smaller in order for a region to be considered a candidate, e.g., until a predetermined number of search passes are performed or until step sizes are as small as possible and/or matching criteria are as strict as possible. Once the final repetition is performed, any target image regions that still remain as candidate matching regions may be used in the next phase of the matching process, e.g., in the luminance pattern matching.

For each candidate color match region, information obtained in a pattern characterization method performed on the template image may then be used to perform a luminance pattern-matching method in a larger region proximal to or surrounding the candidate color match region. In other words, a grayscale pattern matching search may be performed to determine whether any of the selected images includes the object(s) of the template image. Note that this search is based on form or structure rather than on non-gray-scale colors. For example, the luminance pattern-matching search may determine characteristic components, boundaries, and/or edges for comparison with the template image. Once the luminance pattern matching search is done, the remaining candidate target image regions may be used in the next phase of the matching process, e.g., in the hue plane pattern matching. In one embodiment, hill-climbing algorithms, as described above, may be used in the luminance pattern matching search.

After luminance pattern matching has been performed, the method may then optionally calculate a hue plane or color-based pattern match score. This step is performed to assure that colored components of a selected image are in the correct locations per the template image. For example, in a case involving the identification of electrical resistors, two resistors selected by the color characteristic search and the luminance search may have stripes of the same colors, but in different orders. The hue plane pattern match score may determine which of these two candidates matches the template image, or may determine which has the proper orientation.

It is noted that in various embodiments of the invention, the order of these successive matching processes may differ. In various applications, particular search orders may be more effective or efficient than others. For example, after the color characterization search, the hue plane pattern match score may be calculated, followed by the luminance pattern-matching search.

In one embodiment, a pattern characterization method may be performed on the template image which comprises sampling the template image using a Low Discrepancy sequence, also referred to as a quasi-random sequence, to determine a plurality of sample pixels in the template image which characterize the pattern information of the template image. This sample information may be stored for later use. In various embodiments, the template image may be sampled in different color space planes. For example, in one embodiment, the image may be sampled in each of the hue plane, saturation plane, and/or luminance plane.

The Low Discrepancy sequence may be designed to produce sample points which maximize the distance between sample points. Also, the Low Discrepancy sequence sampling may result in fewer points and/or a better characterization of the template image pattern information than a random sequence sampling or a uniform sampling. Examples of the Low Discrepancy sequence include Halton, Sobol, Faure, and Niederreiter sequences. The sampling or characterizations of the template image pattern and color information are preferably performed off-line prior to receipt of a target image. Thus, the analyses of the template image are preferably not constrained by real time requirements. After the candidate color match regions have been determined, pattern information of a region proximal to or surrounding each color match region may be compared to the pattern information of the template image, using the sample points determined in the pattern characterization method. Thus each of the luminance pattern matching and the hue plane pattern matching may use respective sets of sample pixels in the analysis.

In another embodiment, the pattern characterization may involve sampling the template image, wherein the template image comprises a first plurality of pixels, and wherein the sampling produces a second lesser number of sample pixels. This sampling may use any of various sampling techniques, including a Low Discrepancy sequence as described above. A local stability analysis may then be performed around at least a subset of the sample pixels to determine a lesser third number of sample pixels which have a desired degree of stability. The local stability analysis operates to ensure stability of each of the subset of sample pixels to spatial perturbations around the sample pixel. For each pixel, the local stability analysis preferably comprises finding a neighborhood around the sample pixel where the value, e.g., the grayscale value, of the sample pixel correlates highly with the template image pixel values in the neighborhood. The local stability analysis is preferably performed for all of the sample pixels. The third plurality of sample pixels may then be used in the pattern matching.

In one embodiment, the local stability analysis determines a plurality of sets of sample pixels with differing stability neighborhood sizes, and the pattern matching performed for each region surrounding a candidate color match region comprises performing a plurality of iterations of pattern matching using different sets of sample pixels. The iterations are preferably performed in a coarse to fine manner, e.g., using sets of sample pixels with successively smaller stability neighborhood sizes. This plurality of iterations of pattern matching may also use different step sizes for each of the different sets of sample pixels, wherein the step size preferably corresponds with the stability neighborhood size. Thus the plurality of iterations of pattern matching in the coarse to fine manner preferably uses sets of sample pixels with successively smaller stability neighborhood sizes and/or successively smaller step sizes. For example, a first iteration of pattern matching may determine one or more candidate pattern match regions in the region which possibly match the pattern information of the template image, and one or more second iterations of pattern matching may then be performed at the determined one or more candidate pattern match regions in the region, and so on.

In one embodiment, calculating the hue plane pattern match score for a region may be similar to calculating a luminance pattern match score, except that color information may be used instead of gray-scale information. In other words, a pattern match score may be calculated from the pixel color data, as opposed to the pixel gray-scale, or luminance, data. In one embodiment, edge pixels in the hue plane patterns may be omitted from the score calculation. Said another way, due to complexities in hue plane edge conditions, only interior pixels (of hue plane patterns) may be used to calculate the hue plane pattern match score. Thus, the hue plane pattern match score may indicate the degree to which the locations of colored areas agree with the template image.

The techniques described herein may also be used to perform pattern matching to locate one or more instances of a rotated or scaled color template image in a color target image. The pattern characterization of the template image may comprise first sampling the template image along one or more rotationally invariant paths, preferably circular perimeters, to produce one or more sets of sample pixels. The pattern matching performed may then use a cyclic correlation between each of the one or more sets of sample pixels and the target image to determine zero or more regions of the template image in each region surrounding a color match candidate region. This pattern matching detects rotated versions of the template image in the target image. Similar techniques may also be used to detect scaled versions of the template image in the target image.

In one embodiment, a graphical user interface (GUI) may be associated with color and pattern match location software. A brief description of applicable GUI elements is given below. It is noted that various other embodiments of such a GUI may comprise GUI elements enabling the user to specify variables affecting the color and pattern match location operation at a broader or finer level of granularity than the GUI described herein. Various exemplary fields and options presented by such a GUI are described below:

"Image Type" displays the color format of the current target image (e.g., RGB, CMY, or HIS).

"Learn Mode" specifies the invariant features to learn when setting up a learn color pattern, such as: "All" (extracts template information for shift and rotation invariant matching; "Shift Information" (Default, extracts information for shift invariant matching); "Rotation Information" (extracts information for rotation invariant matching).

"Ignore Black and White" enables the user to specify that pixels classified as black and/or white are ignored in the match location operation. "Feature Mode" specifies the features to use in the searching stage, such as: "Color" (use color features only in the searching stage); "Shape" (use shape features in the searching stage); and "Color and Shape" (Default, use both color and shape features in the searching stage).

"Color Sensitivity" specifies a level of color sensitivity ("low", "medium", or "high"). This setting may affect the number of color category divisions to use.

"Search Strategy" specifies the different searching algorithms to achieve a tradeoff between search speed and accuracy. The default option is "Balanced". In case the speed does not meet requirements, the "Aggressive" option may be used. In case the accuracy does not meet requirements, the "Conservative" option may be used.

"Number of Matches Expected" specifies a number of matches expected to be found in the target image, which may be used in limiting the number of target image regions searched.

"Match Mode" specifies the technique to use when looking for the template pattern in the image, for example: "Shift Invariant" (default, searches for the template pattern in the image, assuming that it is not rotated more than ±4°); "Rotation Invariant" (searches for the template in the image with no restriction on the rotation of the template).

"Minimum match score" specifies a threshold value for color matching scores. The data range is between 0 and 1000.

The GUI may also include various fields for viewing information for each matching region of the target image, once the search has been performed, such as the location and size of the region, a match score indicating how close the color information of the region matches the color information of the template image, etc.

In one embodiment, an application may be operable to display information representing the color characterization of an image or portion of an image, such as the percentage (vertical scale) of 16 defined colors (horizontal scale) as determined by one embodiment of the color characterization method described herein.

The color characterization list or data structure may further be operated upon to create a color characterization represented as a single value. The color characterization may also be represented textually (e.g., by the terms brick red, jet black, mauve, etc.) through the use of a look-up table configured according to the color categorization method of the present invention. The color characterization may also be represented graphically in various ways. The color characterization may be stored along with the image or transmitted to other computer systems for analysis or display. The color characterization may also be used as part of an image compression technique.

A software application using the color location method described above may be operable to visually indicate the locations of the match regions determined by the method. For example, the application may display a box around each match region. The application may also be operable to display various statistics regarding each match region found.

Thus, in various embodiments, the method operates to locate regions of a target image that match a template image with respect to color and pattern information. The method may comprise performing a color matching search through the target image in order to find one or more color match regions, wherein the color match color regions match the template image with respect to color information. The method also may perform a luminance pattern matching search through each of the color match regions in order to find one or more pattern match regions in the target image. The method may then perform a hue plane pattern matching search on the pattern match regions to determine regions which match the template image in both color and pattern. As described above, the color matching search and the pattern matching search may be performed in any of various desired orders.

BRIEF DESCRIPTION OF THE DRAWINGS

A better understanding of the present invention can be obtained when the following detailed description of the preferred embodiment is considered in conjunction with the following drawings, in which.

Figure 1:
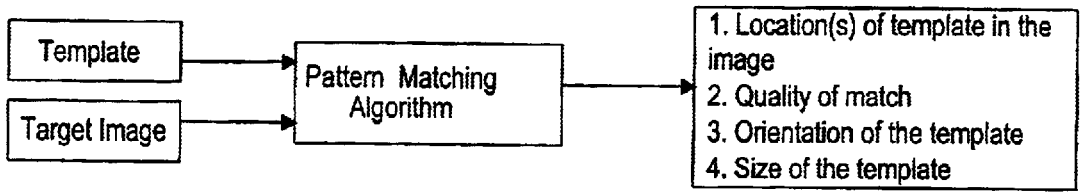
FIG. 1 illustrates pattern matching as performed in prior art.
Figure 2:
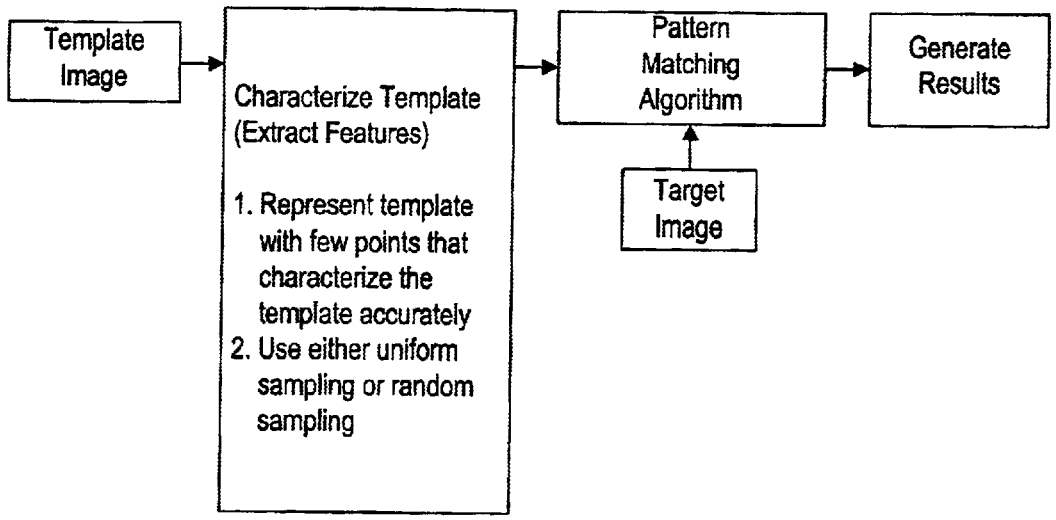
FIG. 2 illustrates pattern matching performed in prior art, which includes characterization of the template image with fewer pixels for reduced computation.

While the invention is susceptible to various modifications and alternative forms specific embodiments are shown by way of example in the drawings and are herein described in detail. It should be understood, however, that drawings and detailed description thereto are not intended to limit the invention to the particular form disclosed. But on the contrary the invention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following patent applications are hereby incorporated by reference in their entirety as though fully and completely set forth herein:

U.S. patent application Ser. No. 09/375,453 titled "System and Method for Color Characterization with Applications in Color Measurement and Color Matching" filed on Aug. 17, 1999, whose inventors are Siming Lin and Dinesh Nair;

U.S. patent application Ser. No. 09/227,506 titled "Pattern Matching System and Method Which Performs Local Stability Analysis for Improved Efficiency" filed on Jan. 6, 1999, whose inventors are Dinesh Nair, Lothar Wenzel, Nicolas Vazquez, and Samson DeKey;

U.S. patent application Ser. No. 09/639,420 titled "System and Method for Locating Color Match Regions in a Target Image," filed on Aug. 14, 2000, whose inventors are Dinesh Nair, Siming Lin, and Darren Schmidt;

U.S. patent application Ser. No. 09/638,271 titled "System and Method for Locating Color and Pattern Match Regions in a Target Image," filed on Aug. 14, 2000, whose inventors are Dinesh Nair, Siming Lin, Darren Schmidt, and Nicolas Vazquez;

U.S. patent application Ser. No. 09/374,453 titled "System and Method for Color Characterization with Applications in Color Measurement and Color Matching," filed on Aug. 16, 2000, whose inventors are Siming Lin and Dinesh Nair;

U.S. patent application Ser. No. 09/737,531 titled "System and Method for Color Characterization Using Fuzzy Pixel Classification with Application in Color Matching and Color Match Location," filed on Dec. 13, 2000, whose inventors are Siming Lin and Dinesh Nair.

The National Instruments IMAQ™ IMAQ Vision Concepts Manual is hereby incorporated by reference in its entirety as though fully and completely set forth herein.

Figure 3:
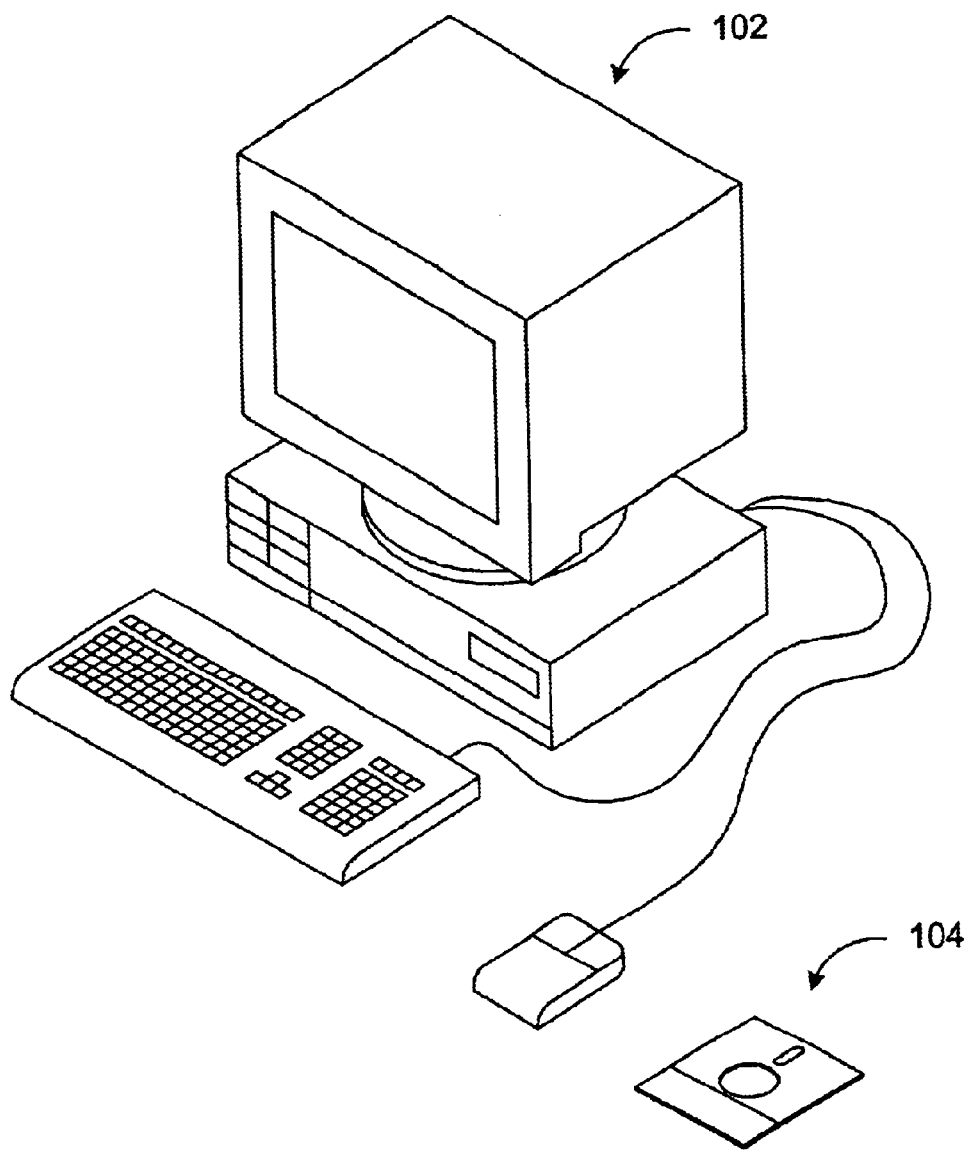
FIG. 3 illustrates a computer system suitable for performing color and/or pattern matching according to one embodiment of the present invention.

FIG. 3—Computer System

FIG. 3 illustrates a computer system 102 which may perform color and/or pattern match location according to one embodiment of the present invention. The computer system 102 may comprise one or more processors, a memory medium, display, and an input device or mechanism, such as a keyboard or mouse, and any other components necessary for a computer system.

The computer system 102 may perform a color characterization method and/or a pattern characterization method of a template image and may use information determined in these analyses to determine whether a target image matches the template image and/or to locate regions of the target image which match the template image, with respect to color and/or pattern information. Images that are to be matched are preferably stored in the computer memory and/or received by the computer from an external device.

The computer system 102 preferably includes one or more software programs operable to perform the color and/or pattern match determination and/or location. The software programs may be stored in a memory medium of the computer system 102 The term "memory medium" is intended to include various types of memory, including an installation medium, e.g., a CD-ROM, or floppy disks 104, a computer system memory such as DRAM, SRAM, EDO RAM, Rambus RAM, etc., or a non-volatile memory such as a magnetic medium, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The software program(s) may be implemented in any of various ways, including procedure-based techniques, component-based techniques, graphical programming techniques, and/or object-oriented techniques, among others. For example, the software program may be implemented using ActiveX controls, C++ objects, Java Beans, Microsoft Foundation Classes (MFC), or other technologies or methodologies, as desired. A CPU, such as the host CPU, executing code and data from the memory medium comprises a means for performing color and/or pattern match location according to the methods or flowcharts described below.

Figure 4:
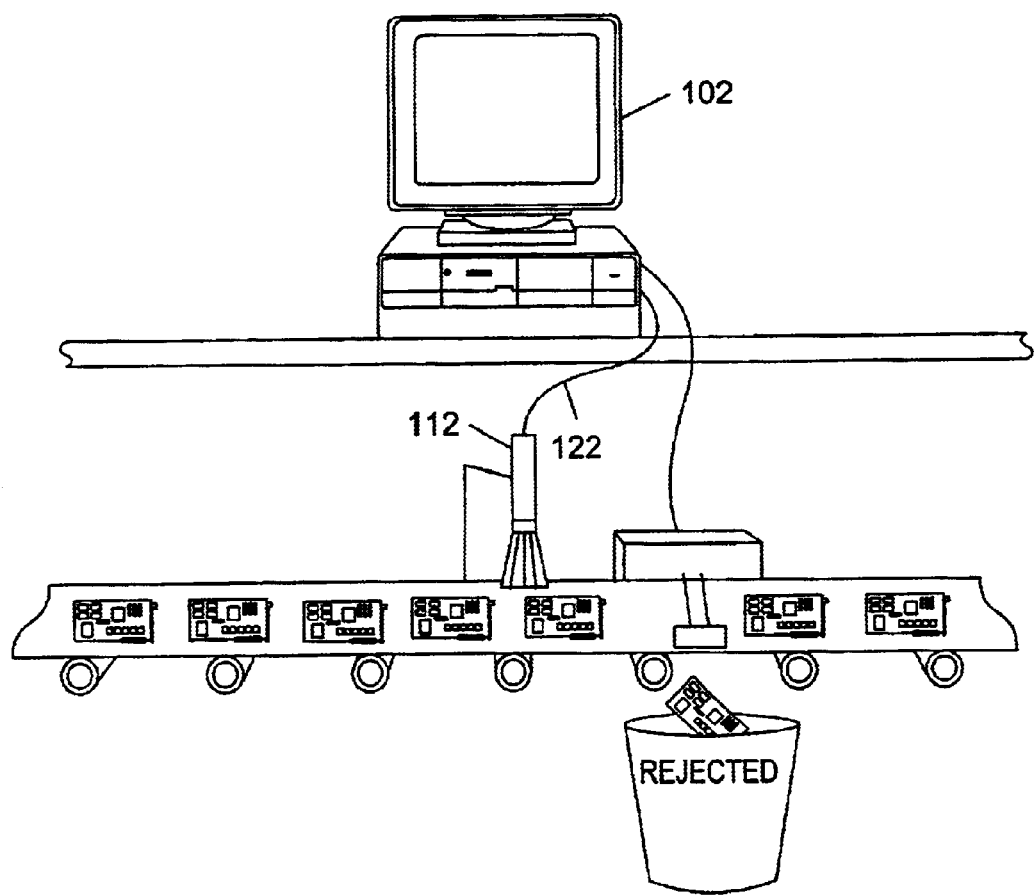
FIG. 4 illustrates an image acquisition (video capture) system for acquiring images.

FIG. 4—Machine Vision System

FIG. 4 illustrates a machine vision system or image acquisition system, which is an example of one application of the present invention. The color and/or pattern match determination/location techniques described herein may be used in various types of machine vision or motion control applications. For example, the computer 102 may be embodied in various form factors and/or architectures, e.g., a robot or embedded device, among others. It is also noted that the color and pattern match location techniques described herein may be performed in any of various manners, either in software, programmable logic, or hardware, or a combination thereof.

In the machine vision system of FIG. 4, computer system 102 is coupled to a camera 112 and operates to receive one or more images. The computer system 102 may be operable to perform a color characterization method to characterize the colors in a template image and/or may be operable to perform a pattern characterization method to determine pattern information of the template image. In the present application, the term "template image" is used to refer to either an entire image, or a portion of an image, e.g., a region of interest (ROI). The computer system 102 may also be operable to perform a search of a target image to locate target image regions that match the color and/or pattern information of the template image. As described below, the search may be performed to locate matching regions with any of various degrees of exactness, as appropriate for a particular application.

Figure 5:
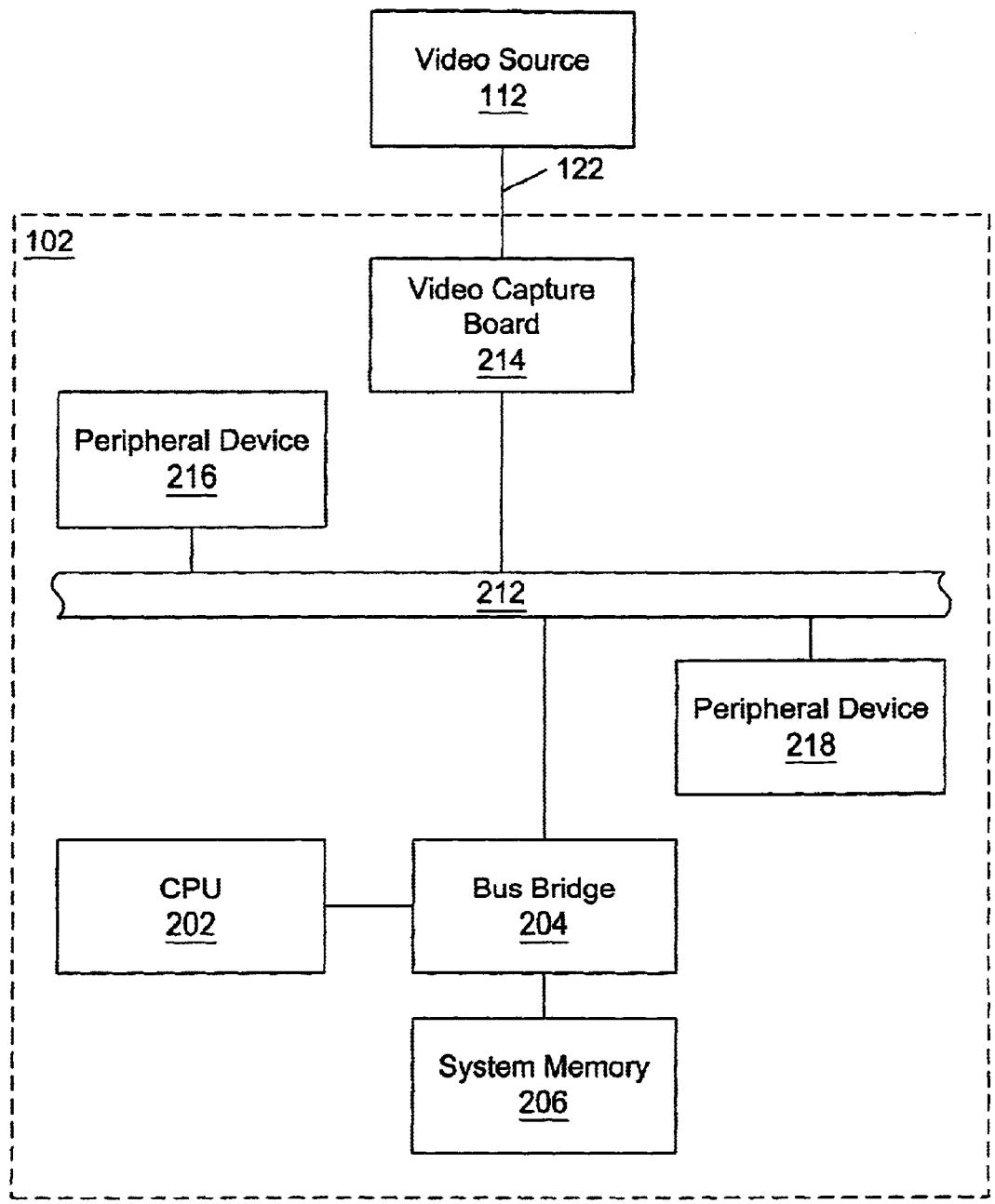
FIG. 5 is a high-level block diagram of the image acquisition system.

FIG. 5—Image Acquisition System Block Diagram

FIG. 5 is a high-level block diagram of the image acquisition system of FIG. 4 for acquiring an image for color and/or pattern matching according to one embodiment of the present invention. It is noted that the block diagram of FIG. 5 is exemplary only, and other computer system architectures may be used as desired. For example, the present invention may be implemented in a "smart camera", which integrates a sensor, analog to digital (A/D) converter, CPU, and communications devices together in a single unit. The present invention may be embodied in other architectures, devices, or embodiments, as desired.

As shown in FIG. 5, the host computer 102 preferably comprises a CPU 202, a bus bridge 204, system memory 206, and a peripheral bus 212. The CPU 202 is coupled to the bus bridge 204. The bus bridge 204 is coupled to the system memory 206 and the CPU 202, and couples to the peripheral bus 212. In the preferred embodiment, the peripheral bus 212 is the PCI expansion bus, although other types of buses may be used.

In this embodiment, the host computer system 102 also includes a video capture board 214 which is adapted for coupling to the video source 112. The video capture board 214 is preferably coupled to the peripheral bus 212. In addition to the video capture board 214, other peripheral devices (216 and 218) may be coupled to the peripheral bus 212, such as audio cards, modems, graphics cards, network cards, etc.

The video source 112 supplies the analog or digital video signals to the video capture board 214. The video capture board 214 transfers digitized video frames to the system memory 206 through peripheral bus 212 and bus bridge 204. In this embodiment, the video capture board 214 acquires the target image and transfers it to system memory 206. One or more regions of interest (ROI) may be specified in the target image which are desired to be searched for regions having color and pattern information that matches the color and pattern information of a template image, or the entire target image may be searched.

The system memory 206 may store a template image. The system memory 206 may also receive and/or store one or more other images, such as selected ROIs in the template image or another image, or acquired target images. The system memory 206 also preferably stores software according to the present invention which operates to analyze the color and pattern information of the template and target images. The software may also be executable to perform various color and pattern match location methods, as described below. The system memory 206 may store the color characterization and/or pattern information of the template image for comparison to various regions in the target image during the color and pattern match location process.

The term "image," as used herein, may refer to any of various types of images. An image may be obtained from any of various sources, including a memory medium. An image may, for example, be obtained from an image file, such as a BMP, TIFF, AIPD, PNG, JPG, or GIF file, or a file formatted according to another image format. An image may also be obtained from other sources, including a hardware device, such as a camera, frame grabber, scanner, etc. An image may be a complex image, in which pixel values have a real part and an imaginary part.

It is noted that, in a color/pattern match application, the color characterization and/or pattern information of the template image may be pre-calculated and stored in the computer, and the actual template image is then not required to be stored or used for subsequent color and pattern match determination/location operations with respective target images. Thus, when a target image is acquired, the software may compare the color and pattern information of the target image with the pre-computed color and pattern information of the template image.

The present invention is preferably implemented in one or more software programs which are executable by a processor or CPU. The software program(s) of the present invention are preferably stored in a memory medium of a computer as described above.

Figure 6:
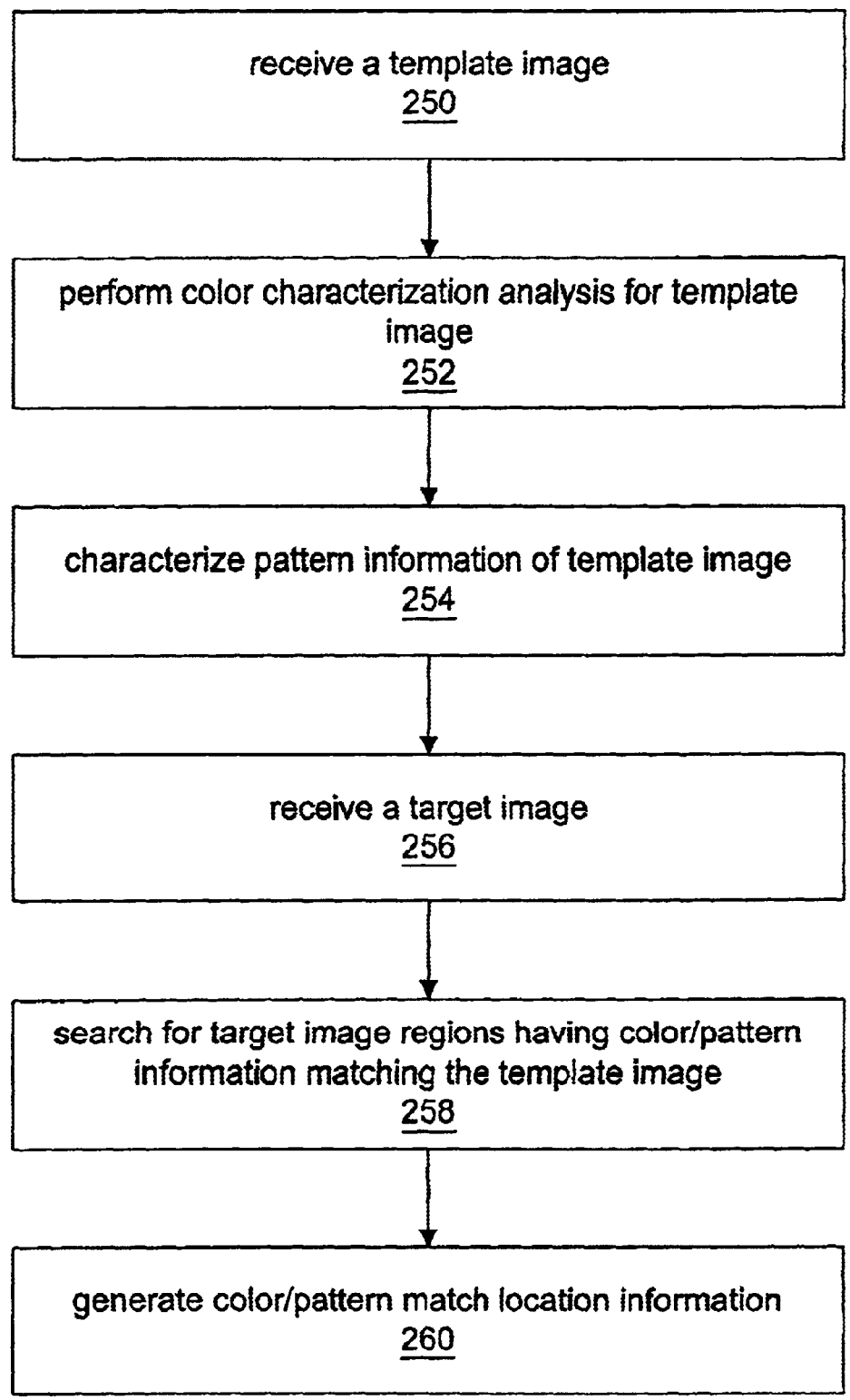
FIG. 6 is a flowchart diagram illustrating one embodiment of a method for locating regions of a target image that match a template image, with respect to color and pattern information.

FIG. 6—Color and Pattern Match Location Method

FIG. 6 is a flowchart diagram illustrating one embodiment of a method for locating regions of a target image that match a template image, with respect to color and pattern information.

In one embodiment, the method operates to locate regions of a target image that match a template image with respect to color and pattern information. This method may comprise performing a color matching search through the target image in order to find one or more color match regions, wherein the color match color regions match the template image with respect to color information. The method also may perform a pattern matching search through the target image in order to find one or more pattern match regions in the target image. The method may then determine one or more match regions from the one or more color match color regions and the one or more pattern match regions. For example, the method may correlate the one or more color match color regions and the one or more pattern match regions to determine regions that have both color match and pattern match characteristics according to a desired degree or metric. The color matching search and the pattern matching search may be performed in any of various desired orders.

Thus, for example, the color matching search may be performed first to identify candidate regions, followed by the pattern matching search. In this embodiment, the pattern matching search through the target image comprises, for each color match region found in the color matching search, performing a pattern matching search of a proximal (i.e., surrounding and encompassing) region proximal to the color match region in order to find one or more final match regions in the target image. The one or more final match regions found in the pattern matching search of each proximal region match the template image with respect to color and pattern information according to a desired degree.

Alternatively, the pattern matching search may be performed first to identify candidate regions, followed by the color matching search. In this embodiment, the color matching search through the target image comprises, for each pattern match region found in the pattern matching search, performing a color matching search of a proximal region proximal to the pattern match region in order to find one or more final match regions in the target image. The one or more final match regions found in the color matching search of each proximal region match the template image with respect to color and pattern information according to a desired degree.

The color and pattern matching searches may also be interleaved in various ways, as is desired. The following describes one embodiment of the present invention.

In step 250, a template image may be received. The template image may be an image of any of various types, as described above. The template image may be received or obtained from any of various sources and may be an entire image or may be a portion of an image, e.g., a region of interest specified by a user. For example, a user may select a region of interest (ROI) using a graphical user interface (GUI). In one embodiment, a GUI may enable the user to choose from many different shapes of ROIs, such as a rectangle, an oval, or a shape selected freehand.

In step 252, a color characterization method may be performed for the template image. In one embodiment, this method may involve dividing the HSI color space into a number of categories or "bins". The color information of the template image pixels may then be examined in order to determine the allocation of the pixels across the bins. One particular embodiment of step 252 is described in detail below. In alternative embodiments, any of various other methods may be used as the color characterization method.

In step 254, a pattern characterization method may be performed for the template image. This method may involve determining a plurality of sample pixels, or a set of pluralities of sample pixels, that characterize the pattern information of the template image well. Particular embodiments of step 254 are described in detail below.

In step 256, a target image may be received. Similarly as for the template image, the target image may also be an image of any of various types, including an image obtained from a memory medium or an image acquired from a hardware device, such as a camera, frame grabber, scanner, etc. The target image may also be received from any other source, including from a graphics software program, from transmission via a network, etc. A target image may also be an entire image or only a portion of an image.

It is noted that in alternative embodiments, multiple template images and/or target images may be received or specified. For example, it may be desirable to search multiple target images for regions having color and pattern information matching that of a template image, or it may be desirable to search for target image regions matching any of a plurality of template images.

In step 258, the target image may be searched in order to locate regions that match the template image with respect to color and pattern information. This search may utilize the color characterization and pattern information of the template image obtained in steps 252 and 254 and may also involve performing color characterization analyses for various regions of the target image. Step 258 may be performed in any of various ways. In one embodiment the target image may be searched in multiple passes. The first pass may involve a search based on color information to efficiently identify a list of candidate regions in the target image matching the template image with respect to color. Subsequent passes may then use pattern information or pattern matching to examine regions proximal to or surrounding each of the color match candidate regions ("proximal regions" or "surrounding and encompassing regions") more closely in order to determine final matches or final match regions in the target image.

The proximal regions are preferably larger than the color match candidate regions, i.e., each proximal region preferably surrounds and includes its corresponding color match candidate region. Alternatively, the proximal regions may be the same size as, or possibly smaller than, the respective color match candidate regions.

The zero or more match regions found in the pattern matching search of each proximal region may match the template image with respect to color and pattern information according to some desired metric or degree of closeness. One specific embodiment of step 258 is discussed in detail below.

In step 260, color and pattern match location or analysis information may be generated based on the results of step 258. Step 260 may involve displaying information, such as visually indicating the location or orientation of the match regions within the target image, and/or displaying information indicating various statistics or graphs regarding the color and/or pattern information of the match regions or regarding how closely the regions match the color/pattern information of the template image.

In many applications, it is necessary or desired to perform the color and pattern matching in real time when the target image is acquired. In machine vision applications, "real time" often refers to "video real time", i.e., to performing the function for every single image acquired by the camera, e.g., for a NTSC camera that acquires 30 frames/second. For example, in the machine vision embodiment shown in FIG. 4, the color and pattern matching is preferably performed in real time when the target image is acquired by the camera 112. In these real time embodiments, the template image may be pre-stored in the computer 102, and there is generally a large amount of time in which to characterize the color and pattern information of the template image. Once these characterizations have been performed, the system can perform the color and pattern matching methods a plurality of times for a plurality of acquired target images, preferably in real time.

Figure 7:
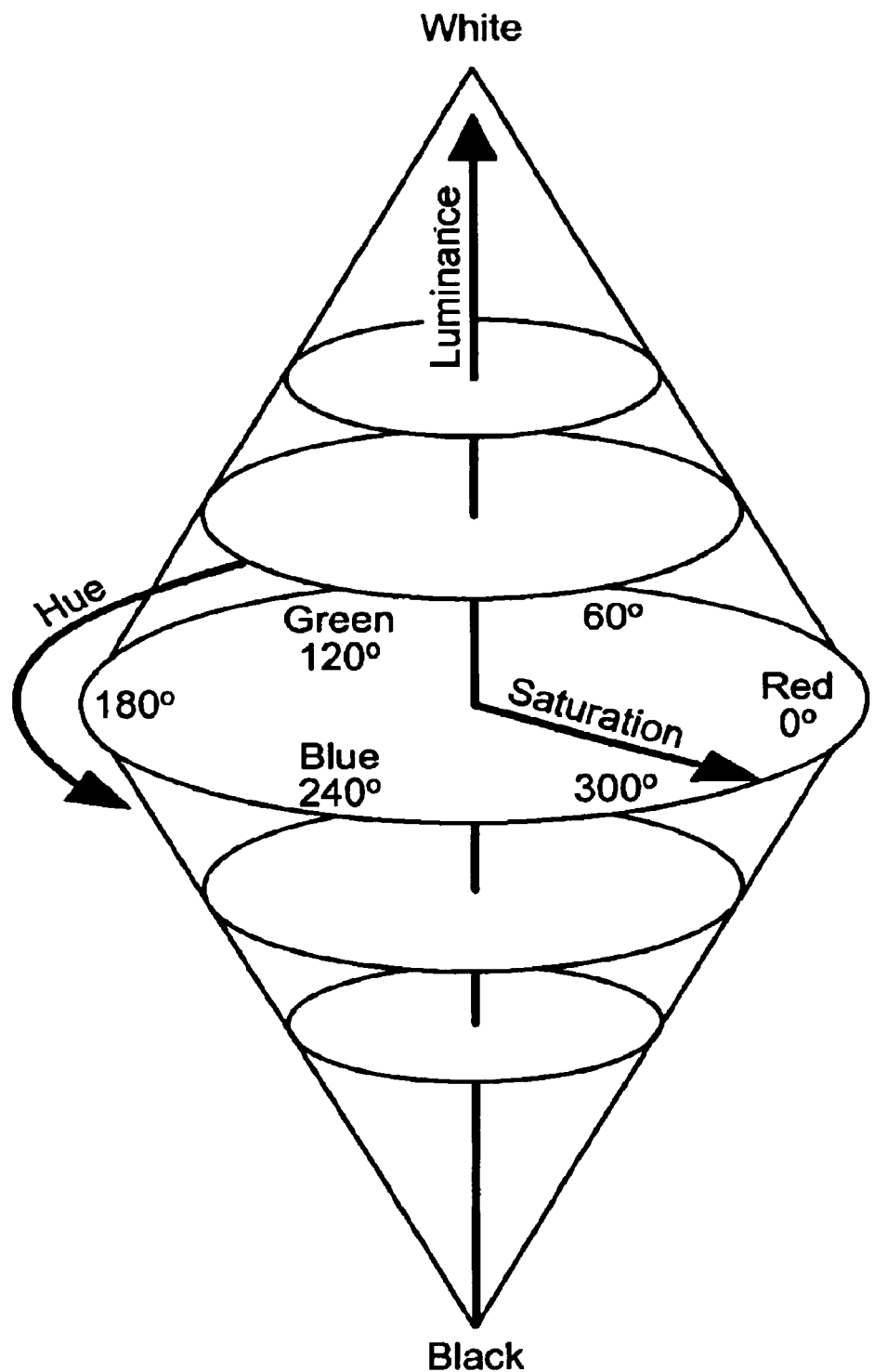
FIGS. 7, 8A, and 8B are graphical representations of HSI color space and HSI color space partitioning.
Figure 8A:
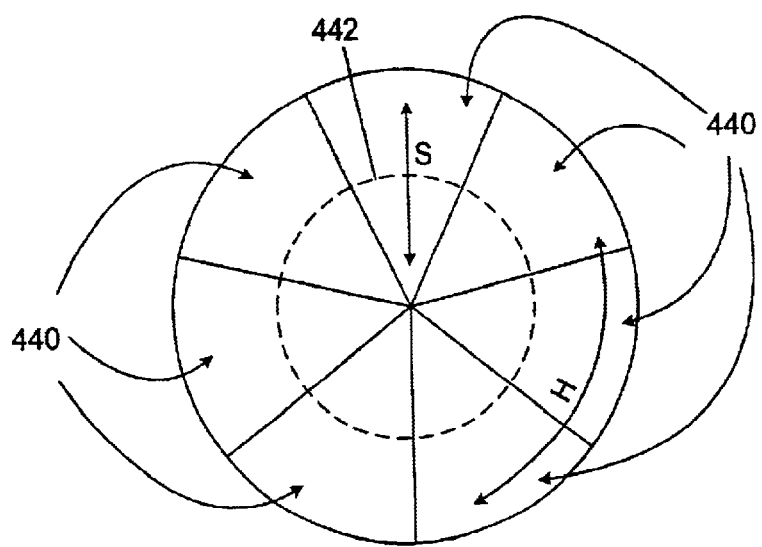
Figure 8B:
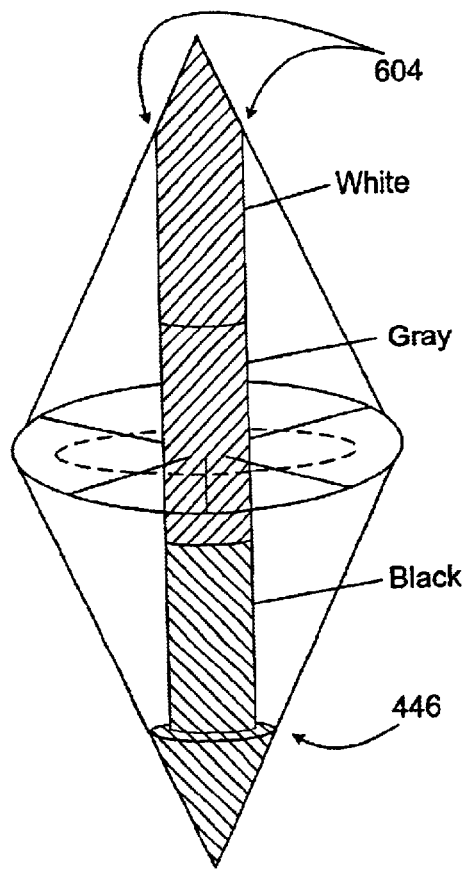

FIGS. 7, 8A, 8B—HSI Color Space

In one embodiment, characterizing the color information of a template image and/or target image may utilize HSI (hue, saturation, intensity) information. The HSI information of individual pixels of an image may be analyzed, and the pixel-specific results may be compiled in order to characterize the image based on color. In one embodiment, the color characterization method divides the color spectrum or color space into categories or "bins" (also called subspaces), primarily according to hue and saturation values, and then operates to assign pixels to respective ones of these bins. The total number of pixels (or percentage of pixels) in an image that fall into each category or bin of the color spectrum may then be used as the basis of the color characterization.

FIG. 7 illustrates the possible hue, saturation, and intensity values (the color spectrum) as a 3-dimensional space or volume. The color information of a given pixel may be represented as a vector or point within the 3D color space or volume shown in FIG. 7. The vector's location represents the hue, saturation, and intensity of the pixel.

Hue represents the color shade of a pixel and is shown as an angle of a radial line in the circle in FIG. 7. FIG. 8A illustrates a cross section of FIG. 7. As shown in FIG. 8A, hue is represented as an angular value ranging from 0–360 degrees.

Saturation refers to a color's freedom from mixture or dilution with white. Saturation is represented in FIG. 7 as the radial distance of a line on the circle, i.e., the distance from the center of the circle. Saturation may be more easily seen in the cross section of FIG. 8A. Saturation typically is measured in the range of 0 to 1, with 0 being at the center of the circle and 1 being at the outside perimeter of the circle. Thus, hue and saturation are essentially represented in polar coordinates to describe a point or location on the circle of FIGS. 7 and 8A.

Intensity, sometimes referred to as light or luminance, refers to the degree of shade in a pixel and is represented on the vertical scale of FIG. 7, i.e., vector locations above or below the circle. The terms luminance and intensity are interchangeable throughout this description. Intensity values typically range from 0 to 1, with 0 being pure black and 1 being pure white. The intensity value 0 is represented at the apex of the bottom cone, and the intensity value 1 is represented at the apex of the top cone.

Before color characterization occurs, the color space of FIG. 7 may be partitioned into color categories. The color space may be partitioned into any number of categories or bins. The number of categories or bins determines the granularity or resolution of the color characterization. For example, for some applications a large degree of similarity between a template image and a target image region may be desired in order for the target image region to be considered as a match. Thus, a large number of categories or bins may be required in this instance. In various embodiments, user input may be received which specifies the desired complexity of the color characterization. In one embodiment, three possible complexity levels may be specified, these being low, medium, and high.

In the preferred embodiment, the low complexity level comprises 17 possible categories or bins. In the low complexity level, the hue plane (FIG. 8A) is divided into seven different bins 440 for the seven possible natural colors, and the saturation plane is divided into two regions, thereby creating 14 (7×2) bins. The seven possible natural colors comprise the 7 standard colors of the color spectrum, these being: red, orange, yellow, green, blue, indigo and violet. In the low complexity level, the hue plane is divided into seven pie-shaped wedges, and the saturation plane is further subdivided into 2 regions defined by a radial distance threshold 442, preferably 0.3 on a scale from 0 to 1, thereby creating 14 possible categories or bins in the hue/saturation plane. Three additional color categories are allotted for the pixel being characterized as black, gray, or white, thereby creating a total of 17 possible categories (14+3).

FIG. 8B illustrates the areas within HSI color space which may be categorized as either black, gray, or white. In general, the color of a specific pixel may be characterized as black, gray, or white if the saturation value is very low. The black, gray, and white categories are discussed in more detail below.

The medium complexity level may comprise 31 possible categories or bins. In the medium complexity level, the hue plane (FIG. 8A) is divided into 14 different color categories 440 and the saturation plane is divided into two regions, thereby creating 28 (14×2) bins. Thus, in the medium complexity level, the hue plane is divided into 14 pie-shaped wedges, and the saturation plane is further subdivided into 2 regions defined by a radial distance threshold 442, preferably 0.3 on a scale from 0 to 1, thereby creating 28 possible color categories or bins in the hue/saturation plane. Three additional color categories are allotted for the pixel being black, gray, or white, thereby creating a total of 31 possible color categories (28+3).

The high complexity level may comprise 59 possible color categories or bins. In the high complexity level, the hue plane (FIG. 8A) is divided into 28 different bins 440, and the saturation plane is divided into two regions, thereby creating 56 (28×2) bins. Thus, in the high complexity level, the hue plane is divided into 28 pie-shaped wedges, and the saturation plane is further subdivided into 2 regions defined by a radial distance threshold 442, preferably 0.3 on a scale from 0 to 1, thereby creating 56 possible color categories or bins in the hue/saturation plane. Three additional color categories are allotted for the pixel being black, gray, or white, thereby creating a total of 59 possible categories (56+3).

The saturation categorization, i.e., the location of the radial distance threshold 442, is preferably set to a default value, but may also be adjusted by the user setting the Learn Sat Threshold 604. The saturation threshold typically is only adjusted when color characterization is performed on images with little variance in color saturation. In another embodiment, the number of saturation divisions may be increased, for example, to 3 (or more), or may be decreased to 0 (i.e. colors are not divided with respect to saturation level).

Figure 9:
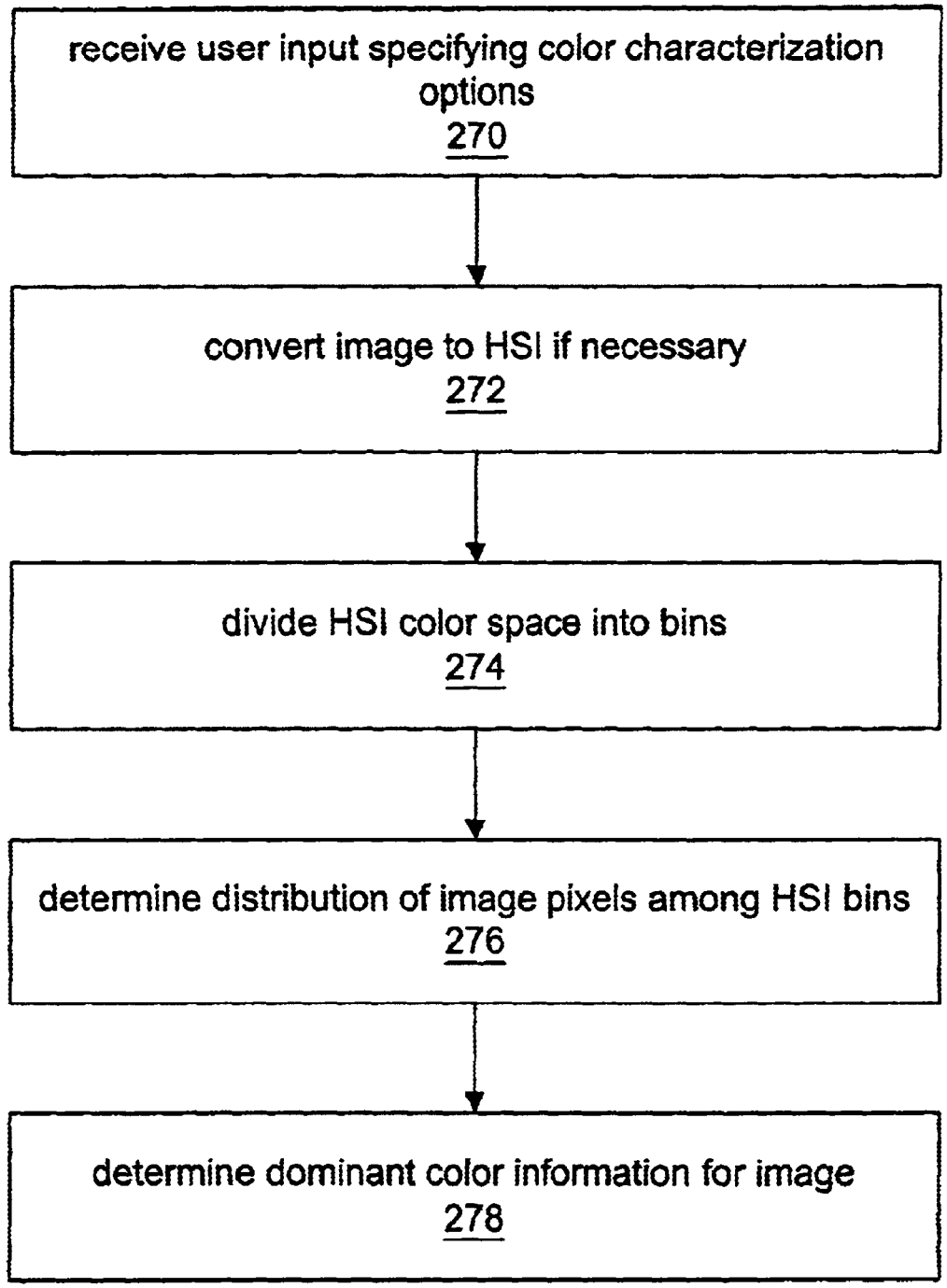
FIG. 9 is a flowchart diagram illustrating one embodiment of a method for characterizing color information of an image.

FIG. 9—Color Characterization Method

FIG. 9 is a flowchart diagram illustrating one embodiment of a method for characterizing color information of a template image and/or a target image. In one embodiment, the color characterization method shown in FIG. 9 may be utilized in step 252 of the flowchart shown in FIG. 6. It is noted that FIG. 9 represents one particular embodiment of a color characterization method. Various applications may require different levels of sensitivity with respect to characterizing colors in a template image and/or classifying target image regions as color match candidate locations. Various applications may also have different computational efficiency requirements. Thus, in alternative embodiments, any of various color characterization methods may be utilized.

It is noted that, for a template image, the color characterization method shown in FIG. 9 may be performed once and the color information for the template image may be stored and used as necessary. For a target image, the method of FIG. 9 may be performed multiple times for various regions of the image as the target image is searched.

The embodiment illustrated in FIG. 9 involves analyzing an image with respect to HSI color information. As shown in step 270, user input may be received which specifies various color characterization method options. For example, the user input may specify a color sensitivity level to use in analyzing the image, i.e., a desired resolution of color information. In one embodiment, the user may select one of three sensitivity levels, these being low, medium, and high. As described above with reference to FIG. 8A, the sensitivity level may determine the number of categories or bins into which to divide the HSI color space. It is noted that the number of color categories may be set to any number or level, as desired.

In step 272, the image may be converted to HSI format. Images are typically stored or received in RGB (Red, Green, Blue), Redness/Greenness, CMY, or HSI format. Thus, if an image is not in HSI format when received, it may be automatically converted to HSI format in step 272. The conversion process, when necessary, may analyze an image pixel by pixel, applying an algorithm that converts the current color format to the HSI format. It is noted that alternative embodiments of color characterization methods may utilize other color representation formats, such as RGB or CMY, among others. In these embodiments, for example, the RGB or CMY color spaces may be divided into color categories or bins, and pixels may be assigned to these bins.

In step 274, the HSI color space may be partitioned into categories or bins, such as described above with reference to FIGS. 7 and 8. The number of bins to divide the space into may utilize color sensitivity information received in step 270.

Figure 10:
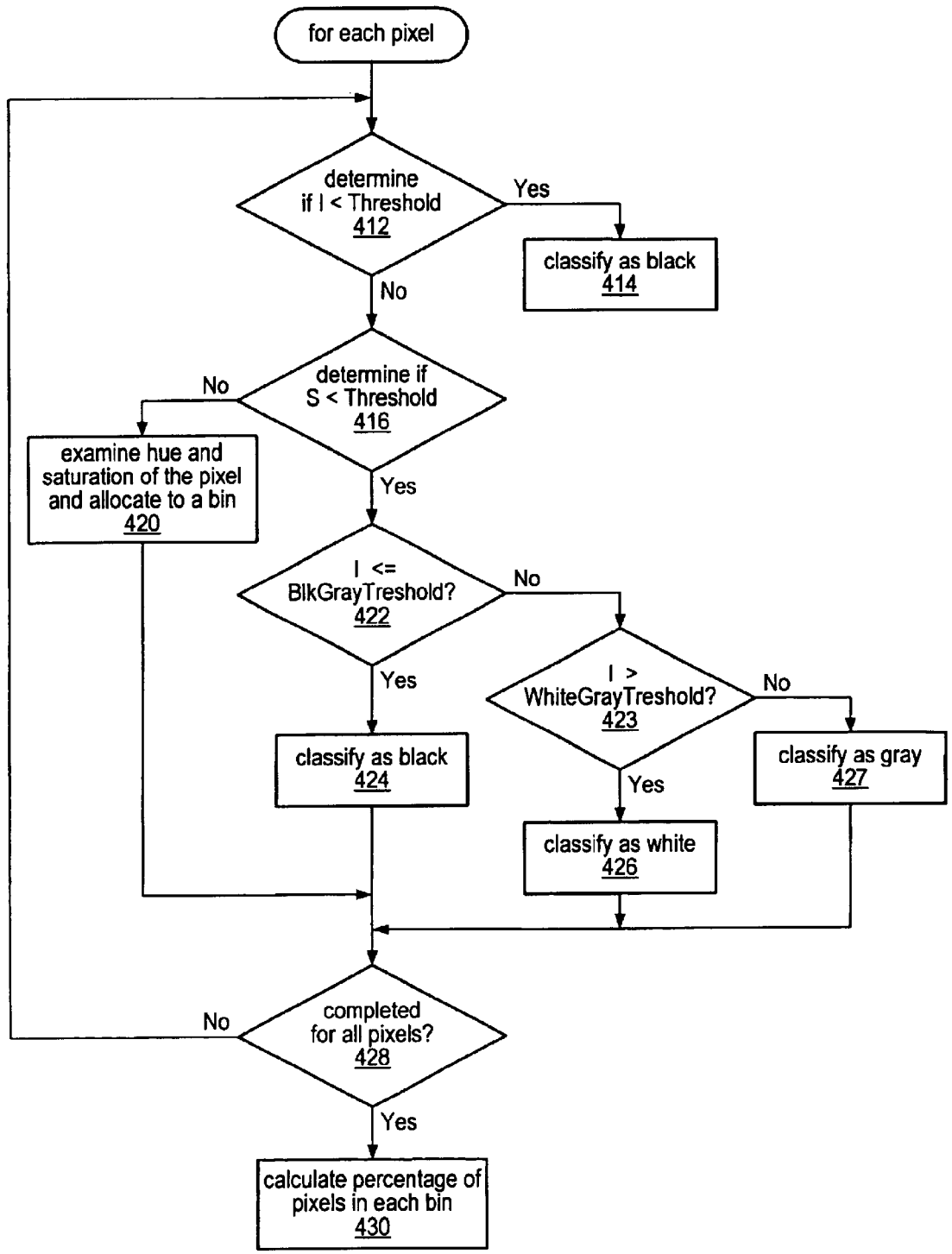
FIG. 10 is a flowchart diagram illustrating one embodiment of determining a distribution of image pixels among HSI color categories.

In step 276, the image may be analyzed pixel by pixel, in order to determine the pixel distribution among the HSI bins. FIG. 10 illustrates one embodiment of step 276 in detail. In one embodiment, the user may specify one or more colors which should be ignored in performing the pixel distribution. For example, the user may specify that black, gray, white or some combination of these or other HSI colors should be ignored. This may be useful, for example, if the template image and/or the target image have background colors that should be ignored for color matching purposes.

In one embodiment, pixels may be examined at the time that the HSI bin distribution is performed, so that pixels corresponding to certain bins are ignored. In another embodiment, this consideration may be performed after the pixel distribution is performed. For example, for each bin corresponding to a color that should be ignored, the number or percentage of pixels assigned to that bin may be set to zero after the distribution is performed, and the pixel percentages in the remaining bins may be normalized to sum to 100 percent. This latter embodiment may result in a more efficient color characterization method.

In the description above, each examined pixel is assigned to a single category or bin. In alternative embodiments, pixels may be assigned to multiple bins, e.g., on a weighted basis. For example, if a pixel falls near an "edge" of a bin, with respect to the portion of color space represented by that bin, then a fraction of that pixel's weight may be assigned to a neighboring bin. The determination on how to distribute a pixel among multiple bins may be performed in any of various ways, including through the use of a fuzzy membership function. It is noted that fractional distribution of pixels may decrease the efficiency of the color characterization method, but may still be desirable in certain cases. Fractional distribution of pixels is discussed briefly below.

In one embodiment the color characterization method may also involve determining one or more color categories which are characterized as dominant color categories of the image, as shown in step 278, wherein the one or more dominant color categories are assigned a relatively larger proportion of image pixels, with respect to other color categories of the color space.

The dominant colors of an image are defined to be the minimum set of colors with the largest bin values whose sum meets or exceeds a specified threshold fraction of the total. For example, if the spectrum bin values for the image are: blue) 0.4, white 0.1, red 0.3, black 0, and yellow 0.2, with a threshold of 0.5, then the dominant colors are blue and red, whose bin value sum is 0.7. The dominant color would be one which represents more than 50% (0.5 bin value) of the image. For example, in a picture of a landscape, the blue of the sky may comprise 60% of the image, giving a bin value of 0.6 for the color blue.

The determination of dominant color categories may be performed in any of various ways. For example, in one embodiment the categories may be sorted with respect to pixel allocation percentage, and the category with the highest percentage may then be examined. If this percentage falls at or above a certain ratio value T, which may be a default value or may be specified by a user, then this color category may be considered as a single dominant color category for the image. If this percentage is below the value T, then the color category with the next largest percentage of pixel allocation may be considered as a second dominant color category for the image, etc., until the sum of the percentages of the examined bins is at or above the value T. Thus, there may be multiple dominant color categories for an image. In one embodiment it may be required that the percentage of pixels in the largest category be at least of a certain threshold value in order for the image to have any dominant color categories.

In the preferred embodiment, the dominant color categories are determined only for the template image, i.e., this computation may be omitted when performing a color characterization analysis of a target image region, in that the target image bins corresponding to the determined template image dominant color bins may be used in comparing the two images. In other words, the dominant colors determined for the template image are utilized or applied when comparing the color information of the template image to the color information of a target image, as described below.

FIG. 10—HSI Bin Pixel Distribution

FIG. 10 is a flowchart diagram illustrating one embodiment of step 276 of FIG. 9, in which pixels of an image are assigned to appropriate HSI space bins. The method shown in FIG. 10 may be performed for each pixel of an image or for only a subset of the pixels. For the template image, the method would typically be performed for each pixel, in order to obtain as much color information for the template image as possible. The color characterization analysis for the template image may only need to be performed once, and may be performed "offline", i.e., does not need to be performed in real time as a target image is searched for color match regions. Thus, once the color characterization information has been obtained for the template image, it may not be necessary to have the template image in memory for a color match location procedure.

For each region of the target image that is searched, it may be desirable to examine only a subset of the region's pixels, since categorizing every pixel of the region into a bin may be computationally expensive, and many regions in the target image may need to be searched. In many cases, analyzing a subset of pixels in each target image region may be sufficient, e.g., in order to perform a coarse grained search that identifies candidate color match regions that can then be analyzed in more detail, based on pattern information. The sample pixel subset may be generated using any of various sampling techniques, such as grid-based sampling, random sampling, low discrepancy sequences, or other non-uniform sampling.

In step 412 the method determines if the intensity value of the pixel is below a certain threshold, which could be specified by the user as some small value close to 0. FIG. 8B illustrates the intensity threshold 446. The intensity threshold 446 is preferably a decreasing function of the saturation. The intensity threshold 446 may be set by the computer or in some embodiments may be selected by the user. In one embodiment, on the assumption that hue, saturation and intensity values have been normalized to range from 0 to 255, the intensity threshold BlkThreshold is specified as a function of the saturation as shown below:

$$BlkThreshold = \begin{cases} 128 & \text{for } sat < 10 \\ (128-5)\exp[-0.025 \times (sat-10)] + 5 & \text{for } 10 \le sat \le 200 \\ 5 & \text{for } 200 < sat \end{cases}$$

If a pixel's intensity is smaller than BlkThreshold, then in step 414 the pixel is immediately categorized as black. In this case, no further color learning is performed on the pixel. The threshold comparison performed in step 412 saves computer cycles by not requiring further HSI analysis on a pixel that is black based strictly on its low intensity. If the intensity value of the pixel is above the intensity threshold of step 412, then operations proceed to step 416, and further color categorizations are applied.

In step 416 the saturation value of the pixel is examined. If the saturation of a pixel is very low, different colors are not distinguishable and the pixel may immediately be categorized as either black, gray, or white. When a pixel's saturation is close to the minimum saturation level, the pixel may be graphically represented near the origin of the circle of FIGS. 8B. Step 416 determines if a pixel's saturation is lower than a selected saturation threshold 604 (FIG. 8B), i.e., is very close to 0. In one embodiment, the Saturation Threshold 604 has a default value of 10 on a scale from 0 to 255 (this corresponds to a default value of 0.04 on a scale from 0 to 1). If the saturation level of a pixel is below the saturation threshold, the pixel does not require further saturation analysis or the hue analysis of step 418 so the process advances to step 422.

In steps 422 and 423, a pixel (which has a very low saturation value) is examined based on its intensity value. A pixel that has very low saturation (i.e. is below the saturation threshold) is categorized as either black, gray, or white based on which half of the intensity plane the pixel resides in. In other words, the hue and saturation analysis of step 420 is not necessary because a pixel with a saturation value less than the saturation threshold is not distinguishable from other pixels with similar saturation values and different hue values. If the pixel is on the lower portion of the intensity plane, i.e., I<=BlkGrayThreshold, the pixel is categorized as black in step 424. Otherwise, the pixel is examined in step 423 to determine whether the intensity value falls on the upper portion of the intensity plane, i.e., I>WhiteGrayThreshold. If so, then the pixel is categorized as white in step 426. Otherwise, the pixel is categorized as gray in step 427. Values for BlkGrayThreshold and WhiteGrayThreshold may be pre-specified based on the importance of black, gray, and white color in the particular application. In one embodiment, the threshold values may be set to divide the intensity plane into three equal portions, which puts the same weight on black, gray, and white colors. After a pixel is categorized as either black, gray, or white, the method continues to step 428.

If the saturation of a pixel is more than the saturation threshold 604 in step 416, then hue and saturation analysis are performed in step 420. In step 420, the hue and saturation values of the pixels are analyzed, and the pixel is assigned to one of the bins in the hue/saturation plane based on these values.

As described above, FIG. 8A illustrates the hue/saturation plane, wherein hue is categorized by a color's angular orientation (from 0 to 360 degrees) on the cross sectional plane of FIG. 8A, and saturation is categorized as the color's radial distance on the cross sectional plane of FIG. 8A. Hue characterization may divide the hue plane into, for example, 7, 14, or 28 bins (for low, medium, or high complexity) depending on a selected color sensitivity, and the bins are further split in half by a radial distance value, represented by circle 442 (FIG. 8A), that allows categorization according to saturation within each hue bin. This doubles the total number of bins, or categories, in the hue/saturation plane to 14, 28, or 56, respectively.

If the current pixel being analyzed is the last pixel to be analyzed as determined in step 428, then operation completes. If not, then operation returns to step 412, and steps 412–428 are repeated. The color categorization process is repeated for at least a subset of the pixels, and possibly every pixel, until all are categorized. As each subsequent pixel is categorized, a running total of the number of pixels assigned to each bin may be stored in memory. Bins and the allocation of pixels to bins may be represented in any of various ways. In the preferred embodiment, the pixels are assigned to N categories or bins, where N=C*2+3 (where C=7, 14, or 28 depending on the selected complexity). The number N of bins or color categories may of course be adjusted by changing one or more of the number of hue divisions and saturation divisions.

After each pixel has been examined and assigned to one of the N categories, in step 430 the method may calculate color parameters, such as the percentage of pixels in each bin, i.e., the number of pixels in each bin in relation to the total number of pixels examined. These calculations will result in N percentages whose sum is equal to 100%. Percentages are used, rather than raw data, to allow matching of differently shaped, scaled and rotated images. It is noted that other types of color parameters may be generated, e.g., other types of normalized values which are independent of the number of pixels in the image object. The color characterization for the image thus may produce a list or data structure that contains N percentage values or parameters representing the color characterization of the image.

As noted above with reference to FIG. 9, in one embodiment, a user may specify one or more colors in the image to be ignored. In this case, the percentage of pixels in each bin corresponding to an ignored color may be set to zero, and the percentages for the remaining bins may be normalized to result in a total of 100%, or pixels corresponding to these bins may not be assigned to the bins a tall, which would automatically result in a zero percentage for these bins.

Figure 11:
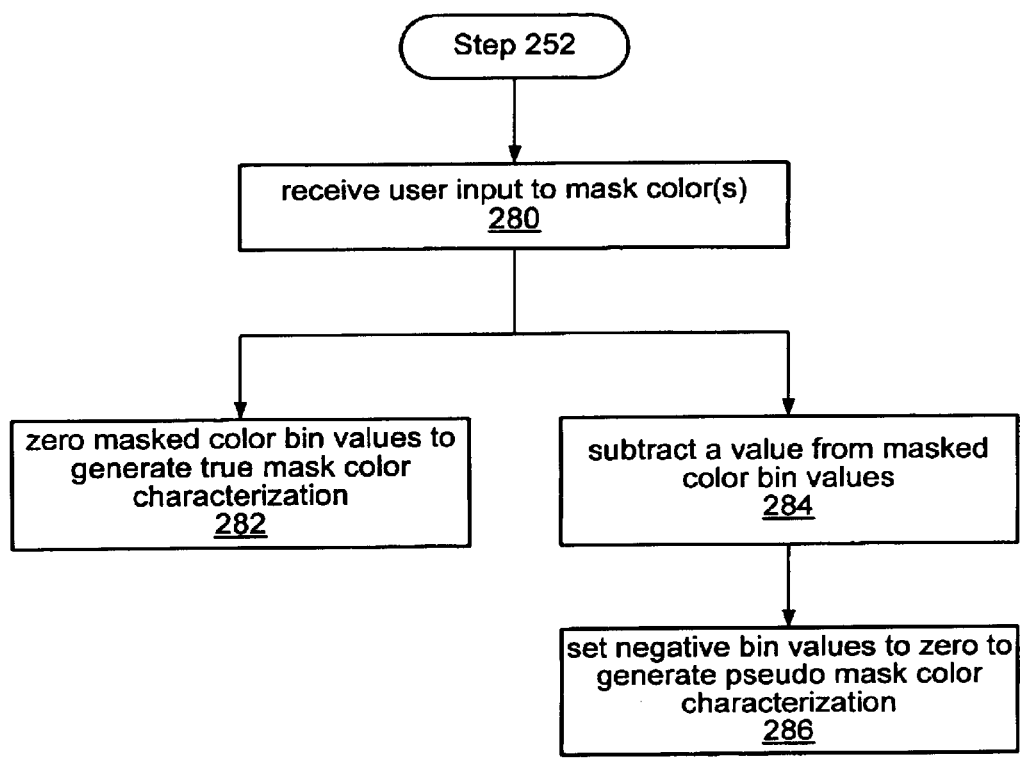
FIG. 11 is a flowchart diagram illustrating one embodiment of generating color masked color characterizations.

FIG. 11—Characterizing Template Image Pattern Information

FIG. 11 is a flowchart diagram illustrating one embodiment of step 252 of FIG. 6, in which color masking is used in the color characterization of the template image. In step 280, user input may be received indicating one or more colors to be masked in the color characterization process, i.e., the color matching search. For example, a Graphical User Interface (GUI) may be used which presents default options to the user such as mask black, mask white, or mask black and white. In one embodiment, the GUI may display the target image and/or the template image, and allow the user to select, e.g., with a mouse, one or more colors to mask.

In 282, a true masked color characterization of the template image may be generated by zeroing the masked color bin values. In other words, the color information for the template image may be modified to reflect the total absence of the masked colors, and so the masked colors will not contribute to the color analysis or characterization of the image.

Alternately, a pseudo masked color characterization of the template image may be generated by first subtracting a value, e.g., 0.5, from the color bin value of each masked color, as indicated in 284. Then, any resultant bin values which are negative are set to zero, as indicated in 286. In other words, the resulting value is not allowed to be negative. This operation is a heuristic which was developed by repeated experiments in which images were visually inspected and compared to the results of the color matching process, the purpose being to prevent false or nonsensical matches due to the (true) masking of colors whose bin values exceed 50%.

Thus, by the method described above, color characterizations may be performed on an image, such as the template image, using a pseudo color mask, and/or a true color mask, respectively. It is noted that when masking is used, the method described above is also applied to the target image.

Figure 12:
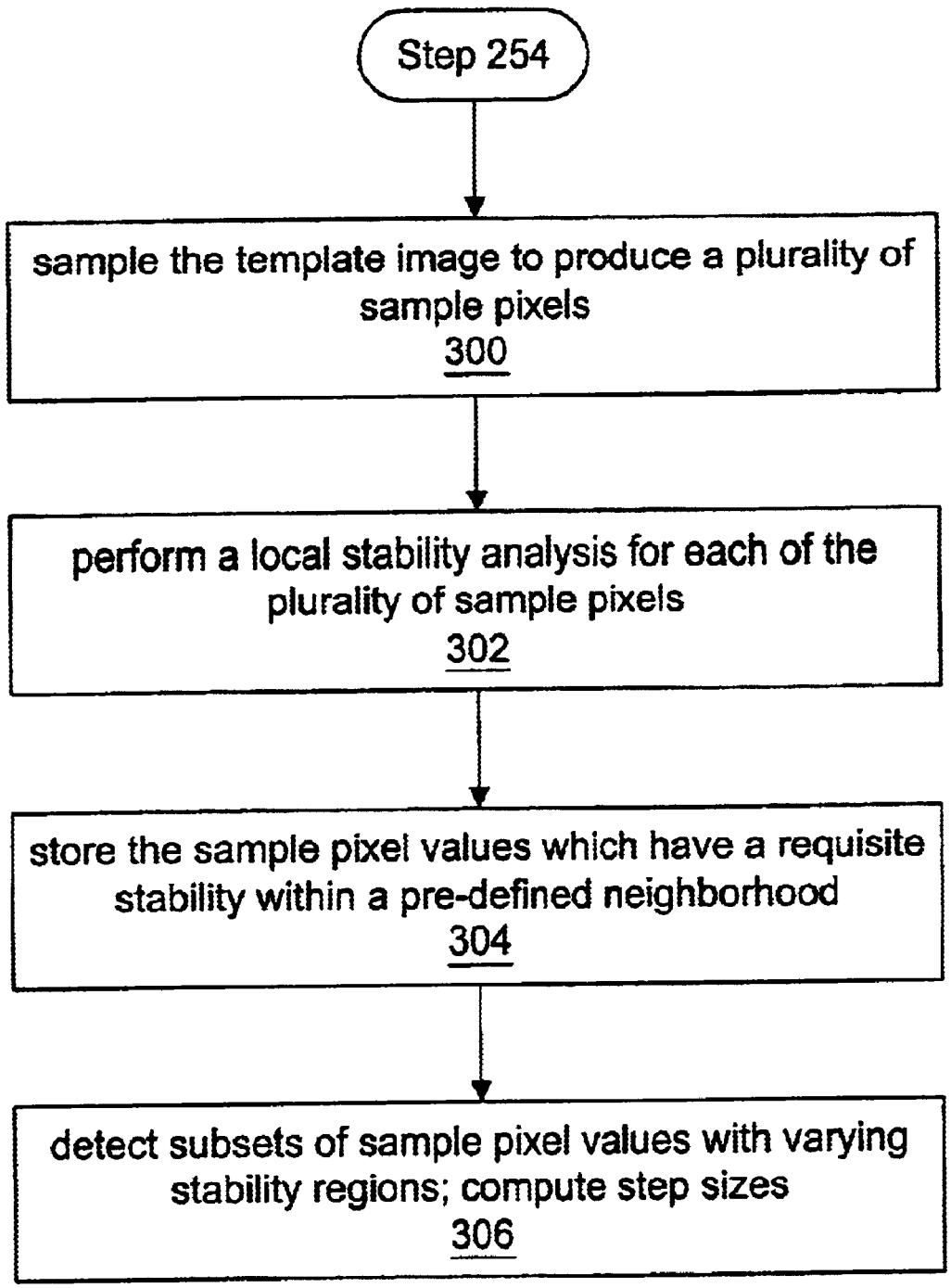
FIG. 12 is a flowchart diagram illustrating one embodiment of characterizing a template image with respect to pattern information.

FIG. 12—Characterizing Template Image Pattern Information

FIG. 12 is a flowchart diagram illustrating one embodiment of step 254 of FIG. 6, in which pattern information of a template image is characterized. In step 300 the template image is sampled to produce a plurality of sample pixels that accurately characterize the template image. The template image may be sampled on various component planes or color space planes, e.g., on the luminance (intensity) plane, saturation plane, and/ or hue plane. The sample information for each of these planes may be used in various stages of the pattern-matching process. For example, in one embodiment, sample information from the luminance plane may be used during the initial pattern matching iterations, and sample information from all of the planes may be used to verify a final pattern match.

According to one embodiment, the pixels comprising the template image are sampled using a Low Discrepancy sequence. Low Discrepancy sequences comprise mathematical sequences that are efficient samples of high dimensional spaces. A Low Discrepancy sequence is also referred to as a quasi-random sequence or a subrandom sequence. The Low Discrepancy sequence is designed to produce sample points which maximally avoid each other, i.e., is designed to produce sample pixels which best represent the image. Examples of Low Discrepancy sequences include the Halton sequence, the Sobol sequence, the Faure sequence and the Niederreiter sequence, wherein differences between these are minor from a real world applications point of view. Sampling the template image using a Low Discrepancy sequence may result in much fewer sample pixels to characterize the template image and/or a better characterization of the template image than would a random sampling technique or a uniform sampling technique.

The following is an example of the operation of a Low Discrepancy sequence (Halton set).

First, at step 1 the method selects the type of Low Discrepancy sequence, e.g., Halton, 2d (2-dimensional). In general, mathematicians are interested in nd applications of low-discrepancy sets where n>10, sometimes n>100. However, for a 2-dimensional image, a 2d sequence is used.

At step 2 the method then selects a criteria for construction of the Halton set, for example, construction in the unit square [0,1]×[0,1], it being noted that the general case can be derived by a scaling operation.

At step 3 the method then selects two prime numbers p and q. It is very common to use p=2 and q=3, although this is not necessary. Every pair of (p,q) results in a slightly different Halton set, wherein all of these sets are equivalent.

The variables $(x_n, y_n)$ denote the nth element of the Halton set. Given n, at step 4 the method notates n in the p-ary system (in the case where p=2 it is the well-known binary system). The result is n $a_k, \ldots a_1, a_0$ where the a's are 0 or 1 in case of the binary system, but 0, 1, . . . , p−1 in the general case.

At step 5, the method then reverses the order of $a_k, \ldots a_1, a_0$. This results in $a_0, a_1, \ldots, a_k$.

At step 6 the method then adds the (n-ary) point, i.e. $0.a_k \ldots a_1 a_0$. This number is in between 0 and 1 and represents the x-component of the nth Halton point $(x_n, y_n)$.

At step 7 the method repeats steps (4)–(6) based on the other number system q. This produces the y-component.

After steps 1–7, the nth point of the Halton sequence has been constructed.

The following is an example of the construction of a Low Discrepancy sequence in 2d. Here it is assumed that p=2 and q=3. This example determines the 10th element, i.e., $(x_{10}, y_{10})$.

The method starts with the x-component as follows:

(4') 10=1010 (decimal=binary) because 10=1*8+0*4+1*2+0*1

(5') reverse the order ->0101

(6') add the point ->$x_{10}$=0.0101 (0.0101 can be translated into 0*(1/2)+1*(1/4)+0*(1/8)+1*(1/16)=1/4+1/16=5/16

Now the y-component is computed as follows:

(4") 10=101 (decimal=ternary) because 10=1*9+0*3+1*1

(5") reverse the order ->101

(6") add the point ->$y_{10}$=0.101 (0.101 can be translated into 1*(1/3)+0*(1/9)+1*(1/27)=10/27

Once the points in the Low Discrepancy sequence have been determined, the points may be mapped to points in the template image, by scaling the values appropriately. These points in the template image may then be taken as sample points, e.g., during the pattern matching process, the grayscale pixel values at these points may be compared to corresponding grayscale pixel values in a region of the target image, for example by using a 2D correlation technique such as described above. The pattern matching may use a computed step size to step across the target image and/or use a coarse to fine search method for improved efficiency.

For more information on Low Discrepancy sequences, please see "Numerical Recipes in Fortran 77: The Art of Scientific Computing" (ISBN 0-521-43064-X) Cambridge University Press, pgs. 299–306, which is hereby incorporated by reference as though fully and completely set forth herein.

In one embodiment, no further steps may be performed in the pattern characterization method. However, in other embodiments, the plurality of sample pixels determined in step 300 may be processed further, as shown in steps 302–306. It is noted that step 300 may be performed in any of various other ways besides using Low Discrepancy sequences to produce the plurality of sample pixels, e.g., using a random sampling technique or a uniform sampling technique, such as a uniform grid-based sampling.

As shown in step 302, after the sampling of the image has been performed to produce a plurality of sample pixels, a local stability analysis may be performed for at least a subset of and preferably for all of the generated sample pixels to determine stability cf the respective sample pixels to spatial perturbations. For each candidate sample pixel value for which this local analysis is performed, the method operates to determine a neighborhood around the respective candidate sample pixel where the template image pixel values comprised in the neighborhood correlate highly with the candidate sample pixel value. In other words, for each candidate sample pixel value for which the local stability analysis is performed, a correlation is performed with neighboring pixel values within the template image to determine if the candidate sample pixel value is stable within its neighborhood, i.e., the neighboring pixel values have similar or correlated values with the respective candidate sample pixel value.

In step 304 the method optionally operates to save only those candidate sample pixel values which have a requisite stability within a predetermined or predefined neighborhood size. Sample pixel values generated in step 300 which are not stable within the predefined neighborhood are preferably thrown out or not used. Thus, step 304 operates to further reduce the number of sample pixel values used in the pattern matching operation.

In one embodiment, after either of steps 302 or 304, in step 306 the method further operates to find or detect different respective stability regions or neighborhood sizes for which each of the respective subset or all of the sample pixel values are stable, according to a stability criteria or varying stability levels. Stated another way, the method operates to detect and categorize subsets of sample pixel values with varying stability regions, i.e., operates to categorize subsets of sample pixel values according to stability region size.

The different stability region sizes are also preferably used to determine a step size for stepping the respective sample pixels across a target image region in the pattern matching process, as described below. This step size is used during the pattern matching operation to reduce the number of correlations required to be performed in the pattern matching. Thus, for a set of sample pixel values which have a larger stability neighborhood size, the set of sample pixel values can be stepped across the target image during an iterative correlation process with a larger step size. A set of sample pixel values with a smaller stability neighborhood size is stepped across target image regions during the iterative correlation process with a correspondingly smaller step size.

As described below, in the subsequent pattern matching process, the sample pixel values having different stability neighborhood sizes may then be used in a coarse to fine search, preferably using the respective computed step sizes. Thus the method operates to determine different stability neighborhood sizes and corresponding step sizes for use in a coarse to fine pattern matching search.

It is noted that the pattern characterization method described above may be extended to generate one or more sets of sample pixels that characterize the color information of the template image, rather than or in addition to, the pattern (grayscale) information. These pixels may then be used to sample color information in the target image, as described below. For example, each sample pixel in a set may have a cobr that is stable within a particular neighborhood size, and the sample pixels may be chosen to represent the most dominant colors of the template image, etc. This determination of sample color pixels may be performed together with the pattern analysis or may be performed as part of the color characterization method described above with reference to FIG. 9.

Figure 13:
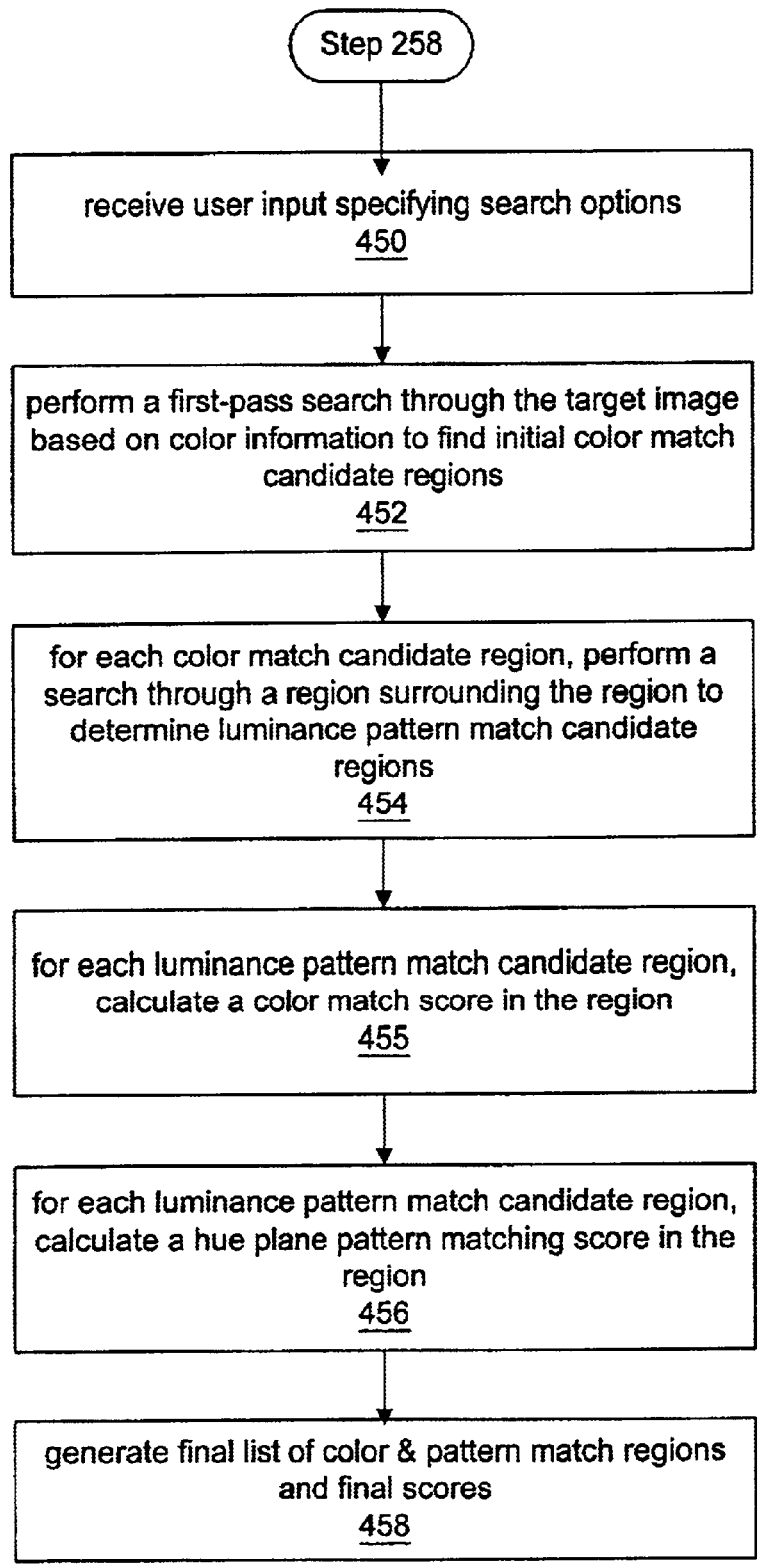
FIG. 13 is a flowchart diagram illustrating one embodiment of a method for performing a multi-pass search of a target image to find regions having color and pattern information that match a template image.

FIG. 13—Target Image Search

FIG. 13 is a flowchart diagram illustrating one embodiment of a method for searching a target image to find regions having color and pattern information that match a template image. The target image search method shown in FIG. 13 may be used in step 258 of the color and pattern match location method shown in FIG. 6. In alternative embodiments, any of various other search methods may be used, as desired for a particular application. The target image search method shown in FIG. 13 utilizes a multi-pass technique, in which candidate color match regions of the target image are identified in a first pass color matching search, and pattern information in a larger region surrounding or proximal to each of these candidate color match regions is then examined in more detail in one or more subsequent pattern matching searches to identify final color and pattern match locations.

Each region of the target image that is examined during the first-pass color match search may be regarded as a window into the target image. This window may have various sizes. For example, the window size may correspond exactly to the size of the template image, or the window size may be scaled to be larger or smaller than the template size. The window may be moved through the target image in order to sample the color information of the image at various regions. The regions at which to sample the color information may be determined in any of various ways. For example, in one embodiment, the window may initially be positioned at the top, left corner of the target image and may then be moved through the image at interval steps. For each sample region, the color information of the region may be compared with the color information of the template image, as described below.

In step 450 of FIG. 13, user input specifying various search options may be received. For example, the search options may specify various parameter values affecting the degree of granularity used for deciding color or pattern matches and/or the efficiency of the target image search process. In one embodiment, the user may specify one of three options: "conservative", "balanced," or "aggressive," which each control various search parameters, such as described below with reference to FIG. 20. In other embodiments search parameters may be specified individually.

In step 452, a first-pass search through the target image may be performed in order to find initial color match candidate regions, i.e., regions that match, at least to a degree, the color information of the template image. In one embodiment, the first-pass color matching search may use a coarse to fine method and/or a hill-climbing method, described below with reference to FIG. 20. In the first-pass color matching search, color information of various regions of the target image may be initially sampled at a relatively large step size, in order to efficiently identify areas of the target image containing a possible match. This coarse color matching search may then be followed by a fine color matching search, optionally using a hill-climbing metric or technique. Two embodiments of step 452 are described below with reference to FIGS. 14 and 15.

In step 454, a larger region surrounding and encompassing or proximal to each color match candidate region identified in step 452 may be examined in more detail, with respect to luminance pattern information (i.e., gray-scale information). In other words, a luminance pattern matching search may be performed on a larger region surrounding and encompassing or proximal to each color match candidate region identified in step 452. The size of each region to be searched in step 454 may be dependent on various factors, such as the template image size, the degree to which the respective candidate color match region was determined to match the template image in color, etc. Particular embodiments of step 454 are discussed in detail below. The luminance pattern matching search may produce one or more final pattern match candidate regions (i.e., the luminance pattern match candidate regions).

In step 455, for each final pattern match candidate region, a new or final color match score may be calculated between the template image and the final pattern match candidate region. In other words, because the candidate regions determined in the original color match process of 452 were refined in 454, a new score may be calculated specifically for the refined regions. It should be noted that in embodiments using color masking, the pseudo mask is preferably used for the scoring process in 452 and 454, although in other embodiments a score may also be calculated using the true mask. In step 455, the final color match score is preferably calculated using the true mask.

In step 456 each luminance pattern match candidate region may be further analyzed using hue plane pattern matching. In other words, each luminance pattern match candidate region may be analyzed to determine the particular color forms (edges, structures, etc.) in the region. This is in contrast to the color matching search performed in step 452 above, where only color information, as opposed to form, is analyzed and characterized, and the luminance (gray-scale) pattern matching performed in step 454 above, where form, but not color is analyzed, i.e., gray-scale as opposed to spectral color information is used. For example, in a case where electrical resistors are being examined, two resistors having red, green, and blue bands, but in different order, may each pass the searches of steps 452 and 454, in that the color profiles (% of each color) are the same, and the resistors have the same number of stripes, and therefore have the same general form. However, the hue plane pattern match will distinguish between the two resistors, selecting the resistor which matches the template image. Further details of one embodiment of the hue plane search are described below with reference to FIG. 19.

In step 458 a final list of color and pattern match regions may be generated from a list of candidate regions determined in step 456. The final list may be based on a measure of how well each candidate matches the template image with respect to color information, luminance pattern information and/or hue (color) pattern information, e.g., as compared to threshold values which may be specified by the user.

It should be noted that in various embodiments, the particular order of the three searches may be different from that described above. In other words, for some applications, changing the order of the search sequence may increase searching and matching efficiencies. For example, in one embodiment, the luminance pattern matching search (step 454) may be performed first, then the color matching search (step 452), followed by the hue plane pattern matching search (step 456).

Figure 14:
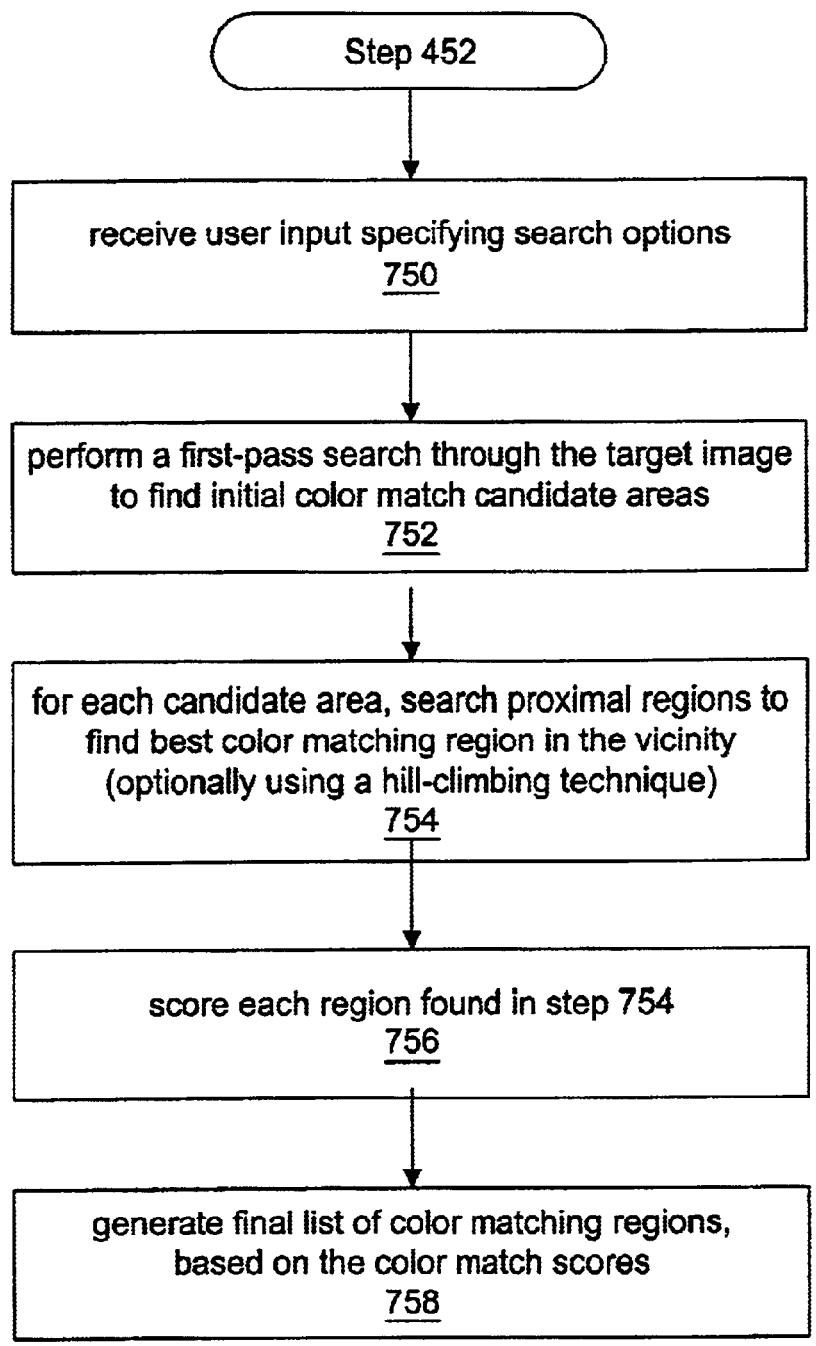
FIG. 14 is a flowchart diagram illustrating one embodiment of a method for locating regions of a target image that match a template image, with respect to color information.

FIG. 14—Target Image Search

FIG. 14 is a flowchart diagram illustrating one embodiment of a method for searching a target image to find regions having color information that match a template image. As mentioned above, the color match location method described herein may be operable to locate regions within a target image that match the color information (but not necessarily the pattern information) of a template image. Such a color match location method may be useful in many applications. For example, the method may be especially useful in applications that do not require an exact location of the template image match within the target image to be determined, with subpixel accuracy. For example, some applications may need to very quickly determine match locations to a degree of accuracy, but may not require the locations to be determined with the degree of preciseness that may be obtained if pattern information is also used in the matching. This more coarse location determination may be suitable for many applications, e.g., to determine whether all color-coded pills are present in a blister pack.

As also mentioned above, the template image may be an image of any of various types, including gray-level and color images. The template image may be received or obtained from any of various sources and may be an entire image or may be a portion of an image, e.g., a region of interest specified by a user. For example, a user may select a region of interest (ROI) using a graphical user interface (GUI). In one embodiment, a GUI may enable the user to choose from many different shapes of ROIs, such as a rectangle, an oval, or a shape selected freehand.

Similarly as for the template image, the target image may also be an image of any of various types, including an image obtained from a memory medium or an image acquired from a hardware device, such as a camera, frame grabber, scanner, etc. The target image may also be received from any other source, including from a graphics software program, from transmission via a network, etc. A target image may also be an entire image or only a portion of an image.

It is noted that in alternative embodiments, multiple template images and/or target images may be received or specified. For example, it may be desirable to search multiple target images for regions having color information matching that of a template image, or it may be desirable to search for target image regions matching any of a plurality of template images.

In one embodiment, the target image search method shown in FIG. 14 may be used in step 452 of the color match location method shown in FIG. 13. In alternative embodiments, any of various other search methods may be used, as desired for a particular application. The target image search method shown in FIG. 14 utilizes a coarse-to-fine heuristic, in which candidate color match areas of the target image are identified in a first-pass search, and these candidate areas are then examined in more detail to identify final color match regions.

As described above with reference to FIG. 6, prior to performing the color matching search on the target image, a color characterization analysis method may be performed for the template image to provide a comparison basis for the search. In one embodiment, this analysis may involve dividing the HSI color space into a number of categories or "bins". The color information of the template image pixels may then be examined in order to determine the allocation of the pixels across the bins. One particular embodiment of this process is described above with reference to FIG. 9. In alternative embodiments, any of various other methods may be used to perform the color characterization analysis. In one embodiment, color characterization of the template image may be performed on a different computer system, and the method may receive the color characterization information of the template image. Thus, the computer system executing the color match location software may only receive or store the color characterization information of the template image, and may not be required to store the template image itself.

The target image may then be searched in order to locate regions that match the template image with respect to color characterization. This search may utilize the color characterization information of the template image obtained above and may also involve performing color characterization analyses for various regions of the target image. This may involve performing color characterization analyses for various regions of the target image, and comparing this color characterization of each of these regions with the color characterization information of the template image obtained above. This process may be performed in any of various ways. In one embodiment the target image may be searched in multiple passes, as described below. The first pass may involve a coarse-grained search to efficiently identify a list of candidate areas or regions in the target image. Subsequent passes may then examine the candidate areas more closely in order to determine final matches.

Each region of the target image that is examined may be regarded as a window into the target image. This window may have various sizes. For example, the window size may correspond exactly to the size of the template image, or the window size may be scaled to be larger or smaller than the template size. The window may be moved through the target image in order to sample the image at various regions. The points at which to sample regions may be determined in any of various ways. In one embodiment, the window may initially be positioned at the top, left corner of the target image and may then be moved through the image at interval steps. For each sample region, the color information of the region may be compared with the color information of the template image, as described below.

In step 750 of FIG. 14, user input specifying various search options may be received. For example, the search options may specify various parameter values affecting the degree of granularity used for deciding color matches and/or the efficiency of the target image search process. In one embodiment, the user may specify one of three options: "conservative", "balanced," or "aggressive," which each control various search parameters, such as described below with reference to FIG. 20. In other embodiments search parameters may be specified individually.

In step 752, a first-pass search through the target image may be performed in order to find initial color match candidate areas, i.e., areas that may contain a region having color information that matches the color information of the template image, and color match location or analysis information may be generated. One embodiment of step 752 is described below with reference to FIG. 15.

In step 754, each candidate area identified in step 752 may be examined in more detail. In the first-pass search, various regions of the target image may be sampled at a relatively large step size, in order to efficiently identify areas containing a possible match. In step 754, for each candidate area, the search window may initially be placed at the position where the window was during the first-pass search when the candidate area was identified. The window may then be moved around this initial position at a reduced step size in order to perform a finer-grained search, so that the best matching region for each candidate area is determined. The new step size may be inversely proportional to how well the initial candidate matched the template image. In other words, a "hill-climbing" heuristic may be used, such that if the initial candidate is very close to the template image, smaller steps are taken so that the best match is not stepped over. Various methods for determining how close the color information of a target image region is to the color information of the template image are discussed below.

During the search performed in step 754, the window may be moved around each candidate area using any of various strategies or algorithms. However, the distance that the window may be moved away from the original candidate's position is preferably limited, e.g., as a function of the size of the window and/or the step size used in the first-pass search. In one embodiment, if it is determined that the degree to which the target image color information matches the template image color information is decreasing as the window moves away from its initial position, then searching in that direction may be aborted, in order to avoid unnecessary comparisons.

As discussed above, when the color information for a target image region is analyzed, it may be desirable to examine the color information for only a subset of the individual pixels of the region, e.g., in order to search through the target image more quickly. The subsampling size for each target image region may be determined by search criteria specified by the user. In step 754, it may be desirable to increase the subsampling size used in analyzing the color information for the target image over the subsampling size used in the first-pass search, in order to possibly obtain more accurate color characterization information.

In an embodiment using a hill-climbing technique to search each candidate area, a search may be performed on regions proximal to (i.e., surrounding and including) the candidate area, as mentioned above. In one embodiment, searching proximal regions to find a best color match region for each area using a hill-climbing technique may include using a coarse hill-climbing technique to find a coarse color match candidate region, then using a fine hill-climbing technique on the coarse color match candidate region to find the best color match candidate region. For example, a plurality of subregions within the proximal region may be searched by moving among the plurality of subregions using a coarse hill-climbing technique to find a coarse candidate subregion, then searching proximal subregions of the coarse candidate subregion by a fine hill-climbing technique to find the best color match candidate region. A more detailed description of one embodiment of the hill-climbing technique is presented below with reference to FIG. 20.

In various embodiments, step 754 may comprise performing one or more subsequent passes through the candidate list after the first pass. For example, if desired, the coarse-to-fine search heuristic may be repeated, possibly only for certain candidates, using successively smaller step sizes, and/or larger subsampling sizes, e.g., until the step size is reduced to one pixel and every pixel of the target image region is sampled. The desired number of passes performed and the rate at which the search parameters change between passes may differ according to the accuracy and efficiency requirements of particular applications.

Each initial candidate area identified in the first-pass search may be replaced by the region found in step 754 having color information that best matches the color information of the template image (or may not be replaced if no better match is found). Also, it is possible that candidate areas identified during a previous pass are eliminated altogether in a subsequent pass. For example, since the step size may be relatively large during the first-pass search, the match criteria for identifying candidates may be relatively loose, i.e., a target image region may not need to match the template image very closely in order to be considered a candidate match area. As candidate regions are examined more thoroughly in subsequent passes, it may be desirable to require the color information of each candidate to match the template image more strongly in order to remain a candidate.

In one embodiment, information regarding an expected number of matches to be found in the target image may be utilized in order to more quickly complete the color match location process. For example, a graphical user interface may enable a user to specify an expected number of matches. In this case, the method may limit the number of color match candidate regions that are searched to a maximum number based on the expected number of matches. In one embodiment, this maximum number may be calculated with a formula such as:

$$Max=Base+Factor*NumberExpected$$

where "Base" and "Factor" are configurable variables.

The list of candidate regions identified in the first-pass search through the target image may be sorted with respect to how well the color information of each candidate region matches the color information of the template image, and in a subsequent search pass, the list of candidate regions may be traversed in this sorted order. The maximum number calculated based on the number of expected matches may be used to limit the number of candidate regions that are searched in a subsequent pass. Since the first-pass search may use relatively loose matching criteria, the first-pass search may identify a large number of candidate regions. The method may operate to keep track of the number of candidates remaining after a subsequent pass. If the maximum number is reached, then a traversal of the remaining first-pass candidate regions may be avoided. In one embodiment, however, if the color difference between a given candidate region and the template image is smaller than a certain threshold value, then that candidate region may be traversed regardless of whether or not a maximum number of subsequent-pass candidates has already been reached.

In step 756 each of the candidate regions determined after the one or more passes performed in step 754 may be scored, based on the difference between their color characterization information and the color characterization information for the template image. The color differences may be calculated in any of various ways. Particular embodiments of color difference methods are discussed below. Any of various systems may be used to score the candidate regions. In one embodiment, each region is assigned a score from 0 to 1000, with 1000 being the best possible match and 0 being the worst.

In step 758 a final list of color match regions may be generated, based on the scores determined in step 756. For example, the scores may be compared to a threshold value that is used to eliminate regions scoring below a certain level. This threshold value may be a default value or may be specified from the user input received in step 750. In one embodiment, information related to the color match regions may be displayed, such as by visually indicating the location of the match regions within the target image, and/or displaying information indicating various statistics regarding the color information of the match regions or regarding how closely the regions match the color information of the template image.

Figure 15:
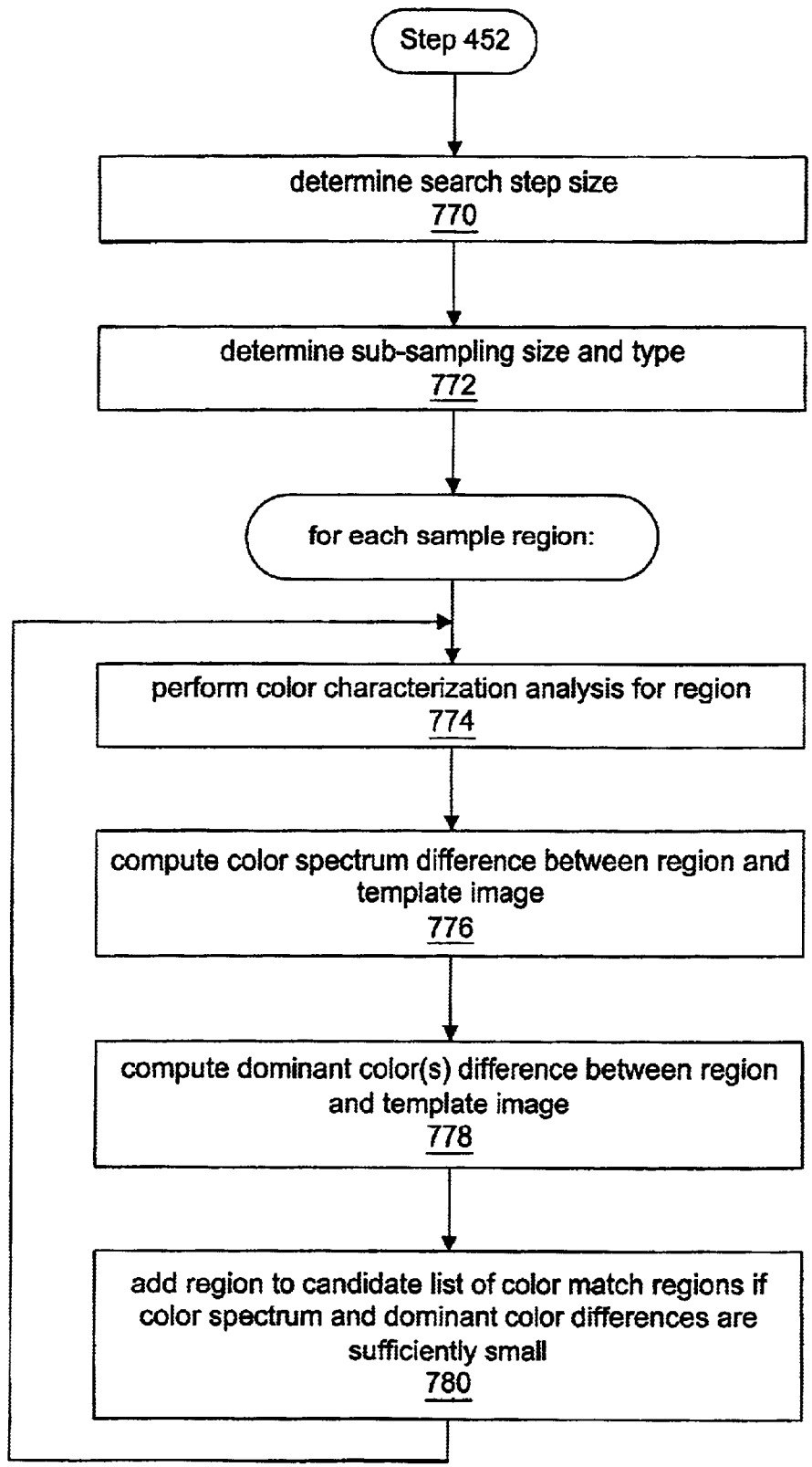
FIG. 15 is a flowchart diagram illustrating one embodiment of a method for performing a first-pass color matching search in a target image during a color and pattern match location method.
Figure 16A:
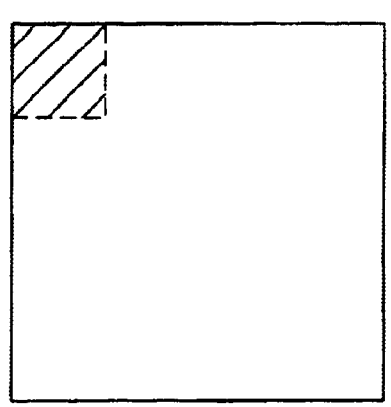
FIG. 16 illustrates an example of traversing a target image during a first-pass color match search of a color and pattern match location method.
Figure 16B:
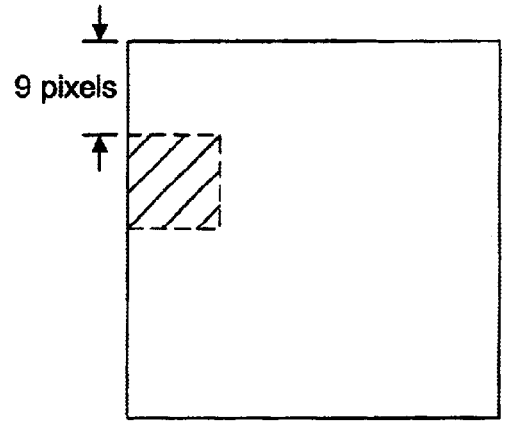
Figure 16C:
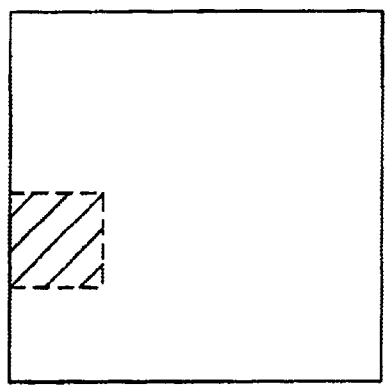
Figure 16D:
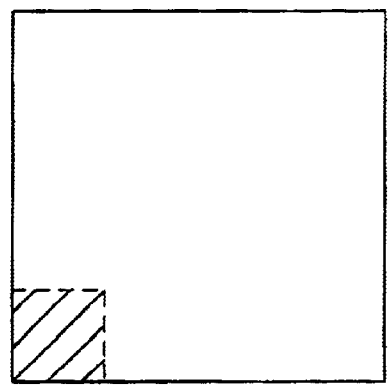
Figure 16E:
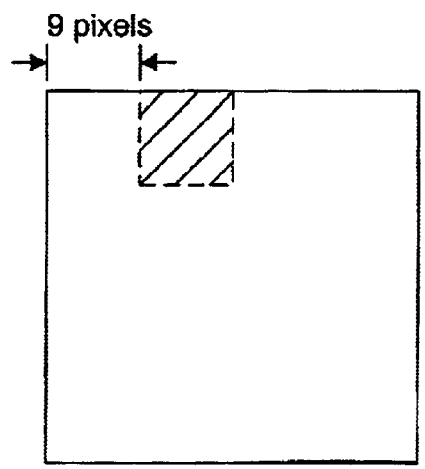
Figure 16F:
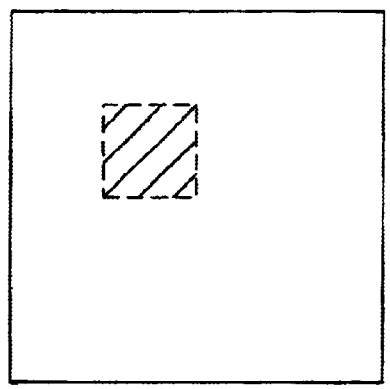

FIG. 15—First-Pass Color Matching Search

FIG. 15 is a flowchart diagram illustrating one embodiment of a method to perform the first pass search illustrated in step 752 of FIG. 13. As discussed above, in one embodiment, the first-pass search may involve sampling various regions of the target image, where the regions that are sampled may be determined by a window that slides along the target image according to a particular step size. Thus, in step 770 the method may determine an appropriate step size to use in sliding the window. The step size may at least in part be determined based on user input received in step 750 of FIG. 14. For example, if the user specified aggressive search criteria, then the step size may be relatively large, whereas the step size may be relatively small if the user specified conservative search criteria. In various embodiments, the search size may also depend on the size of the template image and/or the target image.

For each region that is sampled, the color information for the region may be analyzed, similarly as for the template image. However, as described above, it may not be desirable to examine the color information of every pixel in the region. Thus, in step 772, a subsampling size and/or method may be determined, wherein the subsampling size specifies the number of pixels to examine for each region. The subsampling method may specify the type of subsampling, such as random, pseudo-random, or a low discrepancy sequence. In one embodiment, the method may use a low discrepancy sequence to select the subset of pixels. Similarly as for the step size, the subsampling size and/or method may depend on search criteria specified by the user.

As shown in FIG. 15, steps 774 through 780 may then be performed for each region of the target image to be sampled.

In step 774, a color characterization analysis for the target image region may be performed. This step may utilize the color characterization method described above, in which the target image pixels (or a selected subset of pixels) are examined individually with respect to their color information and assigned to color space bins.

In step 776, a measure of difference (or similarity) between the color spectrum of the target image region and the color spectrum of the template image may be computed by comparing the information obtained in their respective color characterization analyses. This comparison may be performed in any of various ways. In one embodiment, for each color bin from a set of N bins, the pixel percentage values assigned to corresponding bins for the two images may be subtracted from one another, resulting in N difference values. The closer each of the difference values is to zero, the more similarity there is between the template image and the target image region, with respect to that color category; i.e., the percentage of pixels on the template image and the target image region that fall into that particular color category are substantially the same.

The absolute values of the difference values may then be summed to give a value falling between zero and two, where two represents a maximum measure of difference between the color spectrums and zero represents a maximum measure of similarity. Alternatively, each of the difference values may be compared to a threshold value to determine a "score" for each color category.

As noted above, in one embodiment, information indicating one or more dominant color categories may be obtained when performing a color characterization analysis of a template image. Referring again to FIG. 15, in step 778, a measure of difference for the dominant color categories may be computed. This measure of difference may be computed similarly as described above for the color spectrum difference. For example, for each dominant color category determined for the template image, the percentage of template image pixels assigned to the dominant color category may be compared to the percentage of target image region pixels assigned to that color category.

In step 780, the difference values determined in steps 776 and 778 may be used to decide whether to add the region to a list of candidate match areas. For example, the color spectrum difference may need to be less than a threshold value in order for the region to be added to the list. It is noted that the color spectrum difference may be tested immediately after its calculation, and further analysis of the sample region, such as step 778, may be aborted if the difference is too great.

If the color spectrum difference is sufficiently small, then the dominant color difference(s) may be considered. Considering the dominant color difference(s) may help to further ensure that the sample region area is a potential match, since in various embodiments of the calculation of the color spectrum difference, it is possible to obtain a small difference value, even though the occurrence of the dominant color(s) of the template image may be largely reduced in the sample region or may even be missing altogether in the sample region. Dominant color differences may be considered individually or together. For example, if there are multiple dominant color categories, then the percentage difference for each category may be required to be smaller than a threshold value in order for the region to be added to the candidate list, or the average of the differences for all the categories may be required to be smaller than a threshold value.

While the above method is simple to apply and the results are easily understood, this method may not be the best method for all color matching applications. For example, consider a case where at least one of the seven natural colors of the hue plane is divided into two or more bins, e.g., in response to a user specifying a medium or high sensitivity level. Even if the template image and the target image region have colors that are very similar, it is still possible that pixels from each will be assigned to different bins corresponding to the same natural color in the hue plane. Thus, the results from this example may show very few or no pixels in the same bin, i.e., the results would indicate that the template image and the target image region have very different color spectrums. This may not be the proper result because the colors in the template image and the target image region are actually very similar, but happen to be in different hue categories of the same natural color.

Alternative color spectrum techniques may compensate for cases such as described above. In various embodiments, a portion of the percentages of pixels assigned to each bin may be manipulated, in order to share pixels among or re-distribute pixels to neighboring bins, before calculating the measure of color spectrum difference as described above. This is described more detail below, and in U.S. patent application Ser. No. 09/737,531 titled "System and Method for Color Characterization Using Fuzzy Pixel Classification with Application in Color Matching and Color Match Location," which was incorporated by reference above.

FIG. 16—Target Image Traversal During First-Pass Color Match Search

FIG. 16 illustrates an example of window movement during a first-pass color match search, in which the window begins at the top, left corner of the target image and is moved through the target image using a step size of nine pixels. After an initial color comparison between the template image and the top, left portion of the target image has been performed in FIG. 16A, the window, for example, is moved downward 9 pixel scan lines as shown in FIG. 16B. After this portion of the target image is compared to the template image, the window is moved another 9 scan lines downward as shown in FIG. 16C. The comparisons are repeated until the window reaches the bottom left portion of the target image, as shown in FIG. 16D. After this comparison, the window, for example, is moved back to the top of the target image and is moved over 9 vertical pixel columns to perform another comparison, as shown in FIG. 16E. After this comparison is performed in FIG. 16E, the window is moved down 9 horizontal scan lines of pixels as shown in FIG. 16F. This procedure again repeats a plurality of times until the window again reaches the bottom of the target image. At this point, the window is moved back to the top of the target image and across 9 more vertical column of pixels (not shown) to perform another set of comparisons. This procedure may be performed until the window has been stepped through the entire target image, using a 9 pixel step size.

Figure 17:
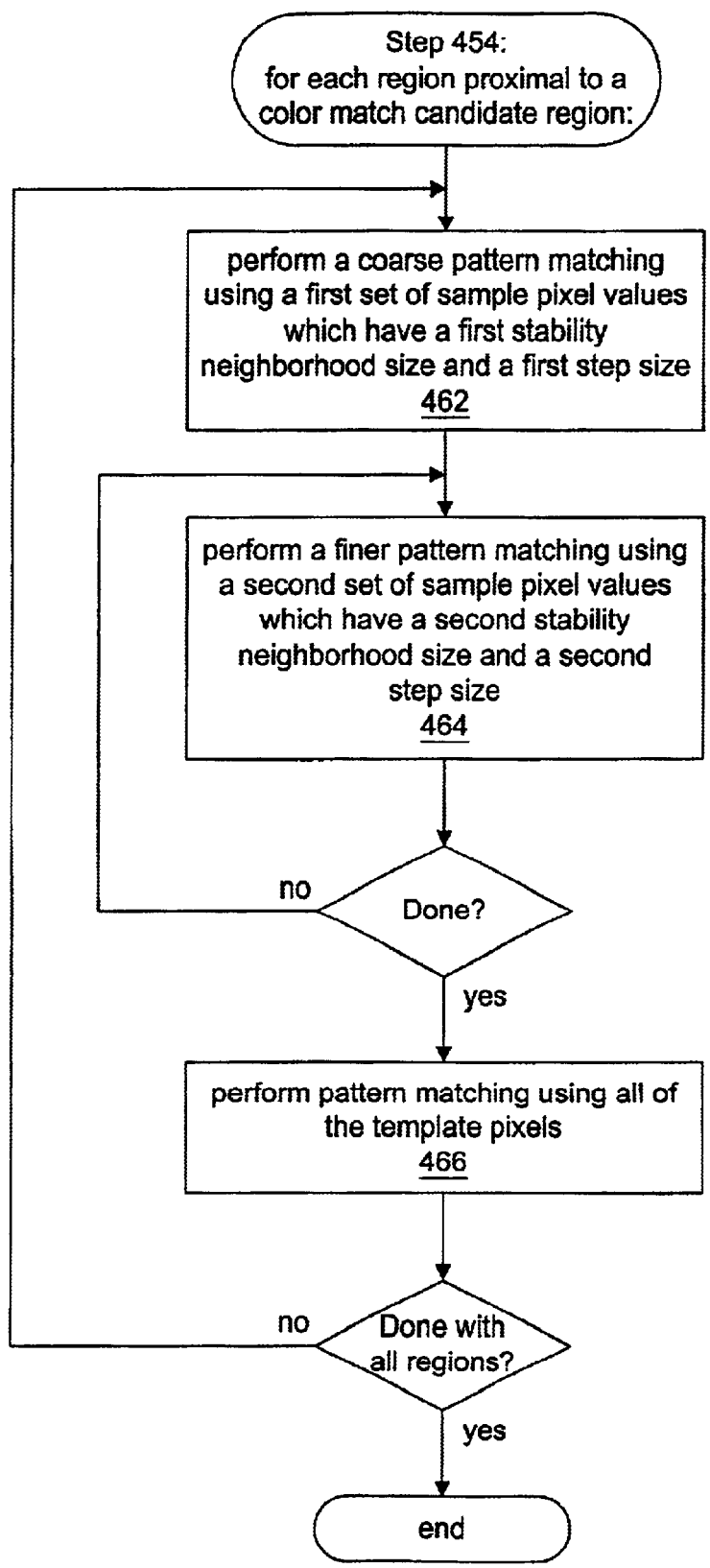
FIG. 17 is a flowchart diagram illustrating one embodiment of a pattern matching search performed in proximal regions surrounding color match candidate locations determined in a first-pass color matching search of a color and pattern match location method.

It is noted that FIGS. 16A–16F are merely an example of stepping the window across the target image, it being noted that the window may be stepped across the target image using any of various step sizes and in any of various manners, e.g., left to right, right to left, top to bottom, bottom to top, or other methodologies. Also, the target image may not necessarily be sampled at regular step intervals. For example, window placement may be chosen using any of various algorithms, or may be chosen randomly, quasi-randomly, etc FIG. 17—Luminance Pattern Matching Method FIG. 17 is a flowchart diagram illustrating one embodiment of the pattern matching search performed for each proximal region surrounding and encompassing a color match candidate region, as shown in step 454 of FIG. 13. Various types of pattern matching may be used, as desired. The flowchart of FIG. 17 illustrates pattern matching using different stability neighborhood sizes and corresponding step sizes in a coarse-to-fine search.

In one embodiment, information regarding an expected number of matches to be found in the target image may be utilized in order to more quickly complete the color and pattern matching process. For example, FIG. 20 illustrates a graphical user interface enabling a user to specify an expected number of matches. In this case, the pattern matching method may limit the number of regions that are searched with respect to pattern information, based on a maximum number which may be calculated with a formula such as:

$$Max=Base+Factor*NumberExpected$$

where "Base" and "Factor" are configurable variables.

The first-pass search based on color information may determine a large number of candidate color match regions, especially if the first-pass search is configured to use somewhat loose color matching criteria. The pattern matching process may limit the number of regions that are searched, based on the maximum number described above. For example, as discussed above with reference to FIG. 15, a measure of difference regarding how well the color information of each target image region matches the color information of the template image may be calculated. The color match candidate regions may be scored and sorted based on the color differences, and pattern matching may be performed in this sorted order, i.e., those regions surrounding color match candidate regions that match the color information of the template image most closely are searched first with respect to pattern information. As each region is searched, if a pattern match candidate region is found in that region, then the match may be added to a running total of color and pattern match candidates so far. If the number of color and pattern match candidates so far exceeds the maximum number, then the pattern matching may not be performed for the remaining color match candidate proximal regions. In one embodiment, however, if the color difference for a given candidate color match region is smaller than a certain threshold value, then the region surrounding that candidate color match region may be searched with respect to pattern information regardless of whether or not the maximum number of matches has already been found.

As shown, in step 462 the method operates to perform a coarse pattern matching using a first set of sample pixel values which have a first stability neighborhood size and a corresponding first step size. Thus the method performs a first iteration of pattern matching using the first set of sample pixel values and the first step size. The target image region may be stepped through and the pattern information at various locations within the region may be sampled, similarly as described above for the first-pass color matching process. The first set of sample pixels used for the initial coarse pattern matching preferably have the largest stability neighborhood size and hence the largest step size. This coarse pattern matching produces zero or more possible regions for the template image in the target image region. In other words, this coarse pattern searching produces zero or more candidate regions in the target image region which possibly match the template image with respect to both color and pattern information. If desired, i.e., if the target image region is sufficiently small, then the number of candidate regions determined in step 462 may be limited to 1, e.g., by selecting the best match as the candidate.

As described above, sample pixel values may be obtained from various color planes of the template image, including from the hue plane, saturation plane, and/or the luminance plane. Sample pixel values from any or all of these planes may be used in step 462. In the preferred embodiment, sample pixel values from the luminance plane are used in step 462, and sample pixel values from other planes may be used in subsequent pattern matching iterations.

In step 464 the method operates to perform a finer pattern matching at the candidate regions determined in step 462, using a second set of sample pixel values which have a second stability neighborhood size and a corresponding second step size, wherein the second stability neighborhood size and the second step size are smaller than the first stability neighborhood size and first step size. This finer pattern searching produces zero or more possible match regions for the template image in the target image, and typically involves discarding one or more false matches produced in the coarse search performed in step 462.

Step 464 may be repeated one or more times to perform even finer pattern matching using other sets of sample pixel values which have even smaller stability neighborhood sizes and corresponding second step sizes. Step 464 is preferably repeated at the remaining candidate regions. After one or more iterations of step 464, the method may involve performing a final pattern matching in step 464 using all of the sample pixel values to determine if any remaining possible matches are actual matches. Alternatively, after one or more iterations of step 464 and/or after a pattern matching step using all of the sample pixel values, in step 466 the method further optionally performs a pattern matching using all of the template pixels for the remaining candidate regions in the target image region. The number of iterations that are performed in step 464 depends on the degree of desired preciseness in the pattern matching. In a similar manner, the decision whether step 466 is performed also depends on the degree of desired preciseness in the pattern matching.

Thus the pattern matching within each region comprises performing a plurality of iterations of pattern matching using different ones of the sets of sample pixels, preferably with different step sizes. Where the local stability analysis determines a plurality of sets of sample pixels with differing stability neighborhood sizes, the pattern matching comprises performing a plurality of iterations of pattern matching using different ones of said sets of sample pixels in a coarse to fine manner, e.g., with successively smaller stability neighborhood sizes and/or successively smaller step sizes. If a first iteration of pattern matching determines one or more candidate regions in the target image region which possibly match the template image, then one or more second iterations of pattern matching are performed at the determined one or more candidate regions in the target image region. The first iteration of pattern matching utilizes a first stability neighborhood size and a first step size, and each of the one or more second iterations of pattern matching preferably utilize a smaller stability neighborhood size and a smaller step size.

It is noted that the pattern matching iterations may also be alternated with iterations of color matching, if desired. For example, color matching iterations using a smaller step size and/or a larger subsampling size than used in the first-pass color matching search may be performed. In one embodiment, a color matching method may be performed on final matches as determined by the pattern matching iterations, to verify the final matches.

As an example of the operation of the pattern matching performed, assume that in step 306 of FIG. 12 a first set of sample pixel values which have a 9×9 stability neighborhood size and a second set of sample pixel values with a 5×5 stability neighborhood size, etc., are determined. When performing the pattern matching search in step 462, the method preferably starts using the sample pixel values which have the larger stability neighborhood size, e.g., the 9×9 stability neighborhood size. This search also uses a step size corresponding to this stability neighborhood size, e.g., a step size of 9 pixels. Thus, because these points or sample pixel values are stable over a 9×9 region, the search process is performed whereby, instead of visiting each pixel in the target image region to compute the match values, the pattern matching is preferably performed at a step size of every 9 pixels.

Once this initial core search determines an initial set of possible matches in the region, the second set of sample pixel values with a smaller neighborhood size, e.g., with the 5×5 stability regions, are used to perform a pattern matching at these initial match locations to perform a more refined search of these locations. This coarse to fine search based on stability neighborhood size and step size may be performed for a plurality of coarse to fine iterations until a desired degree of pattern matching has been accomplished.

Alternately, in another embodiment, the coarse to fine search may comprise using a hill-climbing search technique, as described above with reference to 754 of FIG. 14, where a proximal (i.e., surrounding and encompassing) region of the candidate color match region is searched using a coarse hill-climbing technique to find a coarse luminance pattern match candidate region, then the coarse luminance pattern match candidate region is searched using a fine hill-climbing technique to find the best luminance pattern match candidate region.

Figure 18A:
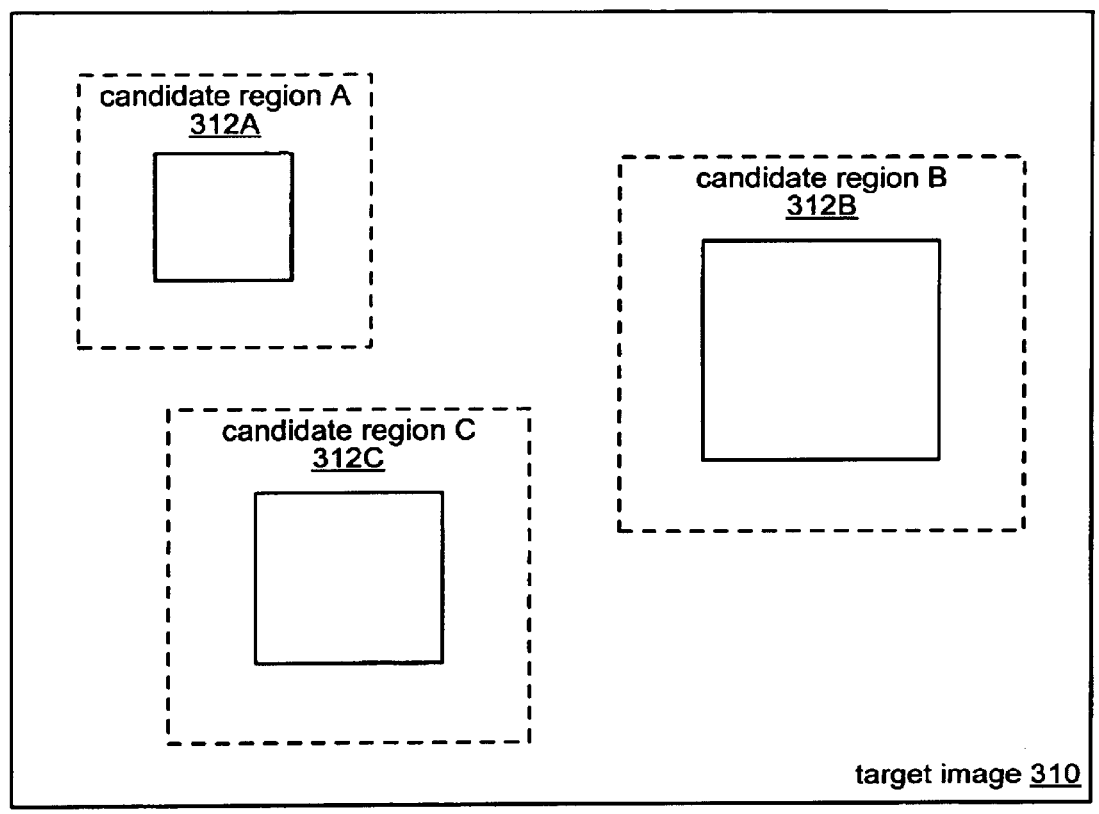
FIG. 18A illustrates a target image and several regions surrounding color match candidate regions determined in response to a first-pass color matching search.
Figure 18B:
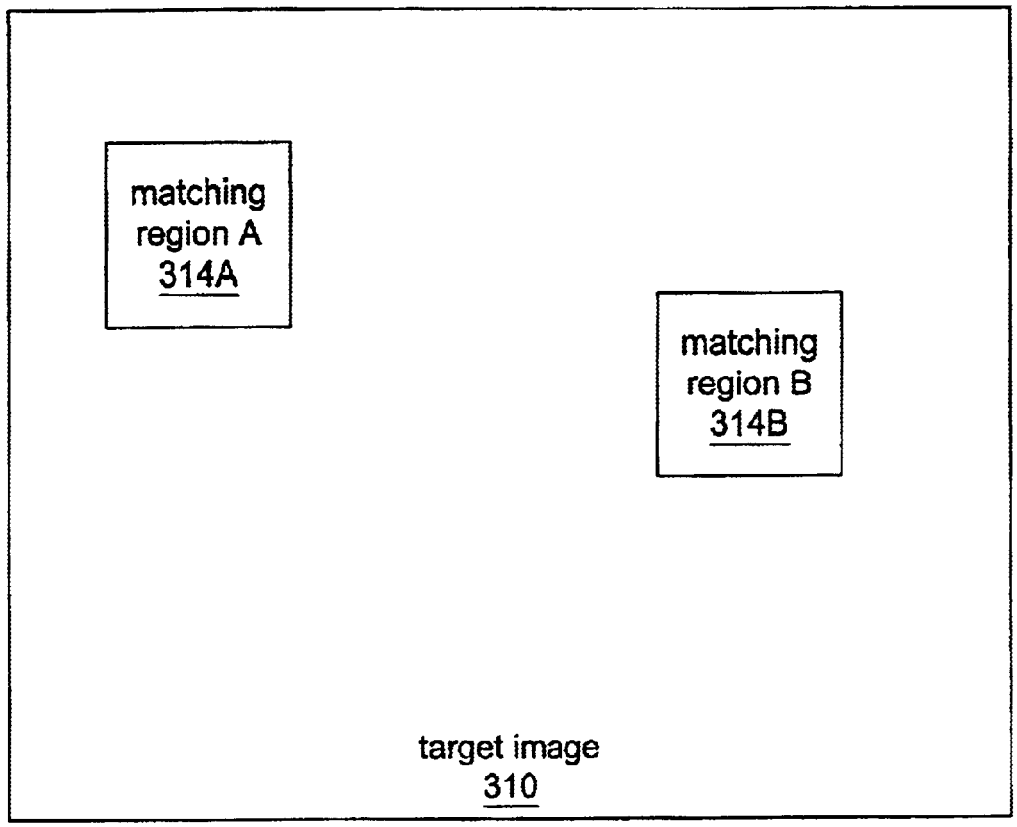
FIG. 18B illustrates the target image of FIG. 18A and pattern matching regions found based on luminance pattern matching within the regions shown in FIG. 18A.

FIGS. 18A—18B: Example Search

FIGS. 18A–18B illustrate an example of the multi-pass search process discussed above with reference to FIG. 13. FIG. 18A illustrates a target image 310 and several regions within the target image labeled as "candidate regions" 312. Each candidate region is intended to illustrate a larger region that surrounds and includes or encompasses a candidate color match region determined in the first-pass color match search (step 452 of FIG. 13). As shown, candidate regions 312A, 312B, and 312C are of different sizes. As noted above, the size of a region surrounding a color-match candidate region may depend on factors such as how well the color-match candidate region matched the template image with respect to color.

FIG. 18B illustrates the same target image 310 and intermediate matching regions 314, which were found within the candidate regions 312, based on luminance or gray-scale pattern matching. In other words, the matching regions 314 are the matching regions determined after steps 452 and 454 of FIG. 13 have been performed. In this example, no region within candidate region 312C was determined to match the pattern information of the template image. Thus, only two matching regions are shown.

Figure 19:
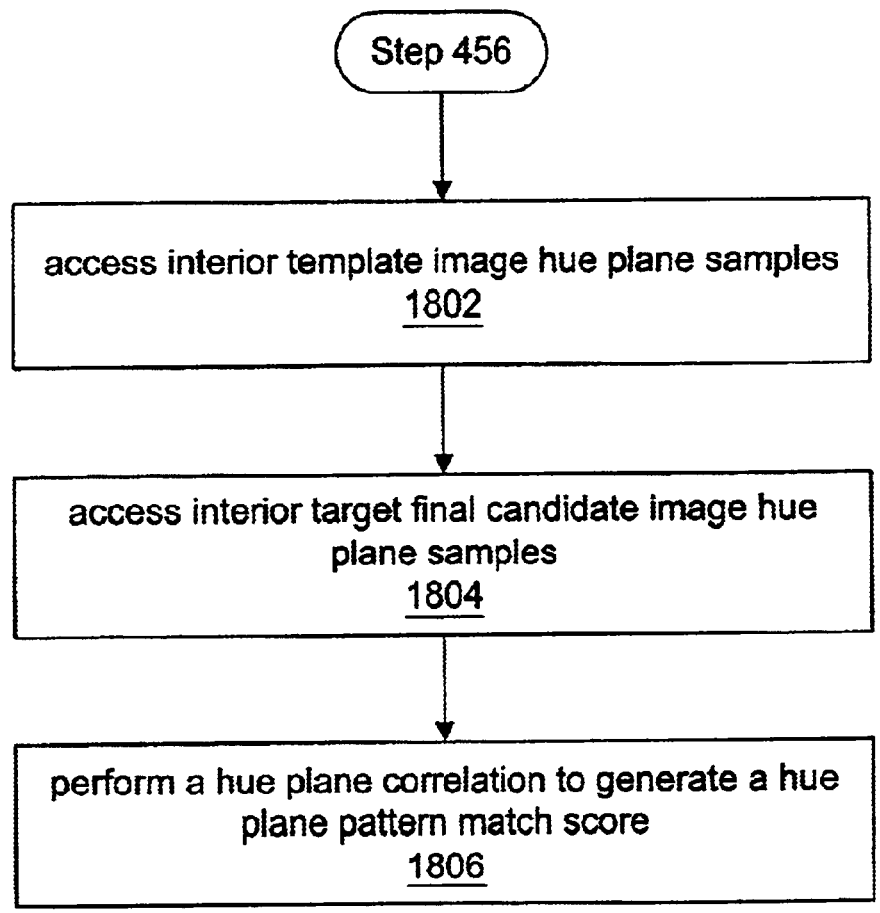
FIG. 19 is a flowchart diagram illustrating one embodiment of a method for performing a hue plane pattern matching score in an image.

FIG. 19—Flowchart of Hue Plane Pattern Matching Score Process

FIG. 19 is a flowchart of one embodiment of the hue plane pattern match scoring performed for each luminance plane pattern match candidate region, as shown in step 456 of FIG. 13. As mentioned above, in various embodiments, one or more of the steps may be performed in an order different from that shown, or may be omitted, as desired. Furthermore, additional steps may be performed.

As FIG. 19 shows, in 1802, interior template image hue plane samples may be accessed. In 1804, interior target final candidate image hue plane samples may be accessed. In other words, pixel data related to the hue plane may be accessed for interior pixels (as opposed to edge pixels) of any determined patterns in the template and in each candidate region.

Then, in 1806, a hue plane correlation may be performed using the accessed pixel data to generate a hue plane pattern match score for each candidate region. Said another way, for each candidate region, a pattern match score may be calculated using hue plane pixel data, but where edge pixels are ignored.

For example, in an application where resistors with identifying colored stripes are examined, the luminance plane pattern matching process above may provide candidate regions where the location of stripes of substantially the same intensity match the template image. The calculation of a hue plane pattern match score may determine whether the corresponding stripes actually have the same color.

Figure 20A:
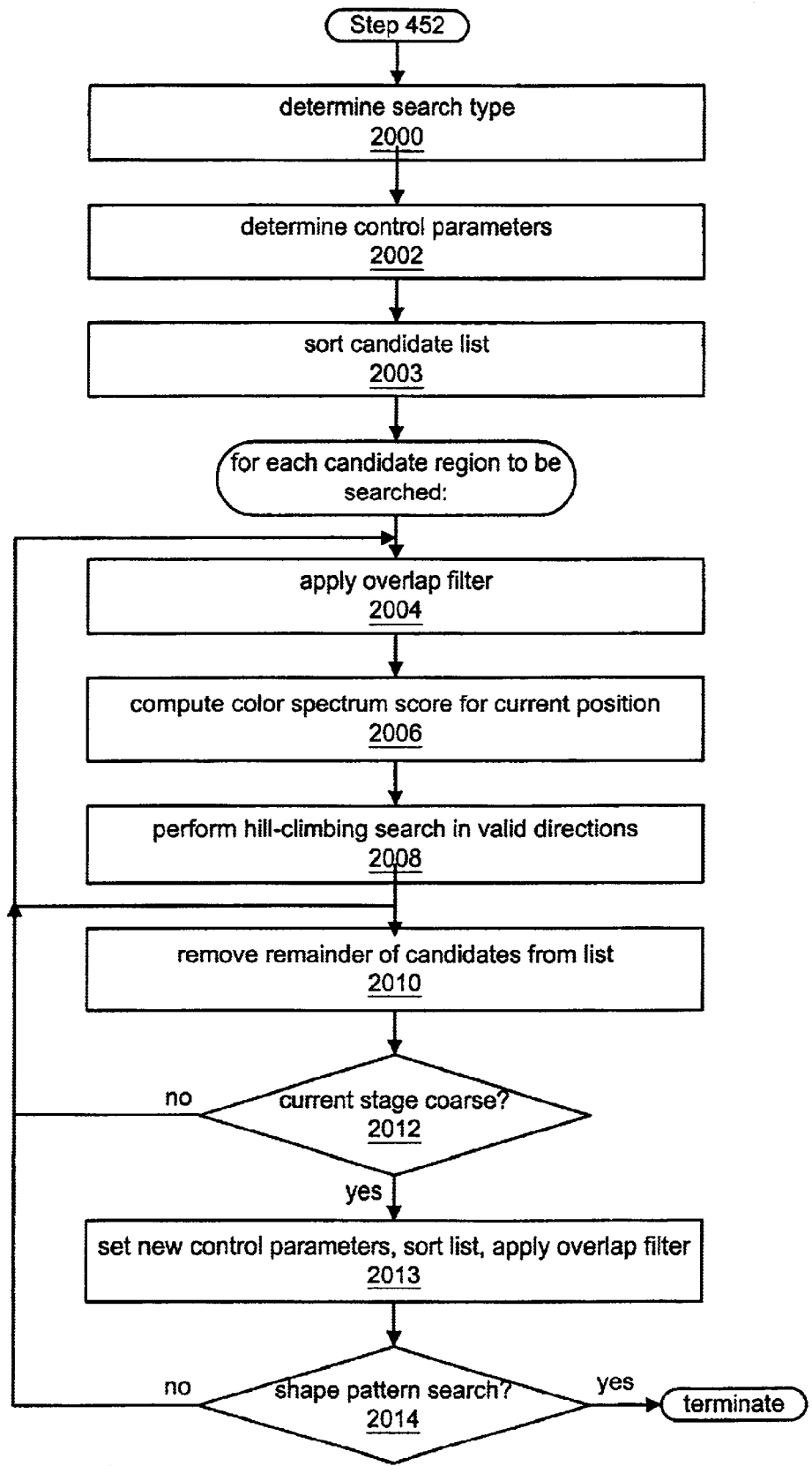
FIGS. 20A–20B are flowchart diagrams illustrating use of a hill-climbing method for performing color and/or pattern matching in an image.
Figure 20B:
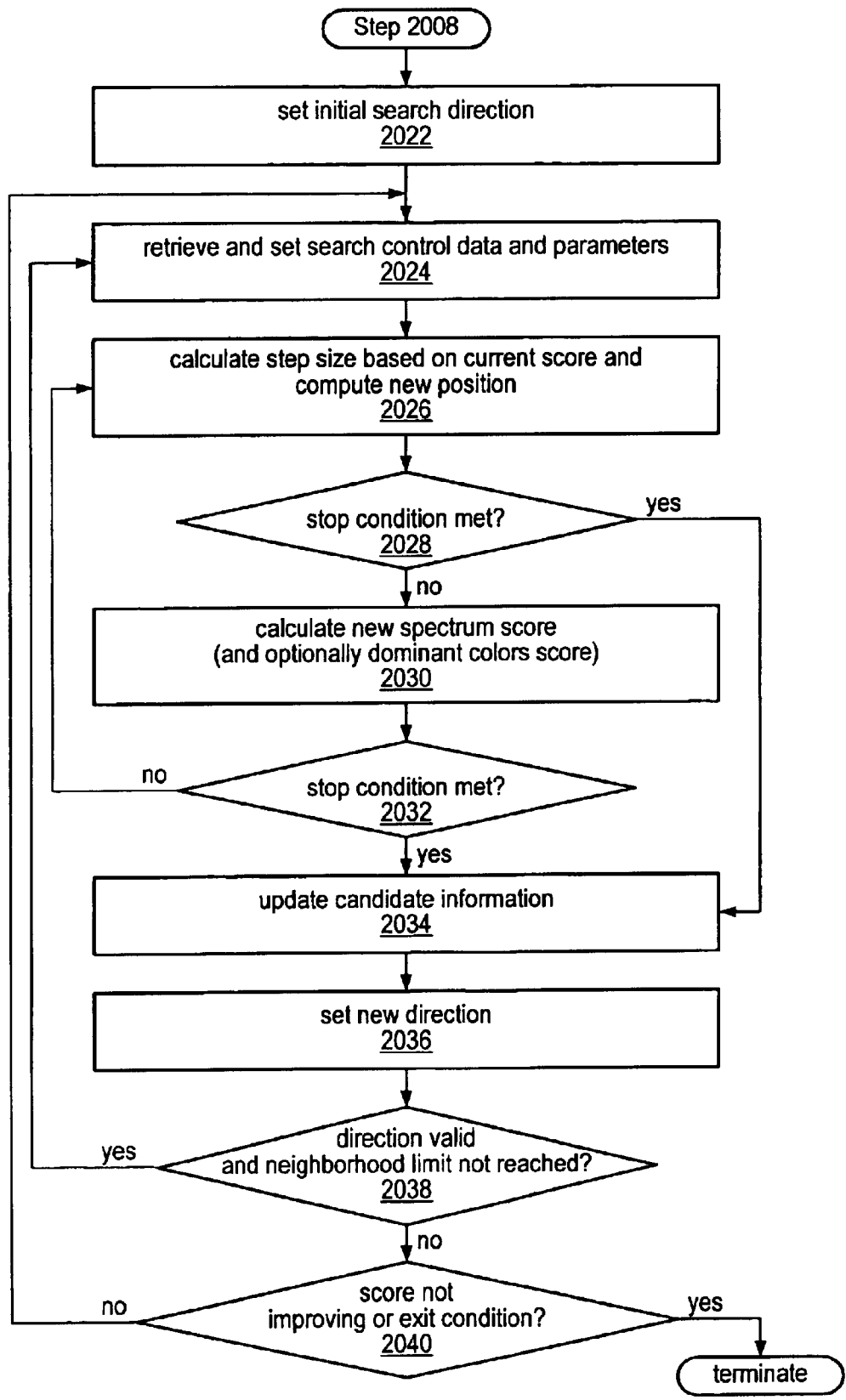

FIGS. 20A–20B—Hill-Climbing Technique

As mentioned above, in one embodiment, the hill-climbing technique used in the color pattern matching process may be performed in two stages: coarse and fine. The coarse hill-climbing stage may improve each color match by performing one iteration of the hill-climbing technique to generate a coarse match, whereas in the fine hill-climbing stage, the technique iterates until an optimal (local) position is detected.

In one embodiment, where only pattern matching is requested, coarse hill-climbing may be performed alone, i.e., without the fine stage, because the pattern matching process may only need a rough estimate of the color location to find a match. In contrast, for color only (or for color and pattern) matching, the coarse hill-climbing may be performed first to reduce the number of candidates processed in the next stage, i.e., the fine hill-climbing stage. FIGS. 20A–20B illustrate embodiments of a hill-climbing technique applied to the matching search processes described above.

FIG. 20A is a flowchart of a matching search performed using a hill-climbing technique, according to one embodiment. It is noted that in other embodiments, various of the steps shown may be performed in a different order, or may be omitted, as desired. Furthermore, additional steps may be performed.

As FIG. 20A shows, in 2000, a determination may be made as to search type. The stages performed may changed depending on the search type. For example, if the search type is a pattern match search, a coarse search alone may be performed. If the search type is a color match search, then a coarse search may be performed, followed by a fine search. In either case, a coarse stage is indicated for the first pass, described below.

As mentioned above, after the search type is determined, and the stage set (e.g., coarse), the hill-climbing search process may include initialization of one or more control parameters, as indicated in 2002. Examples of control parameters may include number of candidates to update (N), movements (directions, such as North, South, East, West) allowed, amount of overlap allowed between updated candidates, and type of spectrum information to use in comparisons (e.g., spectrum size, subsampling rate, etc), among others. In another embodiment, default values may be provided for the control parameters, which may be modified by the user as necessary. For example, in one embodiment, "overlap" is defined as two candidates have x percentage of their pixels overlapping. An example default value of x may be set at 20%. In one embodiment, x is a internal controllable variable, i.e., may be modified during the process.

In 2003, a received candidate list may be sorted by the candidates' current scores calculated in the previous high-level search (step 452 of FIG. 13). For each of the first N sorted candidates the following steps may be performed (where N is the maximum number of candidates to be searched by hill-climbing, set above in 2002).

In 2004, the candidate may be checked to see if it overlaps with any previous candidate updated. If an overlap exceeds a predetermined threshold, e.g., an overlap limit, the candidate may be deleted and the next candidate in the list considered. In one embodiment, an overlap filter may be defined by one or more overlap limits, and applied to determine the candidate overlap. If the candidate is not removed from consideration due to overlap, the candidate's color spectrum information may be extracted based on the control parameters, as described below in steps 2006–2012.

In 2006, a color spectrum score may be computed for the candidate at an initial position, i.e., the current position.

Then, in 2008, the candidate may be updated via performance of a series of one-directional hill-climbing searches (described below with reference to FIG. 20B) and a new score may be generated corresponding to the new position. Said another way, a set of single-direction (one-dimensional) hill-climbing searches may be performed, where each allowed direction is successively explored until the score does not increase or until an end condition is met. Examples of end conditions include moving beyond a distance threshold in a particular direction, and exceeding an overlap threshold with another candidate region.

Once the sorted candidates have been searched as described above, and N candidates selected, the remaining candidates may be deleted or removed from the list, as indicated in 2010.

In 2012, if the current stage is coarse, new control parameters may be set, e.g., overlap limits, number of candidates to process (N prime), etc., the list may be sorted by score, and the overlap filter applied with the updated parameters, as indicated in 2013. In one embodiment, any candidates beyond N prime may also be deleted or removed from the list. Then, in 2014, if the search type is pattern match search, the process may terminate, with the sorted list of candidates as output. Otherwise, if the search type is not a pattern search, the stage may be set to fine, and the process repeated from step 2002 above. In other words, steps 2002–2010 may be repeated on the updated candidates until either the score does not improve, i.e., until the new score is less than (or less than or equal to) the current score, or an exit condition exists, as described below with reference to FIG. 20B.

If, in 2012, the current stage is not coarse, the process may terminate as shown, and the final list of updated candidates represents the results of the hill-climbing process.

FIG. 20B is a more detailed flowchart of step 2008 above, in which a series of successive one-directional hill-climbing searches is performed on the candidate image. In one embodiment, a candidate may be moved in one direction by a variable step size for as many iterations as the following is true: the new position improves the color spectrum score and the dominant colors score does not decrease. As mentioned above, the dominant colors score is a reduced color spectrum score where only the largest spectrum bins from the template are compared to the target's spectrum. In one embodiment, the variable step size may be reduced as the spectrum score improves beyond defined thresholds. In other words, as the scores trend upward, the step size decreases, such that the relatively large steps are taken in low-matching regions, and small steps are taken in high-matching regions.

As FIG. 20B shows, in 2022, an initial search direction may be selected, e.g., West. It is noted that in 2002 above, control parameters were set, including allowed directions for this particular search and stage. For example, for a coarse stage, allowed directions may be West, East, North, and South, while for a fine stage, additional directions North-West, South-East, South-West, and North-East may be included as well.

In 2024, search control data and control parameters may be retrieved and set. For example, search control data such as neighborhood limits and step size score divisions may be set. Neighborhood limits (e.g., dxLimit and dyLimit) may determine the maximum distance from the initial position allowed in a search, i.e., the extent of the neighborhood. The step size score divisions may set Low, Medium, and High step size threshold values dependent on whether the search method is set to be aggressive, conservative, or balanced. These defined thresholds may be used in adjusting step size in accordance with scores, as mentioned above, such that as the scores trend upward, the step size decreases. For example, in one embodiment, scores up to 400 may use the Low step size (e.g., 4), scores between 400 and 550 may use the Medium step size (e.g., 2), and scores exceeding 550 may use the High step size (e.g., 1). Note that a High step size refers to high resolution/small step size, as opposed to a large step size (low resolution). The control parameters set may include the initial position, initial score, and initial dominant or main colors score, among others. In the preferred embodiment, dominant or main color scoring is not used when the search is set to be aggressive.

In 2026, a step size may be calculated based on the current score, and a new position computed. The new position may be used to calculate stop conditions, as mentioned above. For example, the position may be checked against the image border, neighborhood limits, and overlap with updated candidate regions. In one embodiment, if the neighborhood limits or the overlap conditions are met, the process may return immediately to 2028 above (which subsequently will test against the stop conditions), circumventing the remaining steps of the inner loop.

In 2028, a determination may be made as to whether to continue processing, i.e., whether a stop condition has been met. A distinction should be made between the stop condition and an exit condition. The exit condition relates to the termination of the overall process, as described above with reference to FIG. 20A, while the stop condition controls whether a search in a particular direction continues or stops. In other words, when a stop condition is met, the search in the current direction is stopped, and a new direction selected for search. The stop condition may include one or more of: the new position being at a border of the image, exceeding neighborhood limits, or overlapping with an updated candidate region. The purpose of this stop condition check is to circumvent execution of the rest of the inner loop when the new calculated position meets or exceeds limits of the proper search area.

In 2030, a new spectrum score and dominant colors score (if applicable) may be calculated at the new position, and stop conditions calculated using the new scores. In one embodiment, a stop condition may include the new spectrum score decreasing with respect to the previous score while the new dominant colors score decreases or remains the same. In one embodiment, a determination may be made as to whether the search has moved in the current direction. In other words, the search only moves in a particular direction if the spectrum score improves, therefore, if the new spectrum score improves over the previous best score, a move may be considered to have occurred. This fact may be used to avoid searching in a direction opposite to the current direction, as described below in 2036. Thus, if a move North improves the score, then a move South may be precluded.

In 2032, a determination may be made as to whether to continue processing, i.e., whether a stop condition has been met. The stop condition may include the spectrum score at the new position failing to meet or exceed the current (best) score. In one embodiment, the stop condition may further include the dominant color score at the new position failing to exceed the current dominant color score. This condition controls the inner processing loop. In one embodiment, if the stop condition is not met, then processing may continue in 2026, described above. In other words, iteration of the inner loop may continue, as FIG. 20B shows.

If in 2032, a stop condition is determined to have occurred, then in 2034, candidate information may be updated. In other words, current positions and scores may be compared to previous best positions and scores, and updated accordingly. For example, in one embodiment, if the latest subregion has been determined to be on the border of the region, and the spectrum score increases, the current position may be set to this new position, and the best spectrum score may be set to the new spectrum score, otherwise, the current position may be set to the previous best position, and the best spectrum score set to the previous best spectrum score.

After the candidate information is updated in 2034, then in 2036, the direction may be updated. For example, as noted above in 2032, if the search has moved successfully ina given directions, then the opposite direction may be skipped. Otherwise, the next valid direction may be selected to continue the search.

In 2038, a determination may be made as to whether the direction is valid (is an allowed direction) and no neighborhood limit has been reached. In other words, as long as the direction is valid and neighborhood limits have not been exceeded, the search may continue. This conditional controls the middle processing loop, as shown in FIG. 20B.

In 2040, a determination may be made as to whether the current score has not been exceeded or whether an exit condition has been met. This conditional effectively establishes that as long as scores are improving and an end condition is not met, the search may continue. This conditional controls the outer processing loop.

In one embodiment, for coarse climbing, four directions may be explored in the following order: West, East, North, and South; fine climbing may add further directions: North-West, South-East, South-West, and North-East. Of course, in other embodiments, other directions may be defined and used as desired. Since a new direction starts from the where the last direction stopped, directions may be skipped if they backtrack a previous direction. For example, moving East only makes sense if no movement to the West was possible. This climbing technique may be applied in an iterative process where it is applied in each direction consecutively to improve the candidate's score. This technique is complete if at least one of the following conditions is true: the candidate is in an optimal position, the candidate overlaps a previously updated candidate (and needs to be deleted), the candidate is at an image border, or the candidate is too far from its original position, based on a set parameter value (distance).

Thus, a hill-climbing approach may be used to explore subregions in and adjacent to a candidate region. It should be noted that the above example illustrates the use of hill-climbing with a depth-first search approach, where a given direction is searched until the score doesn't improve, then the next direction is searched, etc. In other embodiments, a breadth-first search approach may be used, where scores are computed for each adjacent subregion (for the current position), and a move made in the direction where the score improves the most. This process may be repeated at each successive position in the search. In yet further embodiments, various combinations of depth-first and breadth-first search approaches may be used.

It should be noted that the methods described above are meant to be illustrative, and are not intended to limit the techniques brought to bear in the matching searches. Various of these other techniques are briefly described below.

Rotation Invariant Color and Pattern Matching

Rotation invariant color and pattern matching relates to situations where the target image is rotated with respect to the template image. Thus, performing a rotation invariant color and pattern matching search may include characterizing or representing the template image for rotation invariant matching. On approach is to sample the template image to find color information and a reduced set of sample pixel values or points that characterize the template accurately, and which are also conducive for finding the template image pattern in the target image irrespective of the orientation of the template image pattern in the target image. For example, the color information of a square region of the template image may be characterized, such as the square bounding the largest circle that fits within the template image. In another embodiment, the color information of the largest square fitting within the largest circle may be analyzed. Thus, pixel values may be sampled or located in the template image along one or more rotationally invariant paths, e.g., the circular perimeter of one or more circles. This essentially operates to sample the image in a manner which is rotationally invariant, i.e., locate pixels in the template image along one or more circular perimeters or circular paths. These pixel values may then be compared to corresponding pixel values in candidate regions of the target image.

Scaled Versions of the Template Image

The method described above may also be used to search for changes in size of the template image in the target image. In other words, the pattern matching may also be used to search for scaled versions (larger or smaller) of the template image. This is accomplished by scaling (increasing or decreasing) the size of the search circles. More particularly, for scale invariant matching, the method uses sample pixels from a respective circular perimeter from the template, e.g., of radius R. During the pattern matching, the method changes the radius of the search circle. The method increases the radius R when searching for patterns that are bigger than the template image and decreases the radius R when searching for patterns in the image that are smaller than the template image. For farther information regarding rotation invariant color and pattern matching, please see U.S. patent application Ser. No. 09/638,271 titled "System and Method for Locating Color and Pattern Match Regions in a Target Image," which was incorporated by reference above.

Fuzzy Pixel Classification

As mentioned above, in one embodiment, fuzzy membership techniques may be applied to pixel bin allocation, where pixels are shared between bins according to weights. For example, the level of sharing or distribution to perform may be determined according to a color sensitivity level specified by the user, or determined automatically by a computer, e.g., if a certain threshold of pixels of the template image and the target image region fall into respective neighboring bins, then the method may automatically apply a level of sharing or distribution. In one embodiment, each bin shares with zero bins, one neighboring bin on each side, or two neighboring bins on each side, depending on a specified sensitivity level of low, medium, or high, respectively. In one approach, the pixel allocation percentages may be re-distributed among neighboring bins. For example, in one embodiment, a respective bin that contains 40% of all pixels may share 10% of its total with the neighboring bins on either side. In other words, 4% (10% of 40%) may be added to the neighboring bins on either side of the respective bin, leaving 32% in the respective bin (40%−4%−4%=32%). The neighboring bins may then undergo the same sharing process, and a certain percent may be shifted back as well as a certain percent being shifted to another neighboring bin, and so on. Any of various other methods may be used in redistributing the pixel percentages. These types of adjustments may have an effect similar to adding additional bins, making the results smoother. Hence, these types of adjustments may be referred to as "smoothing operations". A smoothing operation may be performed for both the template image and the target image region. The compensated percentages of the template image and target image region may then be compared, for example, by subtracting percentages in respective bins of the template image and target image region and summing the results. This may produce a value representing a measure of difference between the color information of the template image and the color information of the target image region.

Various embodiments may employ fuzzy membership functions to determine the desired distribution among multiple bins. For example, a fuzzy membership function may be applied, based on where the pixel falls within the bin, and may determine a contribution which the pixel should make to one or more neighboring bins. For example, if the pixel falls near the edge of a bin (with respect to the portion of the color space that the bin corresponds to), then the fuzzy membership function may determine that a portion of the weight of the pixel should be contributed to the neighboring bin which the pixel is near. Any of various types of fuzzy membership functions may be applied, and the function may determine a contribution which the pixel should make to any number of bins, wherein the sum of these contributions is 100%. For further information regarding fuzzy membership in pixel bin allocation, please see U.S. patent application Ser. No. 09/737,531 titled "System and Method for Color Characterization Using Fuzzy Pixel Classification with Application in Color Matching and Color Match Location," which was incorporated by reference above.

Figure 21:
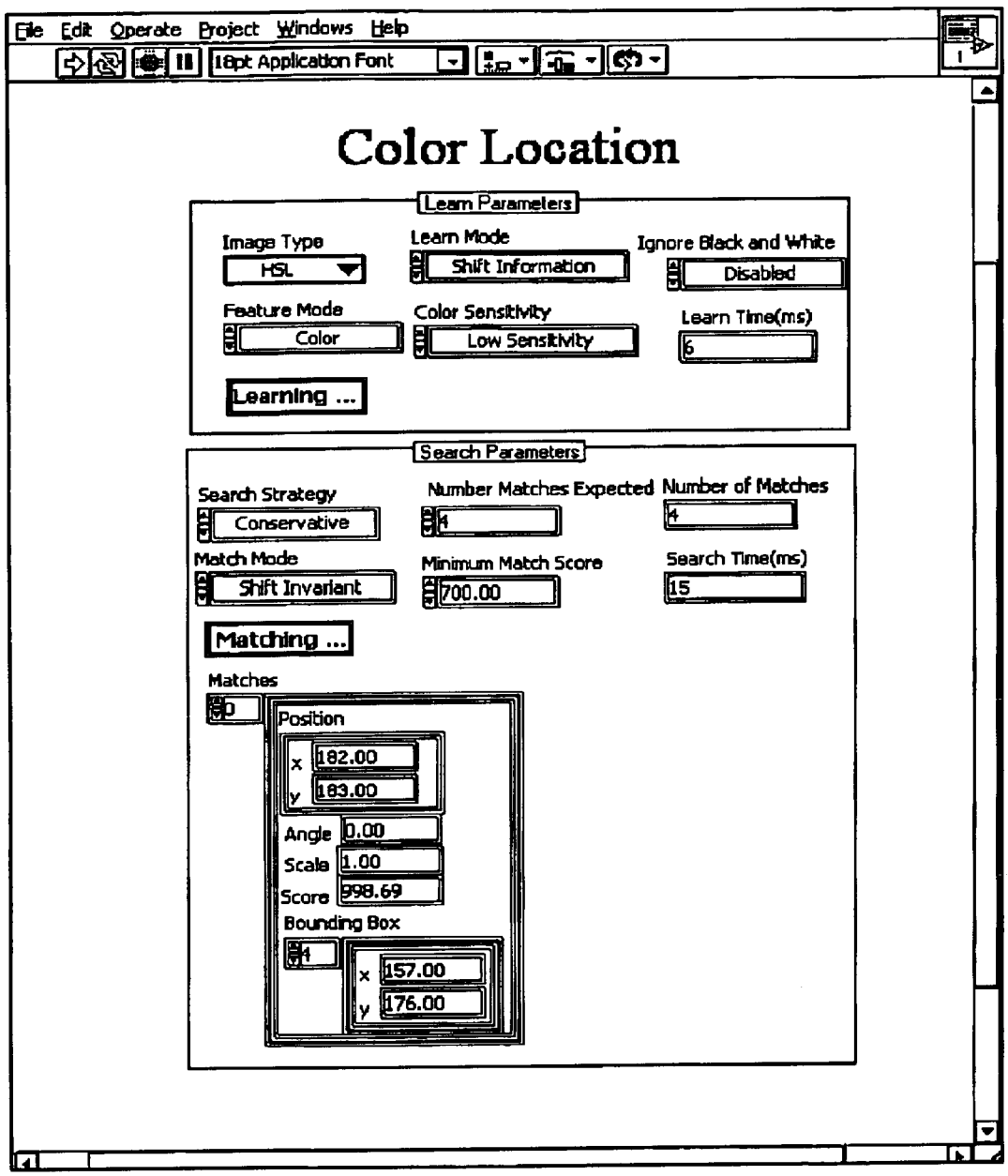
FIG. 21 illustrates an example of a graphical user interface (GUI) associated with color and pattern match location software according to one embodiment of the present invention.

FIG. 21—Displaying Color Match Regions

FIG. 21 illustrates an example of a graphical user interface (GUI) associated with color and pattern match location software according to one embodiment of the present invention. A brief description of applicable GUI elements is given below. It is noted that various other embodiments of such a GUI may comprise GUI elements enabling the user to specify variables affecting the color and pattern match location operation at a broader or finer level of granularity than the GUI shown in FIG. 21.

"Image Type" displays the color format of the current target image. Color formats may include RGB, CMY, or HSI, among others.

"Learn Mode" specifies the invariant features to learn when setting up a learn color pattern. The following values may be selected: "All" (extracts template information for shift and rotation invariant matching"; "Shift Information" (Default) (extracts information for shift invariant matching); "Rotation Information" (extracts information for rotation invariant matching).

"Ignore Black and White" enables the user to specify that pixels classified as black and/or white are ignored in the match location operation.

"Feature Mode" specifies the features to use in the searching stage. The following values may be chosen: "Color" (use color features only in the searching stage); "Shape" (use shape features in the searching stage); and "Color and Shape" (Default) (use both color and shape features in the searching stage.

"Color Sensitivity" specifies a level of color sensitivity ("low", "medium", or "high"). This setting may affect the number of color category divisions to use.

"Search Strategy" specifies the different searching algorithms to achieve a tradeoff between search speed and accuracy. The default option is "Balanced". In case the speed does not meet requirements, the "Aggressive" option may be used. In case the accuracy does not meet requirements, the "Conservative" option may be used.

"Number of Matches Expected" specifies a number of matches expected to be found in the target image, which may be used in limiting the number of target image regions searched.

"Match Mode" specifies the technique to use when looking for the template pattern in the image. The following values may be chosen: "Shift Invariant" (default) (searches for the template pattern in the image, assuming that it is not rotated more than ±4°); "Rotation Invariant" (searches for the template in the image with no restriction on the rotation of the template). If the "Feature Mode" is set to "Color" only, then the rotation Invariant matching can also be achieved by using a square template image in "Shift Invariant" mode.

"Minimum match score" specifies a threshold value for color match scores. The data range is between 0 and 1000.

As shown, the GUI also includes various fields for viewing information for each match region of the target image, once the search has been performed, such as the location and size of the region, a match score indicating how close the color information of the region matches the color information of the template image, etc.

Figure 22:
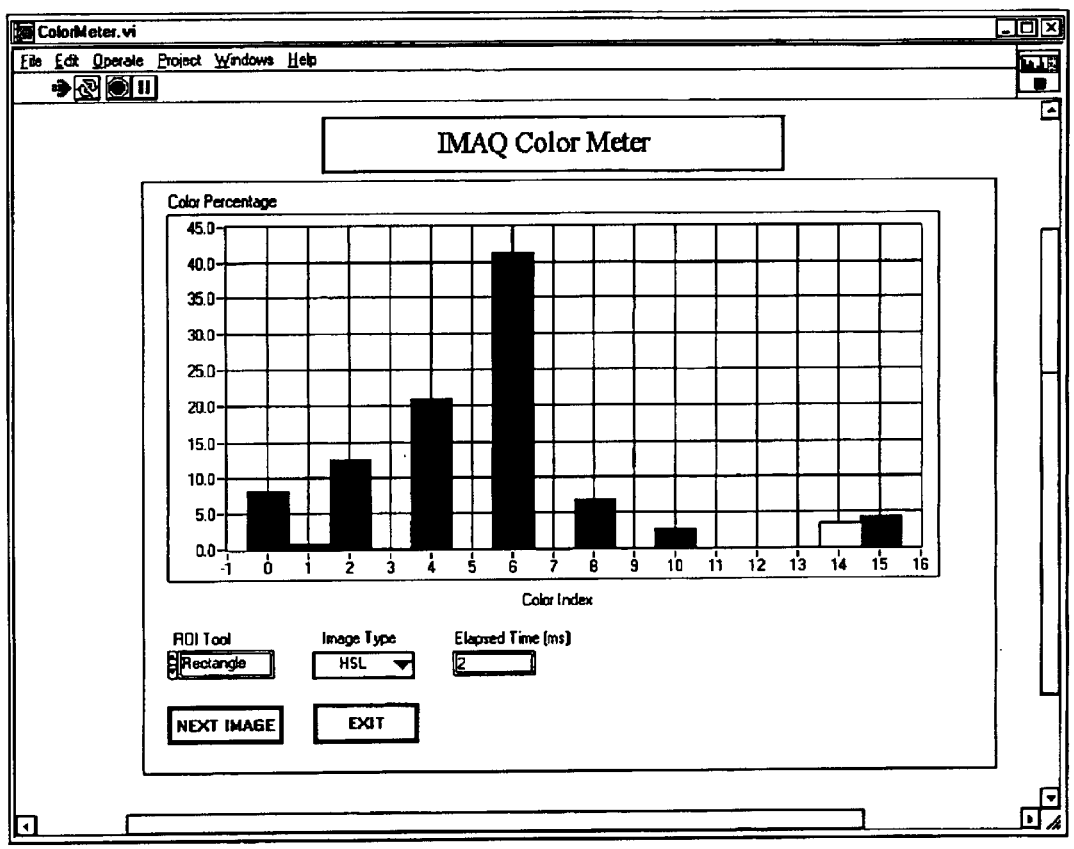
FIG. 22 illustrates an exemplary display of information representing the color characterization of an image or portion of an image.

FIG. 22—Display Color Characterization Information

In one embodiment, an application may be operable to display information representing the color characterization of an image or portion of an image. FIG. 22 illustrates one example of such a display. FIG. 22 shows the percentage (vertical scale) of 16 defined colors (horizontal scale) as determined by one embodiment of the color characterization method described herein.

The color characterization list or data structure may further be operated upon to create a color characterization represented as a single value. The color characterization may also be represented textually (e.g., by the terms brick red, jet black, mauve, etc.) through the use of a look-up table configured according to the color categorization method of the present invention. The color characterization may also be represented graphically in various ways. The color characterization may be stored along with the image or transmitted to other computer systems for analysis or display. The color characterization may also be used as part of an image compression technique.

Figure 23:
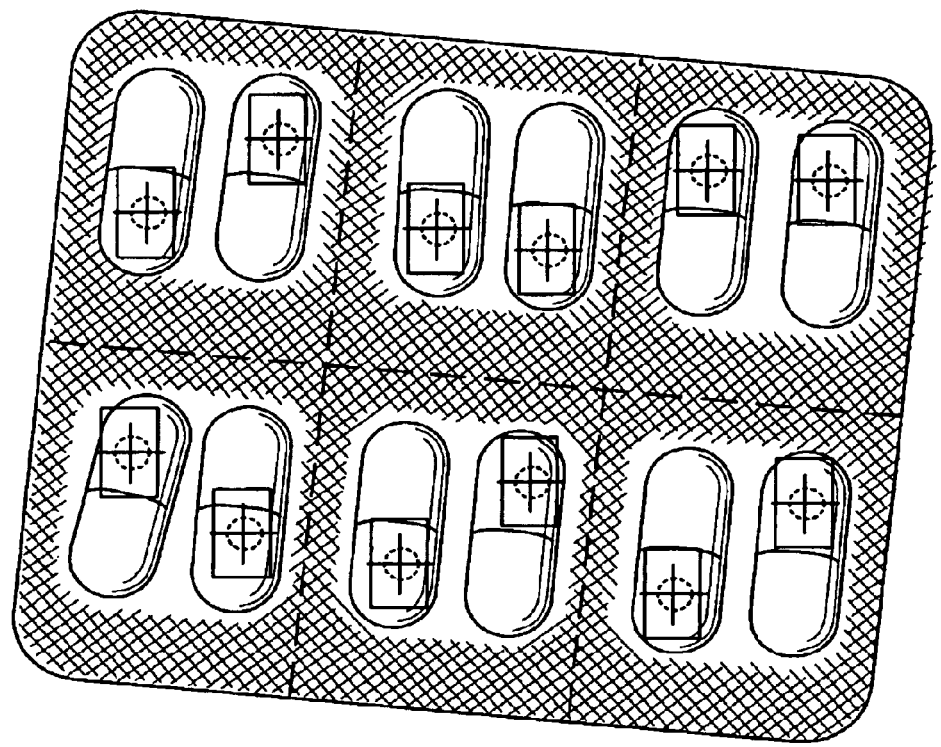
FIG. 23 illustrates a user interface in which locations of color match regions within a target image are visually indicated.

FIG. 23—Displaying Color Match Regions

A software application using the color location method described above may be operable to visually indicate the locations of the match regions determined by the method. For example, as shown in FIG. 23, the application may display a box around each match region. The application may also be operable to display various statistics regarding each match region found.

Thus, in various embodiments, the method operates to locate regions of a target image that match a template image with respect to color and pattern information. The method may comprise performing a color matching search through the target image in order to find one or more color match regions, wherein the color match color regions match the template image with respect to color information. The method also may perform a luminance pattern matching search through each of the color match regions in order to find one or more pattern match regions in the target image. The method may then perform a hue plane pattern matching search on the pattern match regions to determine regions which match the template image in both color and pattern. As described above, the color matching search and the pattern matching search may be performed in any of various desired orders.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for locating regions of a target image that match a template image with respect to color and pattern information, the method comprising:

performing a color matching search through the target image in order to find one or more color match candidate regions, wherein the one or more color match candidate regions match the template image with respect to color information;

performing a luminance pattern matching search in the one or more color match candidate regions in order to find one or more luminance pattern match candidate regions in the target image; and calculating a hue pattern matching score for the one or more luminance pattern match candidate regions;

wherein the hue pattern matching score is useable in determining regions of the target image that match the template image with respect to color information.

2. The method of claim 1, further comprising:

providing output indicating the one or more luminance pattern match candidate regions in the target image, wherein the one or more luminance pattern match candidate regions match the template image with respect to color and pattern information.

3. The method of claim 1, further comprising:

determining one or more final match regions in the target image using the calculated hue pattern matching scores; and providing output indicating the one or more final match regions in the target image, wherein the one or more final match regions match the template image with respect to color and pattern information.

4. The method of claim 1, further comprising:

generating a color characterization of the template image prior to performing the color matching search;

wherein said performing a color matching search comprises:

generating a color characterization of a plurality of regions of the target image;

comparing the color characterization of the template image with the color characterization of each of the plurality of regions; and generating a score for each of the plurality of regions indicating correlation between the color characterization of the template image and the color characterization of each of the plurality of regions.

5. The method of claim 4, wherein said performing a color matching search further comprises:

receiving user input specifying color matching search options;

performing a first-pass color characterization search through the target image to find initial color match candidate areas;

searching proximal regions of each said initial color match candidate area to find a best color match region for each area;

calculating a color match score for each said best color match region; and generating a final list of color match regions based on said color match scores.

6. The method of claim 5, wherein said searching proximal regions comprises using a hill-climbing technique to find said best color match region for each area.

7. The method of claim 6, wherein said searching proximal regions to find said best color match region for each area using a hill-climbing technique comprises:

using a coarse hill-climbing technique to find a coarse color match candidate region; and using a fine hill-climbing technique on the coarse color match candidate region to find the best color match region for each area.

8. The method of claim 5, wherein said searching comprises searching among a plurality of subregions within the proximal region, wherein said searching comprises:

moving among the plurality of subregions using a coarse hill-climbing technique to find a coarse candidate subregion; and searching proximal subregions of the coarse candidate subregion by a fine hill-climbing technique to find the best color match region.

9. The method of claim 4, further comprising:

calculating a final color match score for the one or more luminance pattern math candidate regions, wherein, for each luminance pattern match candidate region, calculating the final color match score comprises:

comparing the color characterization of the template image with the color characterization of the luminance pattern match candidate region; and generating the final color match score for the luminance pattern match candidate region indicating correlation between the color characterization of the template image and the color characterization of the luminance pattern match candidate region.

10. The method of claim 9, further comprising determining one or more final match regions in the target image using the hue pattern match score and the final color match score; and providing output indicating the one or more final match regions in the target image, wherein the one or more final match regions match the template image with respect to color and pattern information.

11. The method of claim 9, wherein said performing a luminance pattern matching search further comprises calculating a luminance pattern match score for each of the one or more luminance pattern match candidate regions in the target image, the method further comprising:

determining one or more final match regions in the target image using the luminance pattern match score, the hue pattern match score, and the final color match score for each of the one or more luminance pattern match candidate regions; and providing output indicating the one or more final match regions in the target image, wherein the one or more final match regions match the template image with respect to color and pattern information.

12. The method of claim 9, wherein, for each color match candidate region, the luminance pattern matching search comprises comparing luminance values of pixels in the template image with luminance values of pixels in the color match candidate region of the target image.

13. The method of claim 9, wherein, for each luminance pattern match candidate region, calculating the hue pattern match score comprises comparing hue values of pixels in the template image with hue values of pixels in the luminance pattern match candidate region of the target image.

14. The method of claim 13, wherein the pixels in the luminance pattern match candidate region exclude edge pixels of hue patterns in the luminance pattern match candidate region.

15. The method of claim 9, further comprising:

receiving user input indicating one or more colors to be masked in the color matching search;

modifying color bin values for the selected masked colors in the color characterizations of the template image and the plurality of regions of the target image to produce respective masked color characterizations of the template image and the plurality of regions of the target image; and using the masked color characterizations in said color matching search.

16. The method of claim 15, wherein said modifying color bin values comprises subtracting a value from each masked color bin value, and wherein the resultant values are adjusted to be non-negative.

17. The method of claim 15, further comprising:

zeroing color bin values for the selected masked colors in the color characterizations of the template image and the plurality of regions of the target image to produce respective true masked color characterizations of the template image and the plurality of regions of the target image; and using the true masked color characterizations in said calculating a final color match score.

18. The method of claim 4, further comprising:

calculating a luminance pattern match score for each of the one or more luminance pattern match candidate regions, wherein the luminance pattern match score indicates a luminance pattern match correlation between a luminance pattern match candidate region and the template image;

calculating a hue pattern match score for each of the one or more luminance pattern match candidate regions, wherein the hue pattern match score indicates a hue pattern match correlation between a luminance pattern match candidate region and the template image;

calculating a final color match score for each of the one or more luminance pattern match candidate regions, wherein the final color match score indicates a color match correlation between a luminance pattern match candidate region and the template image;

calculating a final score for each of the one or more luminance pattern match candidate regions based on the luminance pattern match score, the hue pattern match score, and the final color match score; and determining one or more final match regions in the target image based upon the calculated final score of each of the one or more luminance pattern match candidate regions, wherein each of the one or more final match regions matches the template image with respect to color, luminance pattern, and hue pattern.

19. The method of claim 18,
wherein, for each luminance pattern match candidate region, calculating the final color match score comprises:
  comparing the color characterization of the template image with the color characterization of the luminance pattern match candidate region; and
  generating the final color match score for the luminance pattern match candidate region indicating correlation between the color characterization of the template image and the color characterization of the luminance pattern match candidate region.

20. The method of claim 1, further comprising:
for each final match region found that matches the template image with respect to color and pattern information, displaying information on a graphical user interface indicating the location of the final match region within the target image.

21. The method of claim 1, further comprising:
for each final match region found that matches the template image with respect to color and pattern information, displaying information on a graphical user interface indicating a degree to which color and pattern information of the final match region matches color and pattern information of the template image.

22. The method of claim 1, wherein said performing the luminance pattern matching search comprises:
for each color match region found in the color matching search, performing a luminance pattern matching search of a proximal region proximal to the color match region in order to find one or more final match regions in the target image;
wherein the one or more final match regions found in the luminance pattern matching search of each proximal region match the template image with respect to color and pattern information.

23. The method of claim 22,
wherein said performing a luminance pattern matching search of a proximal region proximal to each color match region comprises performing a plurality of iterations of luminance pattern matching in the proximal region.

24. The method of claim 23,
wherein the plurality of iterations of luminance pattern matching are performed in a coarse to fine manner.

25. The method of claim 24,
wherein said performing the plurality of iterations of luminance pattern matching in a coarse to fine manner uses one or more of:
  sets of sample pixels with successively smaller stability neighborhood sizes; and
  sets of sample pixels with successively smaller step sizes.

26. The method of claim 24, wherein said searching a proximal region comprises:
  using a coarse hill-climbing technique to generate a coarse luminance pattern match candidate region; and
  using a fine hill-climbing technique on the coarse luminance pattern match candidate region to find the best luminance pattern match candidate region.

27. The method of claim 25, wherein said searching a proximal region comprises searching among a plurality of subregions within the proximal region, wherein said searching comprises:
  moving among the plurality of subregions using a coarse hill-climbing technique to find a coarse candidate subregion; and
  searching proximal subregions of the coarse candidate subregion by a fine hill-climbing technique to find the best luminance pattern match candidate region.

28. The method of claim 1,
wherein said performing the color matching search through the target image comprises:
  determining a plurality of sample regions at which to sample color information of the target image, wherein each sample region comprises a portion of the target image;
  for each of the plurality of sample regions, determining a measure of difference between color information of the sample region and the color information of the template image;
  for each of the plurality of sample regions, designating the sample region as a color match region if the measure of difference between the color information of the sample region and the color information of the template image is smaller than a threshold value.

29. The method of claim 28, further comprising:
performing a color characterization analysis of the template image;
for each of the plurality of sample regions, performing a color characterization analysis of the sample region;
wherein said determining the measure of difference between the color information of each sample region and the color information of the template image comprises comparing information obtained in the color characterization analysis of the sample region with information obtained in the color characterization analysis of the template image.

30. The method of claim 29,
wherein the template image and the target image each comprise a plurality of pixels;
wherein the color characterization analysis performed for the template image and the color characterization analyses performed for each of the plurality of sample regions comprise:
  examining color information of at least a subset of pixels;
  assigning each examined pixel to a color category that corresponds to a portion of a color space;
  determining information indicative of the allocation of the examined pixels across color categories;
wherein said comparing information obtained in the color characterization analysis of the sample region with information obtained in the color characterization analysis of the template image comprises comparing the allocations of the examined pixels across color categories for the sample region and the template image, respectively.

31. The method of claim 30,
wherein the color characterization analysis performed for the template image comprises examining color information of each pixel in the template image;
wherein the color characterization analyses performed for each of the plurality of sample regions comprise examining color information of only a subset of the pixels in the sample region.

32. The method of claim 30,
wherein the color information of the template image and the color information of the target image comprise hue, saturation, and intensity (HSI) color information;
wherein said examining color information of at least a subset of pixels comprises examining HSI information of the at least a subset of pixels;
wherein said assigning each examined pixel to a color category that corresponds to a portion of a color space comprises assigning each examined pixel to a color category that corresponds to a portion of HSI color space.

33. The method of claim 30,
wherein the color characterization analysis performed for the template image further comprises:
determining one or more dominant color categories, wherein the one or more dominant color categories are assigned a relatively larger proportion of examined pixels, with respect to other color categories of the color space.

34. The method of claim 32,
wherein said comparing information obtained in the color characterization analysis of each region of the target image to information obtained in the color characterization analysis of the template image comprises:
for each dominant color category, comparing the percentage of template image pixels assigned to the dominant color category to the percentage of target image region pixels assigned to that color category.

35. The method of claim 28, wherein the target image comprises a plurality of pixels, the method further comprising:
determining a first step size to use in said determining the plurality of sample regions at which to sample the color information of the target image;
wherein said determining the plurality of sample regions comprises:
determining a plurality of regions of the target image at which to sample the color information of the target image, wherein the plurality of regions are each specified by windows into the target image, wherein windows are offset from each other by a number of pixels specified by the first step size.

36. The method of claim 1, wherein the template image and the target image each comprise a plurality of pixels, the method further comprising:
characterizing pattern information of the template image, wherein the characterizing comprises:
sampling the template image to determine a first plurality of sample pixels, wherein the first plurality of sample pixels comprises a subset, but not all, of the pixels of the template image;
wherein said performing a pattern matching search through the target image uses the first plurality of sample pixels.

37. The method of claim 36, wherein the characterizing further comprises:
performing a local stability analysis around at least a subset of the first plurality of sample pixels, wherein said performing the local stability analysis determines a second plurality of sample pixels which have a desired degree of stability, wherein the second plurality of sample pixels comprises a subset, but not all, of the first plurality of sample pixels;
wherein said performing the local stability analysis operates to ensure stability of each of the second plurality of sample pixels to spatial perturbations around the sample pixel;
wherein said performing a pattern matching search through the target image uses the second plurality of sample pixels.

38. The method of claim 37,
wherein said performing the local stability analysis around the at least a subset of the first plurality of sample pixels comprises:
for each sample pixel, finding a neighborhood around the sample pixel where a value of the sample pixel correlates highly with template image pixel values in the neighborhood.

39. The method of claim 36,
wherein each of the pixels in the template image are comprised of a plurality of components; and
wherein said sampling the template image comprises sampling the template image in one or more component planes of the plurality of components.

40. The method of claim 39,
wherein each of the pixels in the template image are comprised of hue, saturation, and intensity components; and
wherein said sampling the template image comprises sampling the template image in one or more of the hue, saturation, and intensity planes.

41. The method of claim 36,
wherein said sampling the template image comprises sampling the template image along one or more rotationally invariant paths to produce one or more sets of sample pixels;
wherein said performing the pattern matching search uses the one or more sets of sample pixels to determine one or more rotated instances of the template image in the target image.

42. A computer-implemented method for locating regions of a target image that match a template image with respect to color and pattern information, the method comprising:
performing at least one of color matching and pattern matching of the target image to determine one or more candidate regions, wherein the one or more candidate regions match the template image with respect to at least one of color information and pattern information;
calculating a hue pattern match score for at least a subset of the one or more candidate regions to determine one or more final match regions in the target image; and
providing output indicating the one or more final match regions in the target image, wherein the one or more final match regions match the template image with respect to color and pattern information.

43. The method of claim 42,
wherein said performing at least one of color matching and pattern matching comprises performing at least one of color matching and luminance pattern matching.

44. A computer-implemented method for locating regions of a target image that match a template image with respect to color and pattern information, the method comprising:

performing a color matching search through the target image in order to find one or more first candidate regions, wherein the one or more first candidate regions match the template image with respect to color information;

performing a luminance pattern matching search in at least a subset of the one or more first candidate regions in order to find one or more second candidate regions in the target image;

calculating a hue pattern match score in at least a subset of the one or more second candidate regions to determine one or more final match regions in the target image;

providing output indicating the one or more final match regions in the target image, wherein the one or more final match regions match the template image with respect to color and pattern information.

45. A system for locating regions of a target image that match a template image with respect to color and pattern information, the system comprising:

a processor;

a memory medium coupled to the processor, wherein the memory medium stores color/pattern matching software;

wherein the processor is operable to execute the color/pattern matching software to:

perform a color matching search through the target image in order to find one or more color match candidate regions, wherein the one or more color match candidate regions match the template image with respect to color information;

perform a luminance pattern matching search in the one or more color match candidate regions in order to find one or more luminance pattern match candidate regions in the target image; and calculate a hue pattern match score for the one or more luminance pattern match candidate regions; and wherein the hue pattern match score is useable in determining regions of the target image that match the template image with respect to color and pattern information.

46. A memory medium comprising program instructions for locating regions of a target image that match a template image with respect to color and pattern information, wherein the program instructions are executable to implement:

performing a color matching search through the target image in order to find one or more color match candidate regions, wherein the one or more color match candidate regions match the template image with respect to color information;

performing a luminance pattern matching search in the one or more color match candidate regions in order to find one or more luminance pattern match candidate regions in the target image; and calculating a hue pattern match score for the one or more luminance pattern match candidate regions;

wherein the hue pattern match score is useable in determining regions of the target image that match the template image with respect to color information.

47. The memory medium of claim 46, wherein said program instruction are further executable to implement:

providing output indicating the one or more luminance pattern match candidate regions in the target image, wherein the one or more luminance pattern match candidate regions match the template image with respect to color and pattern information.

48. The memory medium of claim 46, wherein said program instruction are further executable to implement:

determining one or more final match regions in the target image using the calculated hue pattern match scores; and providing output indicating the one or more final match regions in the target image, wherein the one or more final match regions match the template image with respect to color and pattern information.

49. The memory medium of claim 46, wherein said program instruction are further executable to implement:

generating a color characterization of the template image prior to performing the color matching search;

wherein said performing a color matching search comprises:

generating a color characterization of a plurality of regions of the target image;

comparing the color characterization of the template image with the color characterization of each of the plurality of regions; and generating a score for each of the plurality of regions indicating correlation between the color characterization of the template image and the color characterization of each of the plurality of regions.

50. The memory medium of claim 49, wherein said performing a color matching search further comprises:

receiving user input specifying color matching search options;

performing a first-pass color characterization search through the target image to find initial color match candidate areas;

searching proximal regions of each said initial color match candidate area to find a best color match region for each area;

calculating a color match score for each said best color match region; and generating a final list of color match regions based on said color match scores.

51. The memory medium of claim 50, wherein said searching proximal regions comprises using a hill-climbing technique to find said best color match region for each area.

52. The memory medium of claim 51, wherein said searching proximal regions to find said best color match region for each area using a hill-climbing technique comprises:

using a coarse hill-climbing technique to find a coarse color match candidate region; and using a fine hill-climbing technique on the coarse color match candidate region to find the best color match candidate region.

53. The memory medium of claim 50, wherein said searching comprises searching among a plurality of subregions within the proximal region, wherein said searching comprises:

moving among the plurality of subregions using a coarse hill-climbing technique to find a coarse candidate subregion; and searching proximal subregions of the coarse candidate subregion by a fine hill-climbing technique to find the best color match candidate region.

54. The memory medium of claim 49, wherein said program instruction are further executable to implement:

calculating a final color match score for the one or more luminance pattern match candidate regions, wherein, for each luminance pattern match candidate region, calculating the final color match score comprises:
  comparing the color characterization of the template image with the color characterization of the luminance pattern match candidate region; and
  generating the final color match score for the luminance pattern match candidate region indicating correlation between the color characterization of the template image and the color characterization of the luminance pattern match candidate region.

55. The memory medium of claim 54, wherein said program instruction are further executable to implement:
  determining one or more final match regions in the target image using the hue pattern match score and the final color match score; and
  providing output indicating the one or more final match regions in the target image, wherein the one or more final match regions match the template image with respect to color and pattern information.

56. The memory medium of claim 54, wherein said performing a luminance pattern matching search further comprises calculating a luminance pattern match score for each of the one or more luminance pattern match candidate regions in the target image, wherein said program instruction are further executable to implement:
  determining one or more final match regions in the target image using the luminance pattern match score, the hue pattern match score, and the final color match score for each of the one or more luminance pattern match candidate regions; and
  providing output indicating the one or more final match regions in the target image, wherein the one or more final match regions match the template image with respect to color and pattern information.

57. The memory medium of claim 46, wherein said performing a luminance pattern matching search further comprises:
  using a coarse hill-climbing technique to search a proximal region of the color match candidate region to generate a coarse luminance pattern match candidate region; and
  using a fine hill-climbing technique on the coarse luminance pattern match candidate region to find the best luminance pattern match candidate region.

58. The memory medium of claim 57, wherein said searching a proximal region comprises searching among a plurality of subregions within the proximal region, wherein said searching comprises:
  moving among the plurality of subregions using a coarse hill-climbing technique to find a coarse candidate subregion; and
  searching proximal subregions of the coarse candidate subregion by a fine hill-climbing technique to find the best luminance pattern match candidate region.

* * * * *